United States Patent
Lutz

(10) Patent No.: US 11,638,874 B2
(45) Date of Patent: May 2, 2023

(54) SYSTEMS AND METHODS FOR CHANGING A STATE OF A GAME OBJECT IN A VIDEO GAME

(71) Applicant: SQUARE ENIX LTD., London (GB)

(72) Inventor: Daniel Lutz, Montréal (CA)

(73) Assignee: Square Enix Ltd., London (GB)

( * ) Notice: Subject to any disclaimer, the term of this patent is extended or adjusted under 35 U.S.C. 154(b) by 0 days.

(21) Appl. No.: 17/138,454

(22) Filed: Dec. 30, 2020

(65) Prior Publication Data
US 2021/0205706 A1 Jul. 8, 2021

Related U.S. Application Data

(60) Provisional application No. 62/957,521, filed on Jan. 6, 2020.

(51) Int. Cl.
*A63F 13/57* (2014.01)
*A63F 13/537* (2014.01)

(52) U.S. Cl.
CPC ............ *A63F 13/57* (2014.09); *A63F 13/537* (2014.09)

(58) Field of Classification Search
CPC ............................... A63F 13/57; A63F 13/537
See application file for complete search history.

(56) References Cited

U.S. PATENT DOCUMENTS

| 4,026,555 | A | * | 5/1977 | Kirschner | A63F 13/00 463/3 |
| 4,445,114 | A | * | 4/1984 | Stubben | H04N 5/262 345/28 |
| 4,508,353 | A | * | 4/1985 | Meyer | A63F 13/005 463/2 |
| 4,530,499 | A | * | 7/1985 | Breslow | A63F 9/28 463/9 |
| 4,643,421 | A | * | 2/1987 | Meyer | A63F 13/005 463/1 |

(Continued)

OTHER PUBLICATIONS

Arthelon. "Attackbar—Auto Attack Timer. Great for Warriors/Paladins/Rogues/Shamans." Auto-Attack Timer Feature, Youtube.com, Jan. 27, 2017, 1 page, [Online] [Retrieved Jan. 21, 2021], Retrieved from the internet <URL:https://www.youtube.com/watch?v=jtN-KGTwad4>.

(Continued)

*Primary Examiner* — David L Lewis
*Assistant Examiner* — Matthew D Hoel
(74) *Attorney, Agent, or Firm* — Fenwick & West LLP

(57) ABSTRACT

A computer-implemented method, gaming device and computer-readable medium for video game. The method includes maintaining a virtual space for a gaming environment. The method also includes repeatedly activating an event zone in the virtual space, wherein for one or more game objects having a position in the virtual space that is within the event zone when the event zone is activated, a state of the one or more game objects in the virtual space is changed. The method further includes displaying on a display device a visual representation of the event zone and a visual representation of a marker, the marker having a position in the virtual space. The method yet further includes changing the position of the marker such that a distance involving the marker and at least part of the event zone is related to a time remaining before the next repeated activation of the event zone.

31 Claims, 30 Drawing Sheets

(56) References Cited

U.S. PATENT DOCUMENTS

| | | | | |
|---|---|---|---|---|
| 4,658,247 A * | 4/1987 | Gharachorloo | G09G 5/42 | 345/419 |
| 4,738,451 A * | 4/1988 | Logg | A63F 13/10 | 463/2 |
| RE33,662 E * | 8/1991 | Blair | A63F 13/06 | 463/3 |
| 5,090,708 A * | 2/1992 | Gerlitz | A63F 9/0291 | 273/DIG. 17 |
| 5,120,057 A * | 6/1992 | Kitaue | A63F 13/02 | 463/2 |
| 5,125,671 A * | 6/1992 | Ueda | A63F 13/00 | 463/33 |
| 5,150,899 A * | 9/1992 | Kitaue | A63F 9/24 | 463/2 |
| 6,379,249 B1 * | 4/2002 | Satsukawa | A63F 13/04 | 463/31 |
| 7,625,278 B2 * | 12/2009 | Paulsen | G07F 17/34 | 273/142 R |
| 7,651,392 B2 * | 1/2010 | Pennington | G07F 17/34 | 463/16 |
| 7,666,092 B2 * | 2/2010 | Kaminkow | G07F 17/3216 | 463/25 |
| 7,677,977 B2 * | 3/2010 | Maehiro | A63F 13/00 | 463/32 |
| 7,766,746 B2 * | 8/2010 | Fujii | A63F 13/52 | 463/31 |
| 7,771,270 B2 * | 8/2010 | Kaminkow | G07F 17/3211 | 463/22 |
| 7,789,741 B1 * | 9/2010 | Fields | A63F 13/49 | 463/2 |
| 7,896,734 B2 * | 3/2011 | Kaminkow | G07F 17/326 | 463/16 |
| 8,057,308 B2 * | 11/2011 | Kaminkow | G07F 17/3211 | 463/46 |
| 8,147,339 B1 * | 4/2012 | Perry | A63F 13/355 | 463/42 |
| 8,212,780 B2 * | 7/2012 | Mashimo | A63F 13/5375 | 345/173 |
| 8,246,472 B2 * | 8/2012 | Kaminkow | G07F 17/3211 | 463/46 |
| 8,251,801 B2 * | 8/2012 | Wadds | G07F 17/322 | 463/25 |
| 8,251,802 B2 * | 8/2012 | Snow | G07F 17/3211 | 463/25 |
| 8,262,475 B2 * | 9/2012 | Snow | G07F 17/3272 | 463/31 |
| 8,287,347 B2 * | 10/2012 | Snow | G07F 17/32 | 463/13 |
| 8,292,723 B2 * | 10/2012 | DeWaal | A63F 13/87 | 463/20 |
| 8,342,529 B2 * | 1/2013 | Snow | G07F 17/323 | 273/292 |
| 8,419,549 B2 * | 4/2013 | Kaminkow | G07F 17/326 | 463/46 |
| 8,430,747 B2 * | 4/2013 | Kniesteadt | G07F 17/3283 | 463/26 |
| 8,444,480 B2 * | 5/2013 | Baerlocher | G07F 17/3244 | 463/25 |
| 8,449,380 B2 * | 5/2013 | Baerlocher | G07F 17/3276 | 463/25 |
| 8,490,973 B2 * | 7/2013 | Yoseloff | A63F 1/14 | 273/149 R |
| 8,491,394 B2 * | 7/2013 | Fields | A63F 13/48 | 463/42 |
| 8,506,402 B2 * | 8/2013 | Gault | H04N 19/44 | 463/40 |
| 8,511,684 B2 * | 8/2013 | Grauzer | A63F 1/14 | 273/149 P |
| 8,556,710 B2 * | 10/2013 | Kniesteadt | G07F 17/3244 | 463/26 |
| 8,560,331 B1 * | 10/2013 | Pereira | H04N 21/6125 | 704/503 |
| 8,591,305 B2 * | 11/2013 | Snow | G07F 17/322 | 463/13 |
| 8,597,114 B2 * | 12/2013 | Snow | A63F 1/00 | 463/25 |
| 8,613,673 B2 * | 12/2013 | Perry | A63F 13/358 | 463/42 |
| 8,636,582 B2 * | 1/2014 | DeWaal | A63F 13/87 | 463/20 |
| 8,651,939 B2 * | 2/2014 | Nordman | G07F 17/3211 | 463/20 |
| 8,676,591 B1 * | 3/2014 | Pereira | H04N 21/431 | 704/500 |
| 8,727,871 B2 * | 5/2014 | Baerlocher | G07F 17/3286 | 463/27 |
| 8,808,090 B2 * | 8/2014 | Myogan | A63F 13/60 | 463/37 |
| 8,814,648 B2 * | 8/2014 | Baerlocher | G07F 17/3232 | 463/16 |
| 8,840,476 B2 * | 9/2014 | Perry | H04L 67/38 | 463/42 |
| 8,864,575 B2 * | 10/2014 | Baerlocher | G07F 17/3286 | 463/25 |
| 8,876,591 B2 * | 11/2014 | Baerlocher | G07F 17/3283 | 463/21 |
| 8,888,592 B1 * | 11/2014 | Pereira | A63F 13/53 | 463/35 |
| 8,926,435 B2 * | 1/2015 | Perry | A63F 13/335 | 463/42 |
| 8,968,087 B1 * | 3/2015 | Gault | A63F 13/2145 | 463/31 |
| 9,005,015 B2 * | 4/2015 | Baerlocher | G07F 17/3244 | 463/25 |
| 9,101,821 B2 * | 8/2015 | Snow | G07F 17/3211 | |
| 9,159,185 B2 * | 10/2015 | Snow | A63F 1/10 | |
| 9,162,138 B2 * | 10/2015 | Grauzer | A63F 1/14 | |
| 9,203,685 B1 * | 12/2015 | Perry | G06F 9/45537 | |
| 9,224,266 B2 * | 12/2015 | Baerlocher | G07F 17/32 | |
| 9,336,528 B2 * | 5/2016 | Beaton | G06Q 30/02 | |
| 9,349,250 B2 * | 5/2016 | Kaminkow | G07F 17/326 | |
| 9,536,382 B2 * | 1/2017 | DeWaal | A63F 13/87 | |
| 9,569,924 B2 * | 2/2017 | Snow | G07F 17/322 | |
| 9,584,575 B2 * | 2/2017 | Perry | A63F 13/537 | |
| 9,600,968 B2 * | 3/2017 | Baerlocher | G07F 17/3269 | |
| 9,640,017 B2 * | 5/2017 | Low | G07F 17/32 | |
| 9,649,549 B2 * | 5/2017 | Snow | G09B 5/02 | |
| 9,723,319 B1 * | 8/2017 | Pereira | A63F 13/42 | |
| 9,852,580 B2 * | 12/2017 | Baerlocher | G07F 17/34 | |
| 9,878,240 B2 * | 1/2018 | Gault | A63F 13/355 | |
| 10,016,686 B2 * | 7/2018 | Eika | A63F 13/795 | |
| 10,039,978 B2 * | 8/2018 | Gault | A63F 13/79 | |
| 10,410,465 B2 * | 9/2019 | Snow | A63F 13/00 | |
| 10,500,488 B2 * | 12/2019 | Babieno | A63F 13/42 | |
| 10,596,467 B2 * | 3/2020 | Desjardins | A63F 13/56 | |
| 10,653,947 B2 * | 5/2020 | Matsuzaki | A63F 13/211 | |
| 10,974,149 B2 * | 4/2021 | Seropian | A63F 13/5375 | |
| 11,426,659 B2 * | 8/2022 | Sato | A63F 13/57 | |
| 2020/0330872 A1 * | 10/2020 | Odagiri | A63F 13/35 | |
| 2021/0205706 A1 * | 7/2021 | Lutz | A63F 13/5372 | |
| 2021/0322865 A1 * | 10/2021 | Shao | A63F 13/42 | |
| 2021/0370177 A1 * | 12/2021 | Li | A63F 13/44 | |
| 2021/0370179 A1 * | 12/2021 | Sato | A63F 13/5255 | |
| 2022/0016528 A1 * | 1/2022 | Ichikawa | A63F 13/56 | |
| 2022/0152502 A1 * | 5/2022 | Abe | A63F 13/58 | |
| 2022/0152503 A1 * | 5/2022 | Abe | A63F 13/58 | |
| 2022/0241691 A1 * | 8/2022 | Khan | A63F 13/837 | |
| 2022/0258054 A1 * | 8/2022 | Matsumoto | A63F 13/42 | |
| 2022/0258055 A1 * | 8/2022 | Sato | A63F 13/837 | |
| 2022/0297005 A1 * | 9/2022 | Kamiya | A63F 13/80 | |

OTHER PUBLICATIONS

Lefthandedglove. "WeaponSwingTimer—Version 4.0.0 (Wands, Hunter Fixes, Visuals, Config Overhaul)." Weapon Swing Timer Feature, Youtube.com, Aug. 24, 2019, 1 page, [Online] [Retrieved Jan. 21, 2021], Retrieved from the internet <URL:https://www.youtube.com/watch?v=aWfNDG11Mv0>.

(56) References Cited

OTHER PUBLICATIONS

Reimysterio. "League of Legends—Show Attack Range Indicator Circle (2 Methods)." Attack Range Indicator Circle Feature, Youtube.com, Nov. 20, 2019, 1 page, [Online] [Retrieved Jan. 21, 2021], Retrieved from the internet <URL:https://www.youtube.com/watch?v=TGMpu5qZaGE>.

Vubi Gamedev. "Making a MOBA Character #4: Ability Indicators (Unity 2019 Tutorial)." Attack Range Indicator Feature, Youtube.com, Jun. 1, 2020, 1 page, [Online] [Retrieved Jan. 21, 2021], Retrieved from the internet <URL:https://www.youtube.com/watch?v=nkes83f6YW0>.

Wtiiwarcraft. "Warcraft 3—Battleship Crossfire." Auto-Attack Feature, Youtube.com, Mar. 2, 2017, 1 page, [Online] [Retrieved Jan. 21, 2021], Retrieved from the internet <URL:https://www.youtube.com/watch?v=L6MjK5zd3Zs>.

\* cited by examiner

Table 1000

| ID 1001 | Team 1002 | User 1003 | Spatial Coordinates $XYZ_{GO}$ 1004 | Game Object Health Parameter 78 [%] 1005 | Game Object State Parameter 80 1006 | Active / Inactive Count 1007 | Time in Current State [s] 1008 | set of spatial coordinates $\{XYZ_{102}\}$ 1009 | Count of attacks 1010 | User Score 1011 |
|---|---|---|---|---|---|---|---|---|---|---|
| $101_1$ | Team A | User 1 | $\{XYZ\}_{GO}$ | 92 | Active | 0 | 400 | $\{XYZ_{102}\}$ | 30 | 73 |
| $101_2$ | Team A | User 3 | $\{XYZ\}_{GO}$ | 77 | Active | 0 | 400 | $\{XYZ_{102}\}$ | 27 | 91 |
| $101_3$ | Team A | Bot | $\{XYZ\}_{GO}$ | 65 | Active | 0 | 400 | $\{XYZ_{102}\}$ | 32 | N/A |
| $104_1$ | Team B | User 2 | $\{XYZ\}_{GO}$ | 40 | Inactive | 1 | 10 | $\{XYZ_{102}\}$ | 18 | 42 |
| $104_2$ | Team B | User 4 | $\{XYZ\}_{GO}$ | 42 | Active | 2 | 100 | $\{XYZ_{102}\}$ | 12 | 37 |
| $104_3$ | Team B | Bot | $\{XYZ\}_{GO}$ | 56 | Active | 0 | 400 | $\{XYZ_{102}\}$ | 21 | N/A |
| $104_4$ | Team B | Bot | $\{XYZ\}_{GO}$ | 83 | Active | 0 | 400 | $\{XYZ_{102}\}$ | 25 | N/A |

FIG. 10

```
┌─────────────────────────────────────────────┐
│ Maintaining in a non-transitory memory a    │
│ virtual space for a gaming environment      │
│                   2710                      │
└─────────────────────────────────────────────┘
                      │
                      ▼
┌─────────────────────────────────────────────┐
│ Repeatedly activating an event zone in the  │
│ virtual space such that for one or more     │
│ game objects having a position in the       │
│ virtual space that is within the event zone │
│ when the event zone is activated, a state   │
│ of the one or more game objects in the      │
│ virtual space is changed                    │
│                   2720                      │
└─────────────────────────────────────────────┘
                      │
                      ▼
┌─────────────────────────────────────────────┐
│ Displaying on a display device a visual     │
│ representation of the event zone and a      │
│ visual representation of a marker, the      │
│ marker having a position in the virtual     │
│ space                                       │
│                   2730                      │
└─────────────────────────────────────────────┘
                      │
                      ▼
┌─────────────────────────────────────────────┐
│ Changing the position of the marker         │
│ relative to at least part of the event zone │
│ such that a distance involving the marker   │
│ and the at least part of the event zone is  │
│ related to a time remaining before the next │
│ periodic activation of the event zone       │
│                   2740                      │
└─────────────────────────────────────────────┘
```

FIG. 27

SYSTEMS AND METHODS FOR CHANGING A STATE OF A GAME OBJECT IN A VIDEO GAME

CROSS-REFERENCE TO RELATED APPLICATION

The present application claims the benefit of U.S. Provisional Patent Application Ser. No. 62/957,521 entitled "SYSTEMS AND METHODS FOR IMPROVED PLAYER INTERACTION," filed on Jan. 6, 2020, which is hereby incorporated by reference herein.

FIELD

The present invention relates generally to video games and, in particular, to changing a state of a game object in a video game.

BACKGROUND

The present disclosure relates to systems and methods for improving player interaction within video gaming systems.

One of the main goals of a mobile game is to deliver a rewarding gaming experience, characterized by high levels of gamer engagement and interest.

In Multiplayer Online Battle Arena (MOBA) games, sometimes referred to as Action Real-Time Strategy (ARTS) games, players control a character in a gaming environment typically viewed from an isometric perspective. In such games, single players typically form part of a team of players that competes against another team of players. In most of such games, characters often have abilities that improve, or otherwise change, during (and sometimes as a result of) gameplay.

MOBA games can be seen as a hybrid of real-time strategy, role-playing and action games, and are very popular in eSports. One of the reasons that MOBA games are popular in eSports is that the complexity of real-time strategy and role-playing features is particularly well suited to team competitions, in which multiple players compete and/or cooperate in a single gaming environment by controlling different characters.

While team gameplay has benefitted from the real-time strategy and role-playing components of MOBA games, adding complexity to the action component of MOBA games has been more challenging, particularly because of the fact that most MOBA games display characters from a relatively distant viewpoint, in order to display a wide isometric view of the gaming environment. This has resulted in relatively simple attacks between characters, leading to limited user engagement resulting from the action component of MOBA games. Another technical problem with current MOBA games is that, as such games migrate to smartphone platforms, attack sequences become more awkward, as triggering attacks require tapping the screen on which the game is displayed, thereby interfering with the user's view of the screen.

Thus, there exists a need for a solution to various technical problems such as the technical problem of maintaining and/or increasing the strategic complexity of attack sequences between characters in a MOBA game, so as to increase user engagement and interest, while at the same time simplifying attack sequences from a user's perspective.

SUMMARY

According to various aspects, this disclosure relates to a method for execution by a processor of a computing device. The method comprises maintaining a virtual space for a gaming environment. The method also comprises repeatedly activating an event zone in the virtual space, wherein for one or more game objects having a position in the virtual space that is within the event zone when the event zone is activated, a state of the one or more game objects in the virtual space is changed. The method further comprises displaying on a display device a visual representation of the event zone and a visual representation of a marker, the marker having a position in the virtual space. The method yet further comprises changing the position of the marker relative to at least part of the event zone such that a distance involving the marker and the at least part of the event zone is related to a time remaining before the next repeated activation of the event zone.

In accordance with yet another aspect, this disclosure relates to a gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program including at least one process that comprises maintaining a virtual space for a gaming environment. The process also comprises repeatedly activating an event zone in the virtual space, wherein for one or more game objects having a position in the virtual space that is within the event zone when the event zone is activated, a state of the one or more game objects in the virtual space is changed. The process further comprises displaying on a display device a visual representation of the event zone and a visual representation of a marker, the marker having a position in the virtual space. The process yet further comprises changing the position of the marker relative to at least part of the event zone such that a distance involving the marker and the at least part of the event zone is related to a time remaining before the next repeated activation of the event zone.

In accordance with yet another aspect, this disclosure relates to a computer-readable storage medium comprising computer-readable instructions which, when read and executed by at least one processor of a gaming device, cause a gaming device to carry out a method in an interactive computer program that comprises maintaining a virtual space for a gaming environment. The method also comprises repeatedly activating an event zone in the virtual space, wherein for one or more game objects having a position in the virtual space that is within the event zone when the event zone is activated, a state of the one or more game objects in the virtual space is changed. The method further comprises displaying on a display device a visual representation of the event zone and a visual representation of a marker, the marker having a position in the virtual space. The method yet further comprises changing the position of the marker relative to at least part of the event zone such that a distance involving the marker and the at least part of the event zone is related to a time remaining before the next repeated activation of the event zone.

These and other aspects of this disclosure will now become apparent to those of ordinary skill in the art upon review of a description of embodiments in conjunction with accompanying drawings.

BRIEF DESCRIPTION OF THE DRAWINGS

For a more complete understanding of the present disclosure, reference is now made to the following description taken in conjunction with the accompanying drawings, in which:

FIG. 10 is an example of a table storing information regarding game objects stored in the game data, in accordance with a non-limiting embodiment;

FIG. 27 is a flowchart showing steps of a method executed by the computing device, in accordance with a non-limiting embodiment.

It is to be expressly understood that the description and drawings are only for purposes of illustrating certain embodiments and are an aid of understanding. They are not intended to and should not be limiting.

DETAILED DESCRIPTION

Figure 1:
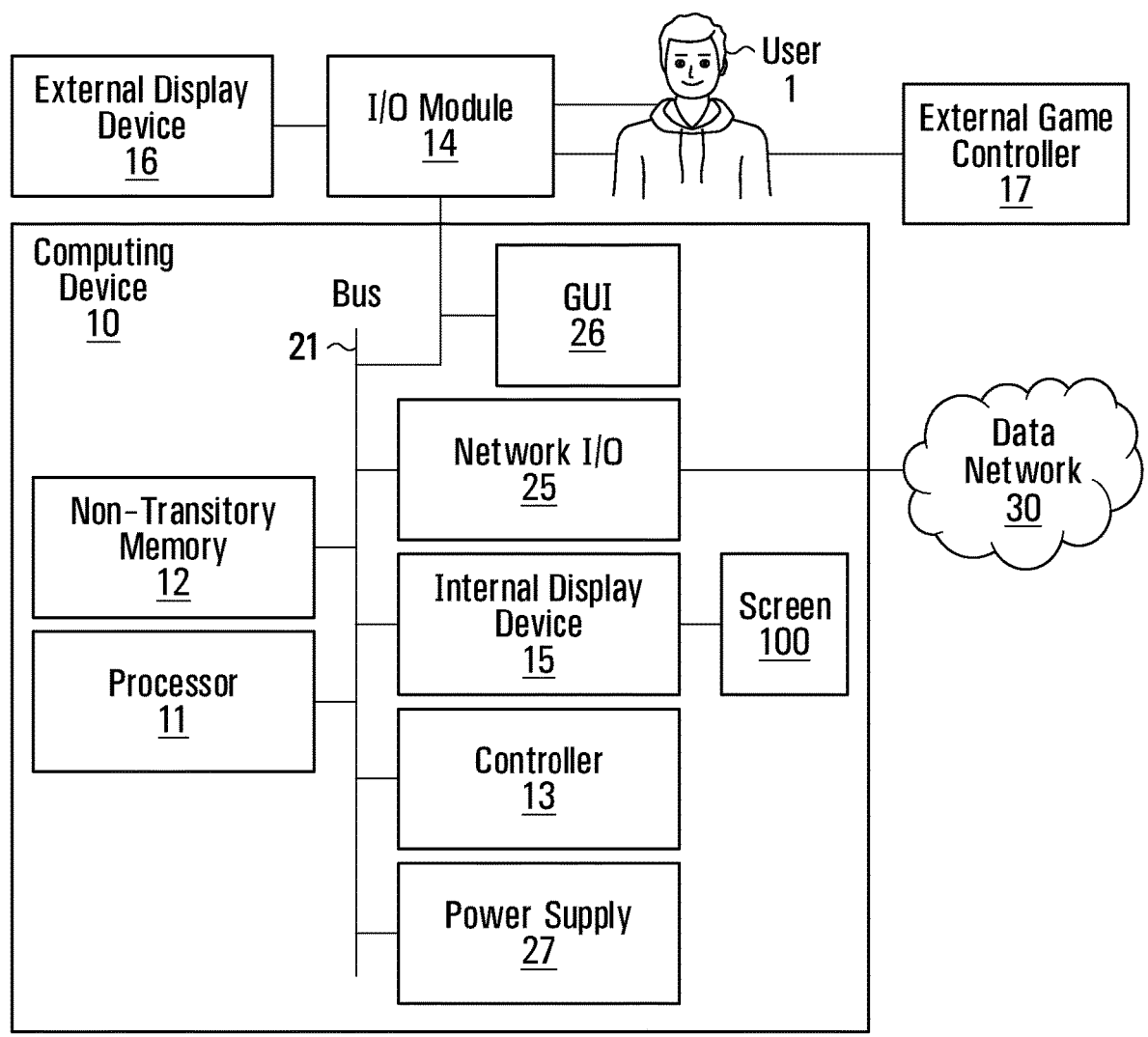
FIG. 1 is a block diagram illustrating a configuration of a computing device implementing non-limiting embodiments of the present invention.

FIG. 1 is an illustration of a schematic block diagram of a computing device 10 in accordance with a non-limiting embodiment of the disclosure. In some embodiments, the computing device 10 is a dedicated gaming console similar to an Xbox™, Playstation™ or Nintendo™ gaming console. In other embodiments, the computing device 10 is a laptop computer. In yet other embodiments, the computing device is a mobile device such as a smartphone, a tablet. In yet other embodiments, the computing device 10 is a handheld gaming console. The computing device 10 may be any other computing device suitable for carrying out the embodiments of the disclosure.

In the illustrated embodiment as shown in FIG. 1, the computing device 10 comprises a non-transitory memory 12 (hereinafter "the memory 12"), a processor 11, an input/output module 14, at least one power supply unit 27, and may include any other suitable components typically found in a computing device used for playing video games. The various components of the computing device 10 may communicate with each other over one or more buses 21, which can be data buses, control buses, power buses and the like.

In some embodiments, the computing device 10 may include an internal game controller 13 (e.g. a touchscreen) or an external game controller 17 (e.g. a joystick) configured to receive input from a user (i.e. a player of the game), as well as an internal display device 15 (e.g. a touchscreen) or an external display device 16 (e.g. a computer monitor, a television set).

The computing device 10 may be connected to a data network 30 via a network input/output interface 25. Depending on the implementation, the data network 30 may be the internet, a local area network, a wireless network, a combination of such networks or still other forms of data networks.

A user 1 may play a video game by viewing game images displayed on a screen 100 of the internal display device 15 or the external display device 16 and controlling aspects of the video game via the internal game controller 13 or the external game controller 17. Accordingly, the computing device 10 receives inputs from the internal game controller 13 or the external game controller 17 via the input/output module 14. The computing device 10 also supplies outputs to the internal display device 15 or the external display device 16 and/or an auditory device (e.g., a speaker, not shown) via the input/output module 14. In other implementations, there may be more than one internal or external game controller and/or more than one internal or external display device connected to the input/output module 14.

The processor 11 may include one or more central processing units (CPUs) having one or more cores. The processor 11 may also include at least one graphics processing unit (GPU) in communication with a video encoder/video codec (coder/decoder, not shown) for causing output data to be supplied to the input/output module 14 for display on the internal display device 15 or the external display device 16. The processor 11 may also include at least one audio processing unit in communication with an audio encoder/audio codec (coder/decoder, not shown) for causing output data to be supplied to the input/output module 14 to the auditory device.

The memory 12 may include RAM (Random Access Memory), ROM (Read Only Memory), flash memory, hard disk drive(s), DVD/CD/Blu-ray™ drive and/or any other suitable memory device, technology or configuration. The memory 12 stores a variety of information including computer-readable instructions 18, game data 20 and an operating system 22.

When the computer device 10 is powered on, the processor 11 is configured to run a booting process which includes causing the processor 11 to communicate with the memory 12. In particular, the booting process causes execution of the operating system 22. The operating system 22 may be any commercial or proprietary operating system suitable for the computing device 10. Execution of the operating system 22 causes the processor 11 to generate images displayed on the internal display device 15 or the external display device 16, including various options that are selectable by the user 1 via the internal game controller 13 or the external game controller 17, including the option for the user 1 to start and/or select a video game to be played. The video game selected/started by the user 1 is encoded by the computer-readable instructions 18.

The processor 11 is configured to execute the computer-readable instructions 18 such that the processor 11 is able to perform various kinds of information processing functions related to the video game that it encodes. In particular, and with reference to FIG. 2, execution of the computer-readable instructions 18 causes the processor to execute a game data processing function 23 and game rendering processing function 24, which are now described.

Figure 2:
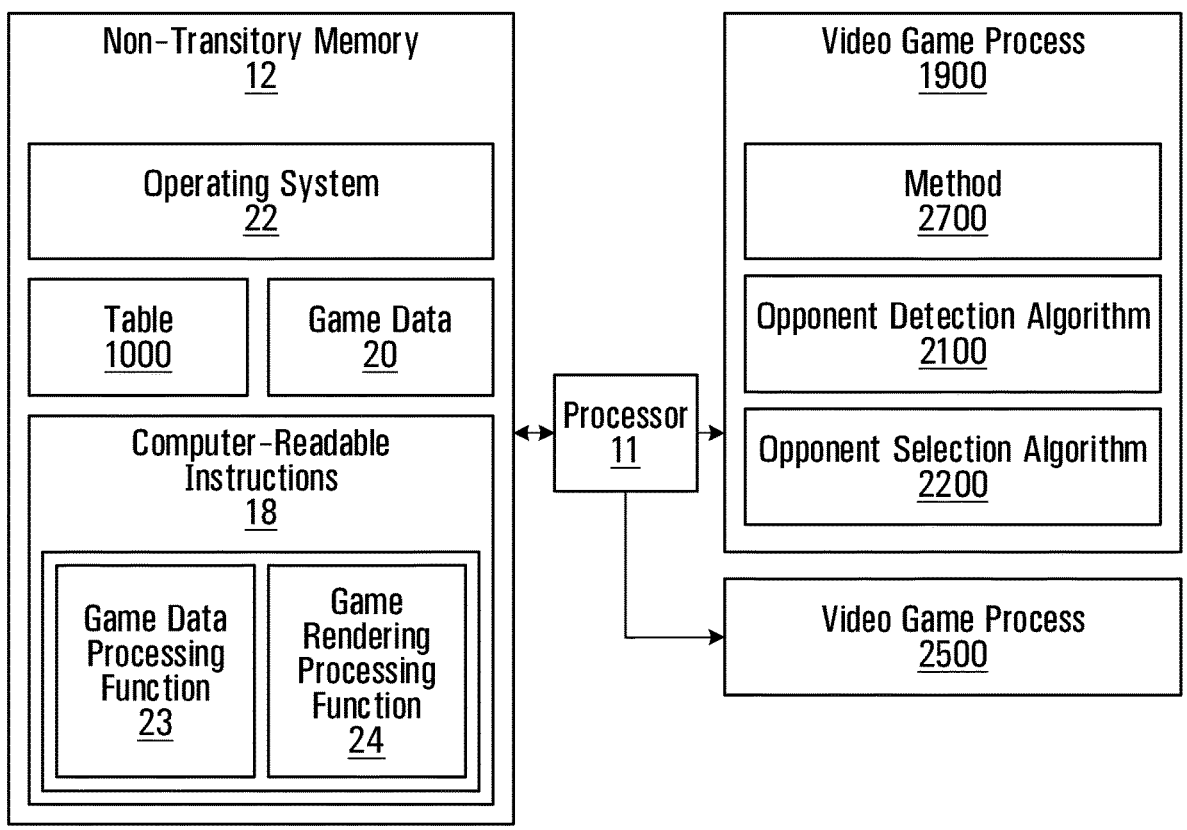
FIG. 2 is a block diagram showing a relationship between a memory of the computing device and video game processes of the present invention, in accordance with a non-limiting embodiment.

The game rendering processing function 24 includes generation of a game image to be displayed on the internal display device 15 or the external display device 16. For its part, the game data processing function 23 includes processing of information representing progress of the game or a current state of the game (e.g., processing of information relating to the game that is not necessarily displayed on the internal display device 15 or the external display device 16). The game data processing function 23 and the game rendering processing function 24 are illustrated in FIG. 2 as forming part of a single set of computer-readable instructions 18. However, in other embodiments, the game data processing function 23 and the game rendering processing function 24 may be separate programs or sets of computer-readable instructions stored in separate memories and executed by separate, possibly distant, processors. For example, the game data processing function 23 may be performed on a CPU and the game rendering processing function 24 may be performed on a GPU.

Figure 3:
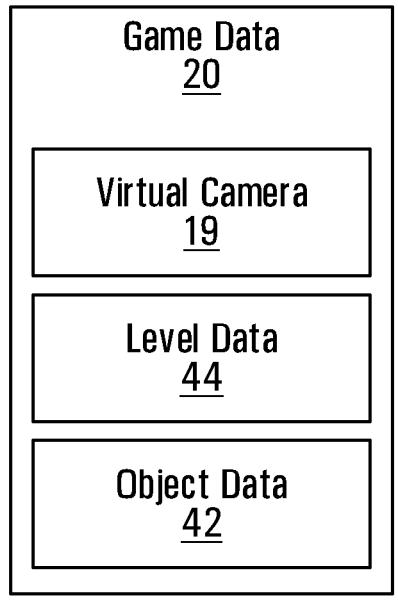
FIG. 3 is a block diagram conceptually illustrating examples of game data, in accordance with a non-limiting embodiment.

In the course of executing the computer-readable instructions 18, the processor 11 manipulates constructs such as objects and/or levels according to certain game rules and applying certain artificial intelligence algorithms. In the course of executing the computer-readable instructions 18, the processor 11 creates, loads, stores, reads and generally accesses the game data 20, which includes data related to the object(s) and/or level(s). FIG. 3 shows an example illustrating examples of game data 20 according to a present example embodiment. The game data 20 may include data related to the aforementioned constructs and therefore may include object data 42 and/or level data 44.

Figure 4:
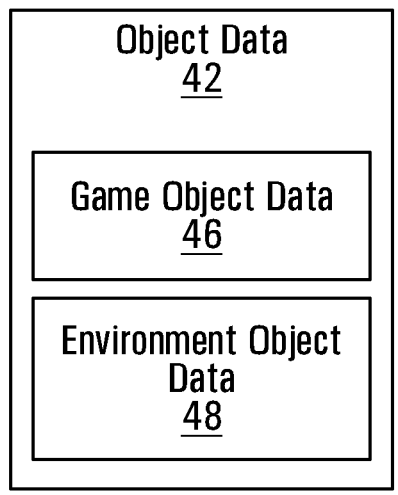
FIGS. 4 and 5 is a block diagram conceptually illustrating examples of object data, in accordance with a non-limiting embodiment.

A game object may refer to any element or portion of an element in a gaming environment that can be displayed graphically in a game image frame. A game object may be a player character (PC) or a non-player character (NPC). Examples of game objects include a person, an avatar, an animal, and/or any other suitable object. A game object may be associated with one or more other objects, such as weapons held by a character or clothes donned by the character. A game object may have other non-visual representations such as numeric, geometric or mathematical representations. As shown in FIG. 4, the object data 42 may include game object data 46 which stores data relating to the current representation of a game object such as the graphical representation in a game image frame or a numeric, geometric or mathematical representation.

Figure 5:
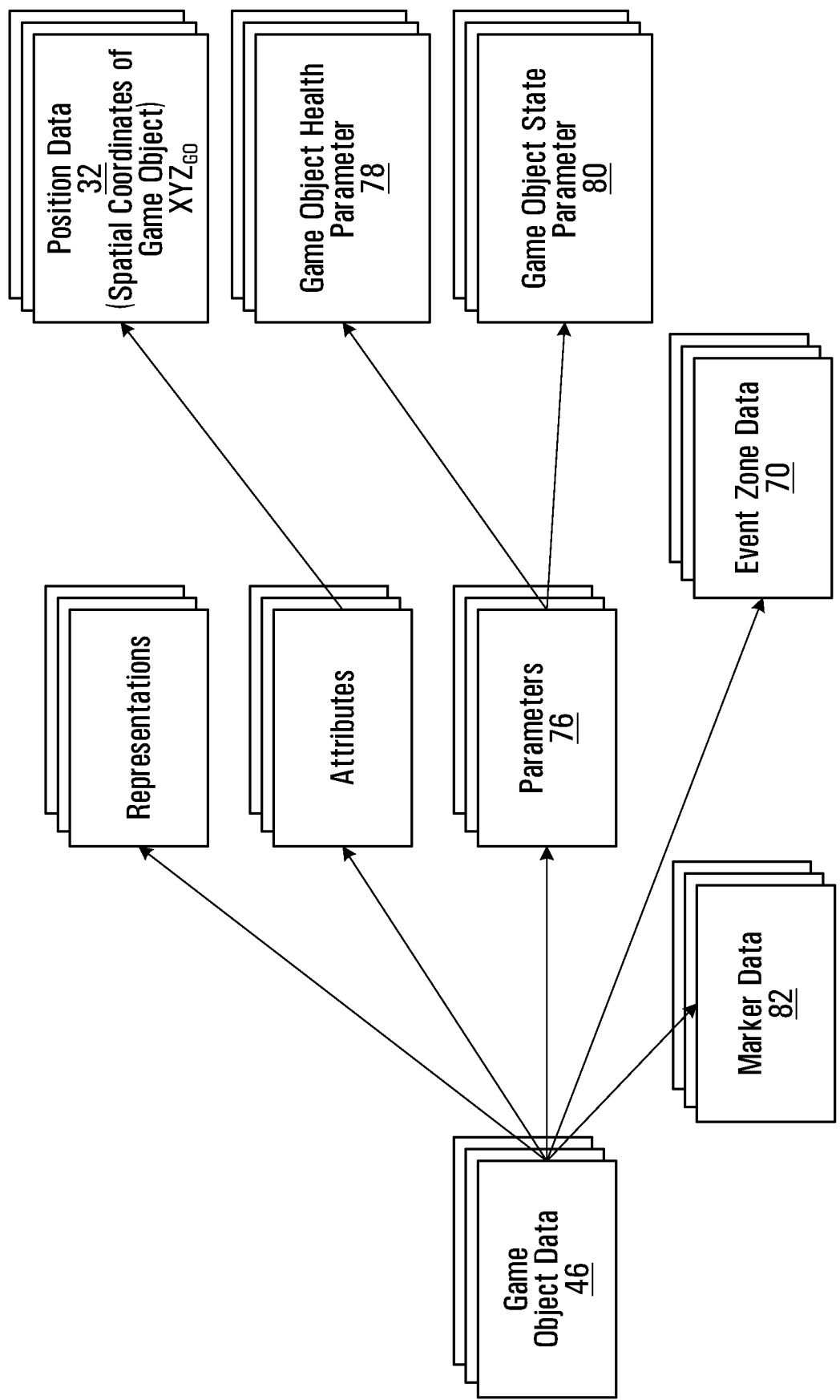

As shown in FIG. 5, a game object may comprise attributes. In some cases, certain attributes of a game object may be controlled by the user 1. In other cases, certain attributes of a game object (be it a PC or an NPC) may be controlled by the computer-readable instructions 18. The game object data 46 may also store attributes such as imaging data, position data 32, material/texture data, color data, physical state data, visibility data, lighting data (e.g., direction, position, color and/or intensity), sound data, motion data, collision data, environment data, timer data and/or other data associated with the game object.

Figure 6:
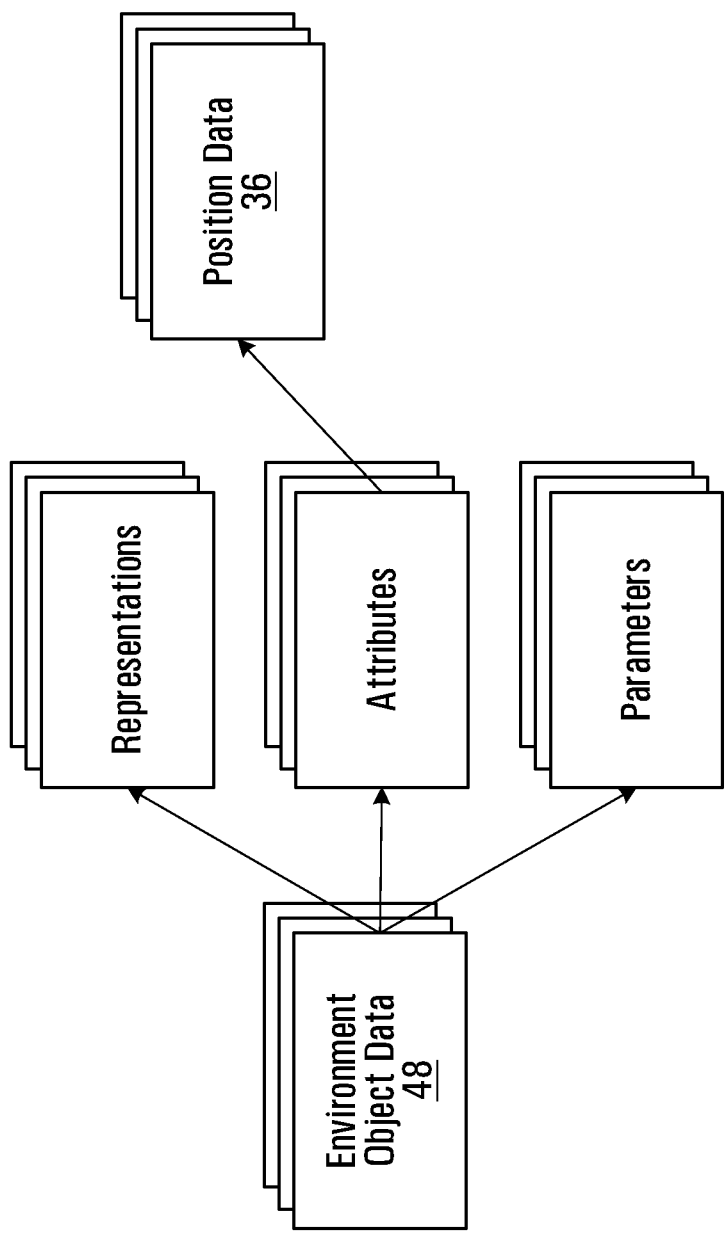
FIG. 6 is a block diagram conceptually illustrating examples of environment object data, in accordance with a non-limiting embodiment.
Figure 7:
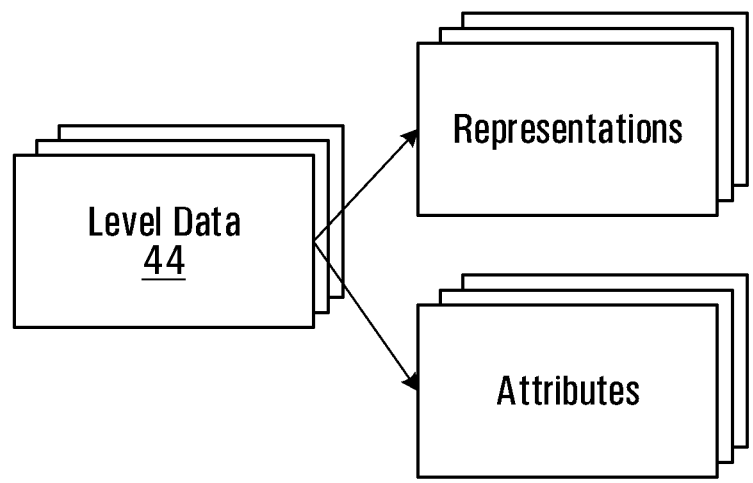
FIG. 7 is a block diagram conceptually illustrating examples of level data, in accordance with a non-limiting embodiment.

An environment object is similar to a game object except that attributes of an environment object are less dynamic in nature. Further, a game object may have additional attributes that an environment object typically does not have. Some of the environment objects are elements in the gaming environment with which PCs and NPCs may interact. An environment object may include 2D or 3D representations of buildings, vehicles, furniture, plants, sky, ground, ocean, sun, and/or any other suitable elements. An environment object may have other non-graphical representations such numeric, geometric or mathematical representations. As shown in FIGS. 4 and 6, the object data 42 may include environment object data 48 which stores data relating to the current representation of the environment object such as the graphical representation in a game image frame or a numeric, geometric or mathematical representation.

Certain attributes of an environment object may be controlled by the computer-readable instructions 18. The environment object data 48 may also store attributes such as imaging data, position data 36, material/texture data, physical state data, visibility data, lighting data (e.g., direction, position, color and/or intensity), sound data, motion data, collision data, environment data, timer data and/or other data associated with the environment object.

The game data 20 may also include data relating to the current view or camera angle of the video game (e.g., first-person view, third-person view, etc.) as displayed on the screen 100 of the internal display device 15 or the external display device 16 which may be part of the representations and/or attributes of the object data 42 (including the environment object data 48 and/or the game object data 46) and/or the level data 44.

In executing the computer-readable instructions 18, the processor 11 may cause an initialization phase to occur after the user 1 has selected/started the game, causing initialization of the game. The initialization phase is used to carry out any necessary game setup and prepare the game data 20 for the start of the game. The game data 20 changes during the processing of the computer-readable instructions 18 (i.e., during the playing of the game) and the terminology "game state" is used herein to define the current state or properties of the game data 20 and hence the various object data 42 (including the environment object data 48 and/or the game object data 46) and/or the level data 44 and their corresponding representations and/or attributes (as shown in FIGS. 4A, 4B and 4C).

After the initialization phase, the processor 11 in execution of the computer-readable instructions 18 may implement one or more game loops. The one or more game loops run continuously during gameplay causing the game data processing function 23 (sometimes referred to as "game logic") and the game rendering processing function 24 to be routinely performed.

A game loop may be implemented, whereby (i) the game data processing function 23 is performed to process the user's input via the internal game controller 13 or the external game controller 17 and to update the game state (e.g., change data stored and maintained in the memory 12 regarding the gaming environment) and afterwards (ii) the game rendering processing function 24 is performed to cause the game image to be rendered based on the updated game state for display on the internal display device 15 or the external display device 16. The game loop may also track the passage of time to control the rate of gameplay. It should be appreciated that parameters other than user inputs can influence the game state. For example, various timers (e.g., elapsed time, time since a particular event, virtual time of day, etc.) can have an effect on the game state. In other words, the game keeps progressing even when the user 1 isn't providing input and as such, the game state may be updated in the absence of the user's input.

In general, the number of times that the game data processing function 23 is performed per second specifies the updates to the game state per second (hereinafter "updates per second") and the number of times that the game rendering processing function 24 is performed per second specifies game image rendering per second (hereinafter "frames per second"). The game data processing function 23 and the game rendering processing function 24 may be called the same number of times per second, although this is not a requirement. By way of a specific and non-limiting example, it may be desirable to perform the game data processing function 23 and the game rendering processing function 24 every 40 milliseconds (ms) (i.e., 40 ms=1 second/25 frames per second—FPS). In the case where the game data processing function 23 is performed and afterwards the game rendering processing function 24 is performed, it should be appreciated that, for a given cycle or period, both the game data processing function 23 and the game rendering processing function 24 would need to be performed in the allotted time for that period. Depending on the current game state, it should be appreciated that the time of performing the game data processing function 23 and/or the game rendering processing function 24 may vary. If both the game data processing function 23 and the game rendering processing function 24 together take less than the allotted time to perform, a sleep timer may be used before performing the next cycle of the game data processing function 23 and the game rendering processing function 24. However, if the game data processing function 23 and the game rendering processing function 24 together take more than the allotted time to perform, this may cause jitter. One technique to avoid jitter is to occasionally omit performing the game rendering function 24.

It should be appreciated that the target number of frames per second may be more or less than 25 frames per second (e.g., 60 frames per second); however, it may be desired that the game data processing function 23 and the game rendering processing function 24 be performed not less than 20 to 25 times per second lest the human eye notice any lag in the rendering of the game image frames. Naturally, the higher the frame rate, the less time between images and the more power is required of the processor(s) to execute the game loop.

In other embodiments, the game data processing function 23 and the game rendering processing function 24 may be separate game loops and hence independent processes. In such cases, the game data processing function 23 may be routinely performed at a specific rate (i.e., a specific number of updates per second) regardless of when the game rendering processing function 24 is performed and the game rendering processing function 24 may be routinely performed at a specific rate (i.e., a specific number of frames per second) regardless of when the game data processing function 23.

It should be appreciated that the process of routinely performing the game data processing function 23 and the game rendering processing function 24 may be implemented according to various techniques within the purview of the person skilled in the art. The techniques described in this document are simply non-limiting examples of how the game data processing function 23 and the game rendering processing function 24 may be performed.

When the game data processing function 23 is performed, the user input received via the internal game controller 13 or the external game controller 17 (if any) and the game data 20 is processed. More specifically, as the user 1 plays the video game, the user 1 inputs various commands via the internal game controller 13 or the external game controller 17 such as move left, move right, move front, move back, jump, shoot, to name a few examples. In response to the received user input, the game data processing function 23 may update the game data 20. In other words, the environment object data 48, the level data 44 and/or the game object data 46 may be updated in response to user input received via the internal game controller 13 or the external game controller 17. It should be appreciated that on some occasions when the game data processing function 23 is performed, there may not be any user input received via the internal game controller 13 or the external game controller 17. Regardless of whether or not user input is received, the game data 20 is processed and may be updated. Such updating of the game data 20 may be in response to representations and/or attributes of the environment object data 48, the level data 44 and/or the game object data 46 as the representations and/or attributes may specify updates to the game data 20. For example, timer data may specify one or more timers (e.g., elapsed time, time since a particular event, virtual time of day, etc.), which may cause the game data 20 (e.g., the object data 42 (including the environment object data 48 and/or the game object data 46) and/or the level data 44) to be updated. By way of another example, objects not controlled by the user 1 may collide (bounce off, merge, shatter, etc.), which may cause the game data 20 e.g., the object data 42 (including the environment object data 48 and/or the game object data 46) and/or the level data 44 to be updated in response to a collision.

Figure 8:
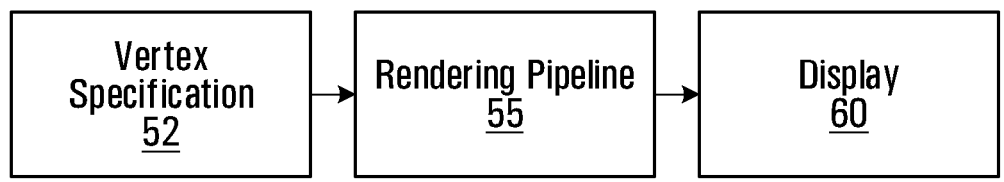
FIG. 8 is an example of a process of converting a 3D graphics scene to a game image for display on a display device, in accordance with a non-limiting embodiment.

In general, the game data 20 (e.g., the representations and/or attributes of the objects and/or levels) represents data that specifies a three-dimensional (3D) graphics scene of the game. The process of converting a three-dimensional (3D) graphics scene, which may include one or more 3D graphics objects, into two-dimensional (2D) rasterized game image for display on the internal display device 15 or the external display device 16 is generally referred to as rendering. FIG. 8 illustrates an example of a process of converting a 3D graphics scene to a game image for display on the internal display device 15 or the external display device 16 via the screen. At step 52, the game data processing function 23 processes the data that represents the three-dimensional (3D) graphics scene of the game and converts this data into a set of vertex data (also known as a vertex specification). The vertex data is suitable for processing by a rendering pipeline (also known as a graphics pipeline). At step 55, the game rendering processing function 24 processes the vertex data according to the rendering pipeline. The output of the rendering pipeline is typically pixels for display on the internal display device 15 or the external display device 16 via the screen (step 60).

More specifically, at step 52, the 3D graphics objects in the graphics scene may be subdivided into one or more 3D graphics primitives. A primitive may refer to a group of one or more vertices that are grouped together and/or connected to define a geometric entity (e.g., point, line, polygon, surface, object, patch, etc.) for rendering. For each of the 3D graphics primitives, vertex data is generated at this step. The vertex data of each primitive may include one or more attributes (e.g., position, the color, normal or texture coordinate information, etc.). In deriving the vertex data, a camera transformation (e.g., rotational transformations) may occur to transform the 3D graphics objects in the 3D graphics scene to the current view or camera angle. Also, in deriving the vertex data, light source data (e.g., direction, position, color and/or intensity) may be taken into consideration. The vertex data derived at this step is typically an ordered list of vertices to be sent to the rendering pipeline. The format of the ordered list typically depends on the specific implementation of the rendering pipeline.

At step 55, the game rendering processing function 24 processes the vertex data according to the rendering pipeline. Non-limiting examples of known rendering pipelines include OpenGL and DirectX. Regardless of the specific rendering pipeline used to implement the rendering pipeline, the general process of the rendering pipeline is to create a 2D raster representation (e.g., pixels) of a 3D scene. The rendering pipeline in general calculates the projected position of the vertex data in to 2D screen space and performs various processing which may take into consideration lighting, colour, position information, texture coordinates and/or any other suitable process to derive the game image (e.g., pixels) for output on the internal display device 15 or the external display device 16 (step 60).

In some cases, the computing device 10 is distributed between, on the one hand, a server connected to the internet and, on the other, one or more internet appliances also connected to the internet. Plural users may therefore participate in the same video game, and the functionality of the computer-readable instructions 18 (the game rendering processing function 24 and/or the game data processing function 23) may be executed at least in part by the server.

Figure 9:
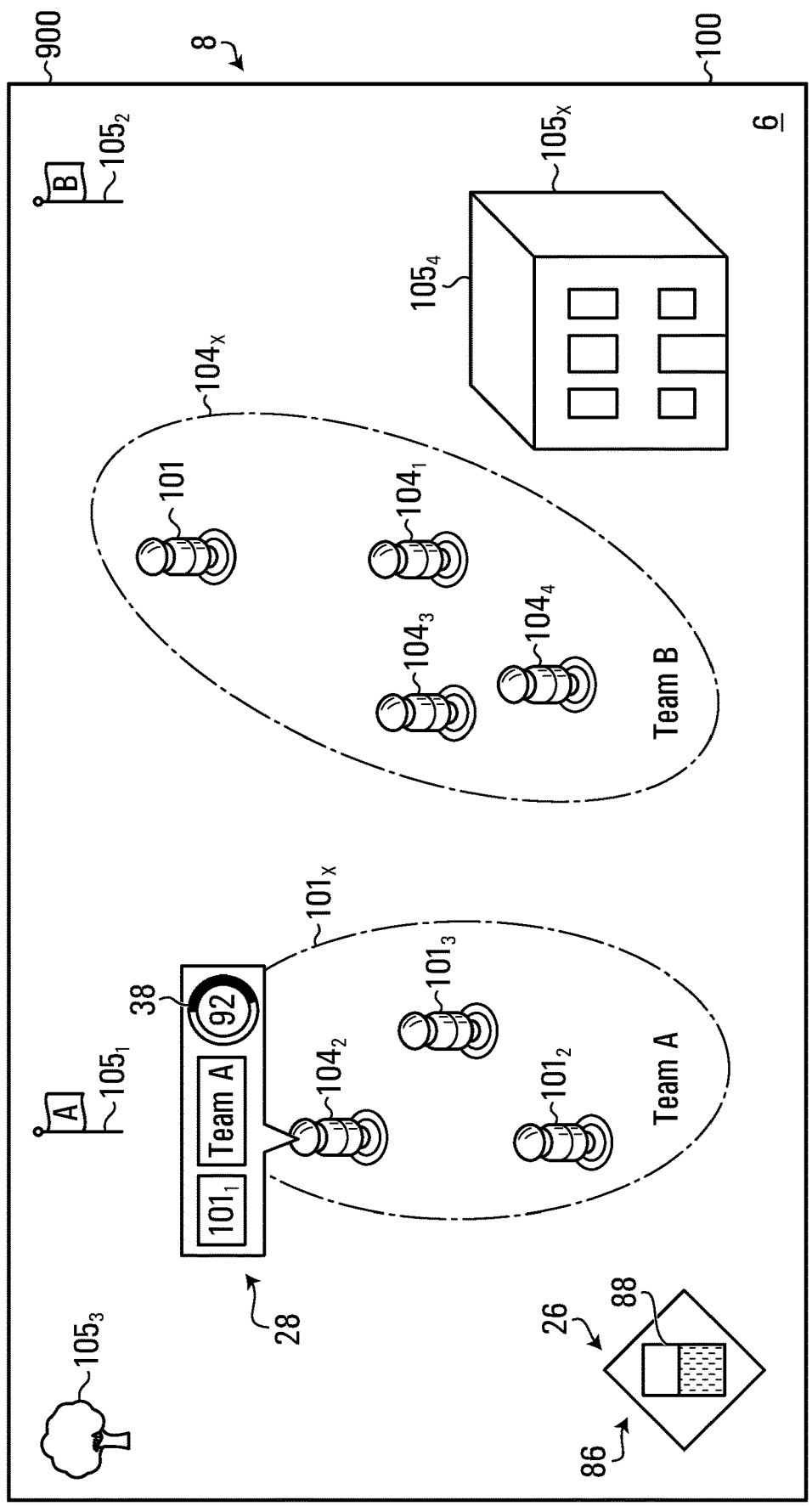
FIG. 9 is a first scene of a virtual space of a gaming environment as displayed on a screen of the computing device of FIG. 1, in accordance with a non-limiting embodiment.

A gaming environment 8 of a video game may comprise a virtual space 6 which may be a 2D or 3D virtual space that includes various objects such as game objects (e.g., PCs, NPCs), environment objects and other objects, as previously described. With reference to FIG. 9, there is shown a non-limiting example of a scene 900 displayed on the screen 100 of the internal display device 15 or the external display device 16 of the computing device 10. The scene 900 comprises a plurality of objects in the virtual space 6 of the gaming environment 8 of a video game, namely game objects $101_1$, $101_2$, $101_3$, $104_1$, $104_2$, $104_3$, $104_4$ and environment objects $105_1$, $105_2$, $105_3$ and $105_4$.

The scene 900 shows a portion of the gaming environment 8 from the perspective of a virtual camera 19 in the gaming environment 8.

In some embodiments, the virtual camera 19 may provide an elevation view of the gaming environment 8. In other embodiments, the virtual camera 19 may provide a plan view of the gaming environment 8. In yet other embodiments, the virtual camera 19 may provide a perspective view of the gaming environment 8 (e.g., an isometric perspective view, a trimetric perspective view or a dimetric perspective view). The virtual camera 19 may provide any other suitable view of the gaming environment 8.

With further reference to FIG. 9, in this example, the game object $101_1$ is a PC associated with the user 1. The game object $101_1$ may be represented by a character such as a person, an avatar, an animal, to name a few non-limiting examples. In some embodiments, the character may be selected by the user 1 during the initialization phase of the video game whereas in other embodiments, the character may be assigned to the user 1 by the video game, during the initialization phase of the video game.

In this embodiment, certain actions and attributes of the game object $101_1$ may be controlled by the user 1. In this example, a position of the game object $101_1$ in the virtual space 6 of the gaming environment 8 may be controlled by user input. Accordingly, the user 1 may provide input via the internal game controller 13 or the external game controller 17 of the computing device 10 wherein the user input comprises a command to control the position of the game object $101_1$ in the virtual space 6 of the gaming environment 8. In response to the user input, the position of the game object $101_1$ in the virtual space 6 of the gaming environment 8 may change.

With continued reference to FIG. 9, in some embodiments, the game object $104_1$ may be a PC controlled by another user (i.e., a user other than the user 1) who is playing the video game from their own device at the same time as the user 1 is playing the video game using the computing device 10. In other embodiments, the game object $104_1$ may be an NPC. In embodiments where the game object $104_1$ is an NPC, a position of the game object $104_1$ in the virtual space 6 of the gaming environment 8 is controlled without user input. For example, the position of the game object $104_1$ may be controlled by an autonomous engine (bot) implemented as part of the computer-readable instructions 18 executed by the processor 11.

For the purposes of simplifying the present description, but without limitative effect, the game object $101_1$ will be deemed a lead game object $101_1$, the game objects $101_2$, $101_3$ will be deemed ally game objects $101_x$ and the game objects $104_1$, $104_2$, $104_3$, $104_4$ will be deemed opponent game objects $104_x$.

In accordance with an embodiment of the present disclosure, gameplay of the user 1 may be advanced by changes in state of the one or more opponent game objects $104_x$. Such changes in state of the one or more opponent game objects 104 are indicative of the lead game object $101_1$ "damaging" or "killing" the one or more opponent game objects $104_x$. The lead game object $101_1$ "damaging" or "killing" the one or more opponent game objects $104_x$ (or the state of the one or more opponent game objects $104_x$ changing) will hereinafter be referred to as the lead game object $101_1$ "attacking" the one or more opponent game objects $104_x$.

In some embodiments, the gameplay of the user 1 may be further advanced using a point-based system. For instance, in some cases, the lead game object $101_1$ attacking the one or more opponent game objects $104_x$ may result in points being added to a score associated with the user 1. The score may be stored in the memory 12, for example, as shown in column 1011 of a table 1000 shown in FIG. 10. Details regarding the table 1000 will be provided further below.

As part of a video game process 1900, the user 1 associated with/controlling the lead game object $101_1$ is not required to provide input via the internal game controller 13 or the external game controller 17 of the computing device 10 in order for the lead game object $101_1$ to attack the one or more opponent game objects $104_x$. For example, the user 1 associated with/controlling the lead game object $101_1$ is not required to tap the screen 100 or to press a button of the internal game controller 13 or the external game controller 17 in order for the lead game object $101_1$ to attack the one or more opponent game objects $104_x$.

Rather, as part of the video game process 1900, if certain conditions are met, attacks by the lead game object $101_1$ against the one or more opponent game objects $104_x$ are executed automatically on behalf of the user 1 (these conditions will be described in detail further below). Such automatic execution of attacks on behalf of the user 1 significantly simplifies control of the video game as the user 1 is not required to provide input to initiate/execute the attacks. In order to further simplify control of the video game, the one or more opponent game objects $104_x$ damaged or killed during an attack may be selected autonomously as part of the execution of the video game process 1900, without user input.

In some embodiments, the game objects in the virtual space 6 of the gaming environment 8 may be divided into two or more teams competing against each other. For example, a pair of competing teams may be defined, hereinafter denoted team "A" and team "B" as shown in FIG. 9.

In the illustrated embodiment of FIG. 9, the game objects $101_1$, $101_2$, and $101_3$ are associated with Team A and the game objects $104_1$, $104_2$, $104_3$, $104_4$ are associated with Team B. In other words, Team A comprises a first subset of the game objects included in the game data 20 (namely the game objects $101_1$, $101_2$, and $101_3$) and Team B comprises a second subset of the game objects included in the game data 20 (namely the game objects $104_1$, $104_2$, $104_3$, $104_4$). The association between the game objects and their respective teams is stored in the memory 12.

In this example, a gameplay session may comprise the game objects $101_1$, $101_2$, and $101_3$ associated with Team A attacking the game objects $104_1$, $104_2$, $104_3$, $104_4$ associated with Team B in view of damaging or killing the game objects $104_1$, $104_2$, $104_3$, $104_4$ associated with Team B. Additionally, the gameplay session also comprises the game objects $104_1$, $104_2$, $104_3$, $104_4$ associated with Team B attacking the game objects $101_1$, $101_2$, and $101_3$ associated with Team A in view of damaging or killing the game objects $101_1$, $101_2$, and $101_3$ of Team A.

In some embodiments, multiple users (analogous to the user 1) may play the video game. As such, the video game can be a multi-player video game, with each user being associated with one of the teams by way of a game object that he or she controls. Alternatively or additionally, certain game objects associated with the teams may be controlled by an autonomous engine (bot) implemented as part of the computer-readable instructions 18 executed by the processor 11. For the purposes of the present description, it is assumed that game objects $101_1$, $101_2$, $104_1$ and $104_2$ are controlled by users (the lead game object $101_1$ being controlled by the user 1 and the game objects $101_2$, $104_1$ and $104_2$ each being controlled by a user other than the user 1) whereas the game objects $101_3$, $104_3$ and $104_4$ are controlled by the autonomous engine implemented as part of the video game process 1900.

A graphical user interface (GUI) 26 of the video game may be configured to display information related to certain game objects in the virtual space 6 of the gaming environment 8 on the screen 100 of the internal display device 15 or the external display device 16 of the computing device 10. For example, the GUI 26 of the video game may be configured to display a name associated with a game object, an identifier associated with a game object, or any other identification means which may be associated with a game object in the virtual space 6 of the gaming environment 8. In some cases, the name or the identifier may be user-selected whereas in other cases the name or the identifier may be assigned to a game object without user-selection as part of the initialization of the game.

Accordingly, each game object in the virtual space 6 may comprise a corresponding indicator 28 displayed on the screen 100 of the internal display device 15 or the external display device 16 of the computing device 10. Each indicator 28 may display a name or an identifier associated with the game object to which it corresponds. In accordance with a non-limiting example, in FIG. 9 an indicator 28 associated with game object $101_1$ is shown.

In some embodiments, each indicator 28 may be fixed to a position of the game object in the virtual space 6 to which it corresponds such that as the position of the game object changes in the virtual space 6, a position of the corresponding indicator 28 also changes in the virtual space 6.

In some embodiments, the GUI 26 of the video game may be configured to display information identifying the team with which a game object is associated. In one example of implementation of this embodiment, each team may be associated with a color ("a team color"). Accordingly, the indicator 28 corresponding to a game object may comprise the team color.

The GUI 26 may be configured to display information related to a name, an identifier or a team associated with each game object in any other suitable fashion. The GUI 26 may also be configured to display other information related to each game object in the virtual space 6 of the gaming environment.

As shown in FIG. 9, the virtual space 6 of the gaming environment 8 also includes the environment objects $105_1$, $105_2$, $105_3$ and $105_4$ (namely flags $105_1$, $105_2$, a tree $105_3$ and a building $105_4$).

In some embodiments, certain ones of the environment objects may be associated with a team (for example, a given one of Team A or Team B) such that a user's gameplay may be advanced by the game object he or she controls attacking these environment objects. In this example, the flag $105_1$ is associated with Team A and the flag $105_2$ is associated with Team B.

It should be appreciated that there is no particular limitation on the number of teams, the number of game objects per team, the number of users participating in the multi-player video game and controlling a game object, the number of game objects controlled by the autonomous engine or the number of environment objects.

The game data 20 stored in the memory 12 defines the virtual space 6 of the gaming environment 8 including the game objects $101_1$, $101_2$, $101_3$, $104_1$, $104_2$, $104_3$ and $104_4$, and the environment objects $105_1$, $105_2$, $105_3$ and $105_4$.

With reference to FIG. 10, the table 1000 stored in the memory 12 may contain information regarding each game object included in the game data 20. In the table 1000, each game object included in the game data 20 may be identified by its name, its identifier or other identification criteria (as shown in FIG. 10, in column 1001). The table 1000 may also contain information regarding the association of each game object with its respective team (as shown in FIG. 10, in column 1002). The table 1000 may further include an indication of whether a game object is an PC or an NPC and, in the case of a PC, the table 1000 may also contain an indication of the user associated with the game object (as shown in FIG. 10, in column 1003).

Aspects of the video game process 1900 will be described below with respect to the lead game object $101_1$ attacking the one or more game objects $104_x$. A skilled reader will appreciate, however, that the following description of the video game process 1900 may relate in general to any game object attacking any number of the other game objects in the virtual space 6.

As indicated above, as part of the video game process 1900, if certain conditions are met, attacks by the lead game object $101_1$ against the one or more opponent game objects $104_x$ are executed automatically on behalf of the user 1. In this embodiment, as part of the video game process 1900, attacks against the one or more opponent game objects $104_x$ are executed automatically on behalf of the user 1 if the one or more opponent game objects $104_x$ are within sufficient proximity of the lead game object $101_1$ in the virtual space 6.

In the virtual space 6, the sufficient proximity of the one or more opponent game objects $104_x$ to the lead game object $101_1$ may be characterized as the one or more opponent game objects $104_x$ having a position in the virtual space 6 of the gaming environment 8 that is within a zone associated with the lead game object $101_1$. This zone may be referred to as an "event zone" (hereinafter, "event zone 102").

In this embodiment, the event zone 102 is associated with the position of the lead game object $101_1$ in the virtual space 6 of the gaming environment 8. In some cases, the event zone 102 may be fixed to the position of the lead game object $101_1$. As a result, in response to user input, the user input comprising a command to control the position of the lead game object $101_1$ in the virtual space 6 of the gaming environment 8, a position of the event zone 102 in the virtual space 6 of the gaming environment 8 may also change.

Figure 11:
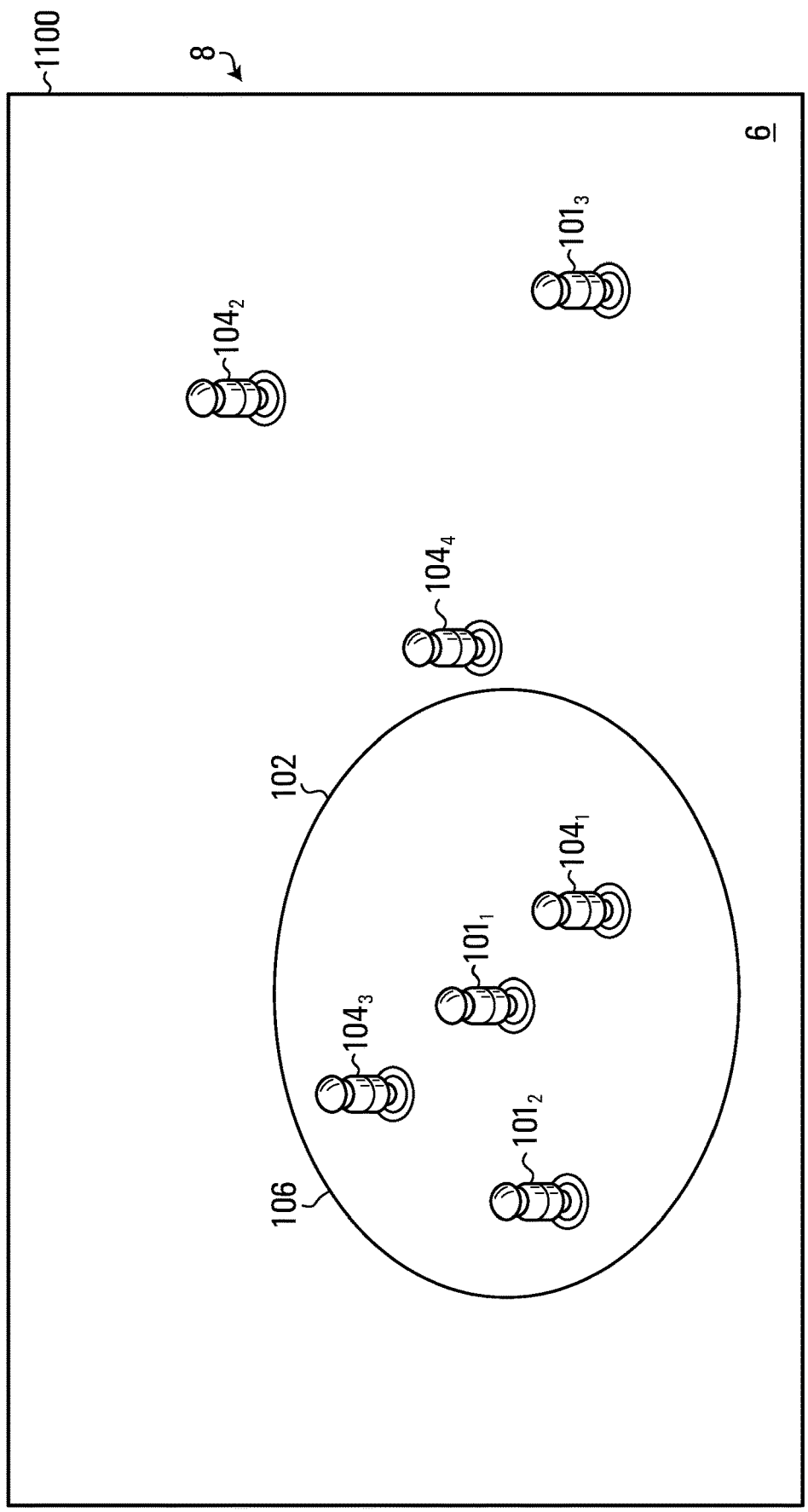
FIG. 11 is a second scene of the virtual space of the gaming environment as displayed on the screen of the computing device of FIG. 1, in accordance with a non-limiting embodiment.

A visual representation of the event zone 102 may be displayed on the screen 100 of the internal display 15 or external display device 16 of the computing device 10. With reference to FIG. 11, there is shown in a non-limiting example of a scene 1100 displayed on the screen 100 of the internal display device 15 or the external display device 16 of the computing device 10. In the scene 1100, the visual representation of the event zone 102 comprises a perimeter 106 surrounding the lead game object $101_1$. Thus, as part of the video game process 1900, attacks by the lead game object $101_1$ against the one or more opponent game objects $104_x$ are executed automatically on behalf of the user 1 if the one or more opponent game objects $104_x$ have a position in the virtual space 6 of the gaming environment 8 that is within the event zone 102. In the illustrated embodiment of FIG. 11, attacks by the lead game object $101_1$ against the one or more opponent game objects $104_x$ are executed automatically on behalf of the user 1 if the one or more opponent game objects $104_x$ have a position in the virtual space 6 of the gaming environment 8 that is within the perimeter 106 of the event zone 102 as displayed on the screen 100 of the internal display 15 or the external display device 16 of the computing device 10.

Each game object included in the game data 20 may be associated with an event zone 102 such that an association between the game object and its respective event zone 102 is stored in the memory 12. In some embodiments directed to a multi-player video game, the visual representation of the event zone 102 associated with each game object in the virtual space 6 of the gaming environment 8 may be visible to all users playing the multi-player video game.

In other embodiments directed to a multi-player video game, a user may only see the visual representation of the event zone 102 of the game object that he or she is controlling such that the visual representation of the event zone 102 associated with other game objects in the virtual space 6 of the gaming environment 8 is not displayed on the screen 100 of the internal display device 15 or the external display device 16 of the computing device 10.

The event zone 102 may be associated with a set of spatial coordinates $\{XYZ_{102}\}$ and an indication of the set of spatial coordinates $\{XYZ_{102}\}$ may be stored in the memory 12. This indication may take the form of the spatial coordinates of the perimeter (boundary) 106, with the understanding that any point within this boundary is considered to be in the set of spatial coordinates $\{XYZ_{102}\}$. A composition of the set of spatial coordinates $\{XYZ_{102}\}$ associated with the event zone 102 is configured to change in response to the position of the event zone 102 in the virtual space 6 of the gaming environment 8 being changed.

The position data 32 associated with each game object and stored in the memory 12 may include an indication of spatial coordinates $XYZ_{GO}$ associated with each game object in the virtual space 6. In some embodiments, in order to determine if the one or more opponent game objects $104_x$ have a position within the virtual space 6 of the gaming environment 8 that is within the event zone 102, as part of the video game process 1900, a determination is made as to whether the spatial coordinates $XYZ_{GO}$ of the one or more opponent game objects $104_x$ is in the set of spatial coordinates $\{XYZ_{102}\}$ associated with the event zone 102.

In addition to the visual representation of the event zone 102 discussed above, the event zone 102 may also have non-visual representations such as numeric, geometric or mathematical representations. As shown in FIG. 5, the object data 42 may include event zone data 70 which stores data relating to the current representation of the event zone 102 such as the graphical representation in a game image frame or a numeric, geometric or mathematical representation.

Figure 12:
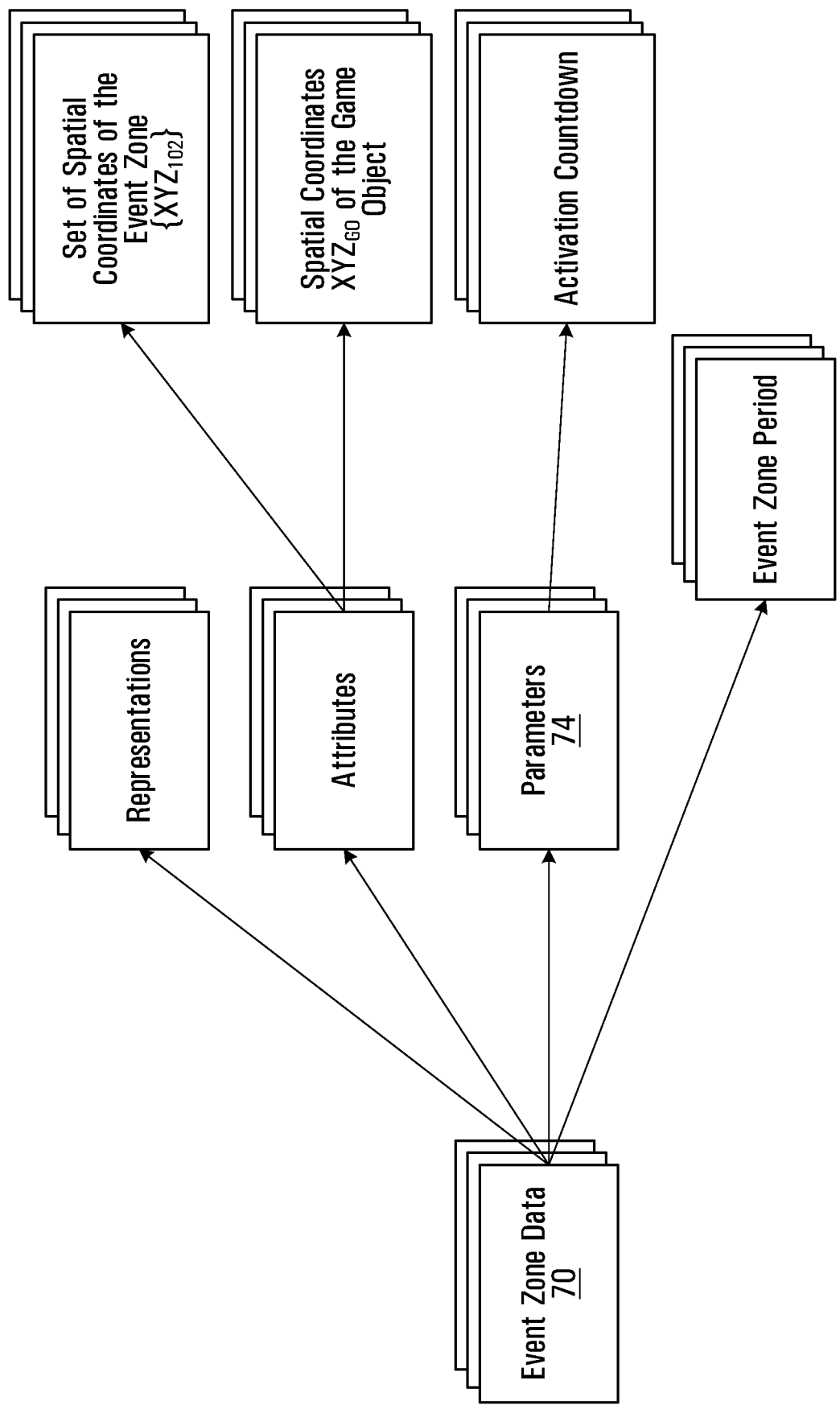
FIG. 12 is a block diagram conceptually illustrating examples of event zone data, in accordance with a non-limiting embodiment.

As shown in FIG. 12, the event zone 102 may also comprises attributes. Certain attributes of the event zone 102 may be controlled by the user 1 (for example, via the internal game controller 13 or the external game controller 17 of the computing device 10) whereas certain attributes of the event zone 102 may be controlled by the video game process 1900.

The event zone data 70 may also store attributes such as imaging data, position data (including the indication of the set of spatial coordinates $\{XYZ_{102}\}$ associated with the event zone 102 and/or an indication of the spatial coordinates $XYZ_{GO}$ of the game object to which the event zone 102 is associated, such as for example the spatial coordinates $XYZ_{GO}$ of lead game object $101_1$), material/texture data, physical state data, color data, visibility data, lighting data (e.g., direction, position, color and/or intensity), sound data, motion data, collision data, environment data and/or other data associated with the event zone.

As shown in FIG. 10, the table 1000 may also include an indication of the spatial coordinates $XYZ_{GO}$ associated with each game object as well as the composition of the set of spatial coordinates $\{XYZ_{102}\}$ associated with the event zone 102 at any given time during the gameplay session (FIG. 10, columns 1004, 1009 respectively).

Additionally, in this embodiment, as part of the video game process 1900, attacks by the lead game object $101_1$ against the one or more opponent game objects $104_x$ are executed automatically on behalf of the user 1 if the one or more opponent game objects $104_x$ have a position in the virtual space 6 of the gaming environment 8 that is within the event zone 102 when the event zone is activated.

Also, in this embodiment, the video game process 1900 comprises repeatedly activating the event zone 102 in the virtual space 6 such that for the one or more opponent game objects $104_x$ having a position in the virtual space 6 that is within the event zone 102 when the event zone 102 is activated, the one or more opponent game objects $104_x$ are attacked by the lead game object $101_1$. In other words, in this embodiment, the event zone 102 is configured to be repeatedly activated (regardless of whether the one or more opponent game objects $104_x$ have a position in the virtual space that is within the event zone 102) however attacks against the one or more opponent game objects $104_x$ may occur only if the one or more opponent game objects $104_x$ have a position in the virtual space 6 that is within the event zone 102 when the event zone 102 is activated.

An "event zone period" is defined as an interval of time between repeated activations of the event zone 102 associated with the lead game object $101_1$.

In some embodiments, the event zone period may be regular such that the event zone period is of a fixed length of time and repeatedly activating the event zone 102 comprises activating the event zone 102 at intervals of a fixed length of time (i.e., regular time intervals).

In other embodiments, the event zone period may be irregular such that the event zone period is of fluctuating lengths of time and repeatedly activating the event zone 102 comprises activating the event zone 102 at intervals of fluctuating lengths of time (i.e., irregular time intervals).

In yet other embodiments, the event zone period may be variable such that the event zone period is of variable lengths of time and repeatedly activating the event zone 102 comprises activating the event zone at intervals of variable lengths of time. A variability of the event zone period may be dependent on user input and/or gameplay, to name a few non-limiting examples.

In some embodiments, as shown in FIG. 12, the event zone data 70 may include one or more parameters 74 related to the event zone 102. For instance, the event zone data 70 may include one or more parameters 74 related to the event zone period of the event zone 102.

For example, the event zone data 70 may include a parameter 74 indicative of whether the event zone period is regular, irregular or variable. In yet another example, the event zone data 70 may include a parameter 74 indicative of a length of time associated with a regular event zone period. In yet a further example, the event zone data 70 may include a parameter 74 indicative of a length of time associated with each event zone period of an irregular event zone period. In general, the event zone data 70 may include a parameter 74 indicative of a length of time of an event zone period.

The one or more parameters 74 included in the event zone data 70 indicative of a length of time associated with an event zone period may be defined by values comprising a magnitude and a unit of time. The values of the one or more parameters 74 included in the event zone data 70 associated with the event zone 102 for each game object included in the game data 20 may be encoded by a game designer at the time of game design.

The event zone data 70 may also include a parameter 74 related to the variability of the event zone period. For example, the variability of the event zone period may be dependent upon the score associated with the user 1. For instance, an increase in the score associated with the user 1 may involve a reduction of the length of time associated with the event zone period of the event zone 102. A decrease in the length of time associated with the event zone period may result in automatic attacks of the one or more opponent game objects $104_x$ occurring more frequently. Thus, in this case, the event zone data 70 may include a parameter 74 related to the variability of the event zone period as a function of the score of the user 1.

A countdown may be associated with the event zone period, the countdown being indicative of a time remaining in a current event zone period/a time remaining before the next activation of the event zone 102. The countdown may be referred to as an "activation countdown".

Throughout each event zone period, the activation countdown is decremented such that the activation countdown is one unit of time closer to elapsing. The activation countdown is configured to elapse and reset as the event zone 102 is activated. Thus, a beginning of the activation countdown corresponds to an end of a previous event zone period/a beginning of a current event zone period and the activation countdown elapsing corresponds to an end of the current event zone period/a beginning of a following event zone period.

Accordingly, the activation countdown may be a parameter 74 of the event zone data 70 indicative of a time remaining in a current event zone period/a time remaining before the next activation of the event zone 102. The activation countdown may be implemented by a timer included in the game data 20 stored in the memory 12. The game data 20 may also include other timers, such as, a timer associated with the beginning of the gameplay session, which tracks elapsed gameplay time.

Thus, repeatedly activating the event zone 102 comprises repeatedly changing certain ones of the one or more event zone parameters 74 included in the event zone data 70 stored in the memory 12. For example, in this embodiment, repeatedly activating the event zone 102 comprises repeatedly resetting the activation countdown once the activation countdown elapses. Considered differently, repeatedly activating the event zone 102 comprises repeatedly decrementing the activation countdown by one (or several) unit of time until the activation countdown elapses.

As previously indicated, in this embodiment, the video game process 1900 comprises repeatedly activating the event zone 102 in the virtual space 6 such that for the one or more opponent game objects 104$_x$ having a position in the virtual space 6 that is within the event zone 102 when the event zone 102 is activated, the one or more opponent game objects 104$_x$ are attacked by the lead game object 101$_1$. As was also previously indicated, the lead game object 101$_1$ "damaging" or "killing" the one or more opponent game objects 104$_x$ (or the state of the one or more opponent game objects 104 changing) is referred to as the lead game object 101$_1$ "attacking" the one or more opponent game objects 104$_x$.

Thus, in this embodiment, the video game process 1900 comprises repeatedly activating the event zone 102 in the virtual space 6 such that for the one or more opponent game objects 104$_x$ having a position in the virtual space 6 that is within the event zone 102 when the event zone 102 is activated, the state of the one or more opponent game objects 104$_x$ in the virtual space 6 is changed.

The game object data 42 for each game object included in the game data 20 in the memory 12 may include one or more game object parameters 76, the one or more game object parameters 76 being indicative of the state of the game object.

Accordingly, to change the state of the one or more opponent game objects 104$_x$ having a position in the virtual space 6 that is within the event zone 102 when the event zone 102 is activated may comprise changing the one or more game object parameters 76. As such, the activation of the event zone 102 may result in a change in the one or more game object parameters 76.

For example, one of the one or more game object parameters 76 may be a health parameter 78 related to a measure of "health" of a game object. The health of a game object may be an indication of the amount of damage a game object has sustained from attacks by other game objects. For example, the health of a game object may decrease as a function of a game object being attacked in the virtual space 6 and sustaining damage. In yet another example, the health of a game object may increase as a function of the game object attacking other game objects, the game object "taking cover"/"hiding" in the virtual space 6 and/or an increase in the score associated with a user controlling the game object.

The health of a game object may be represented by a value stored in a variable included in the memory 12 associated with the health parameter 78. An initial value stored in the variable associated with the health parameter 78 may be encoded by a game designer at the time of game design for each game object included in the game data 20.

The value stored in the memory 12 associated with the health parameter 78 may be incremented or decremented as result of gameplay. For example, the value stored in the memory 12 associated with the health parameter 78 of a game object may be decremented by a given amount, the given amount being a function of the game object being attacked in the virtual space 6 and sustaining damage. In yet another example, the value stored in the memory 12 associated with the health parameter 78 of a game object may be incremented by a given amount, the given amount being a function of the game object successfully attacking another game objects and/or by an increase in the score associated with the user 1 controlling the game object.

In some embodiments, as part of the video game process 1900, to change a state of the one or more opponent game objects 104$_x$ having a position in the virtual space that is within the event zone 102 when the event zone 102 is activated may comprise changing a value associated with the health parameter 78 stored in the memory 12 associated with the one or more opponent game objects 104$_x$.

In some embodiments, the indicator 28 may also comprise an indication of the health of a game object in the virtual space 6 of the gaming environment 8. For example, the indicator 28 may comprise a graphical element 38 which may change as a result of the health parameter 78 being changed. For instance, as shown in the illustrated embodiment of FIG. 9, the graphical element 38 may comprise a variable amount of shading or fill such that an increase in the shading or the fill of the graphical element 38 of the indicator 28 may be associated with the value stored in the memory 12 associated with the variable health parameter 78 being incremented whereas a decrease in the amount of shading or the fill of the graphical element 38 of the indicator may be associated with the value stored in the memory 12 associated with the health parameter 78 being decremented. Any other suitable method of representing a change of the health parameter 78 may be implemented.

In some embodiments, a game object in the virtual space 6 may be characterized as "active" (i.e., "alive") or "inactive" (i.e., "dead").

A game object which is characterized as active may respond to user input (e.g., user input comprising a command to change a position of the game object in the virtual space 6) and the event zone 102 of a game object which is characterized as active may be repeatedly activated (e.g., certain ones of the one or more event zone parameters 74 may be repeatedly changed).

Conversely, a game object which is characterized as inactive may no longer be present or visible in the virtual space 6 of the gaming environment 8. In some instances, the GUI 26 of the video game may be configured to no longer display the indicator 28 corresponding with the game object a game object which is characterized as inactive. In some cases, a game object which is characterized as inactive may be replaced with a virtual corpse object that is displayed in the scene at the location where the game object has "died". Further, a game object which is characterized as inactive may no longer respond to user input (e.g., user input comprising a command to change a position of the game object in the virtual space 6) and the event zone 102 of a game object which is characterized as inactive may no longer be repeatedly activated. As such, the visual representation of the event zone 102 may no longer be present or visible in the virtual space 6 of the gaming environment 8.

Above a threshold level of health, a game object in the virtual space 6 may be characterized as active whereas below the threshold level of health, a game object may be characterized as inactive. The threshold level of health may be defined with respect to the value stored in the memory 12 associated with the health parameter 78 of a game object such that if the value stored in the memory 12 associated with the health parameter 78 of a game object is above a threshold health value, the game object may be characterized as alive and if the value stored in the memory 12 associated with the health parameter 78 of a game object is below the threshold health value, the game object is characterized as inactive. The threshold health value may be selected by a game designer at the time of game design and encoded in the memory 12 as part of the object data 42 for each game object included in the game data 20.

In some embodiments, the one or more game object parameters 76 may comprise a game object state parameter 80 which is indicative of whether a game object is characterized as active or inactive. Accordingly, if the value stored in the memory 12 associated with the health parameter 78 of a game object is above the threshold health value, the game object may be characterized as active and the game object state parameter 80 associated with this game object would be indicative of the game object being in a first state, namely an active state. Conversely, if the value stored in the memory 12 associated with the health parameter 78 of a game object is below the threshold health value, the game object may be characterized as inactive and the game object state parameter 80 associated with this game object would be indicative of the game object being in a second state, namely an inactive state.

In some embodiments, as part of the video game process 1900, to change a state of the one or more opponent game objects $104_x$ having a position in the virtual space that is within the event zone 102 when the event zone 102 is activated may comprise changing the game object state parameter 80 stored in the memory associated with the one or more opponent game objects $104_x$. For example, the game object state parameter 80 may be toggled between a first value indicative of a game object being in a first state (e.g., an "active" state) and a second value indicative of the game object being in a second state (e.g., an "inactive" state).

Considering now a non-limiting example of the opponent game object $104_1$ (controlled by a user 2) having a position within the event zone 102 associated with the lead game object $101_1$ when the event zone 102 is activated and the game object state parameter 80 associated with the opponent game object $104_1$ is changed from the active state to the inactive state. In some embodiments, once the game object state parameter 80 associated with the opponent game object $104_1$ is changed from the active state to the inactive state, the video game process 1900 may be configured to end the gameplay session for the user 2. In other embodiments, once the game object state parameter 80 associated with the opponent game object $104_1$ is changed from the active state to the inactive state, the gameplay session may continue without the opponent game object $104_1$. In yet other embodiments, once the game object state parameter 80 associated with the opponent game object $104_1$ is changed from the active state to the inactive state, the gameplay session may continue without the opponent game object $104_1$ and after a predetermined length of time, the game object state parameter 80 associated with the opponent game object $104_1$ may be changed from the inactive state to the active state. The predetermined length of time may be selected by a game designer at the time of game design and encoded in the memory 12 as part of the object data 42. In some embodiments, the predetermined length of time may change as a function of gameplay.

In some embodiments, the game object state parameter 80 may be changed multiple times throughout the gameplay session.

With further reference to FIG. 10, the table 1000 may contain information related to the gameplay session. For example, as shown in column 1005 of FIG. 10, the table 1000 may contain information indicative of the health of each game object (i.e., information related to health parameter 78 such as the current value associated with the health parameter 78). As shown in FIG. 10, column 1006, the table 1000 may also contain information indicative of the state of each game object (i.e., information related to the game object state parameter 80 such as an indication of whether a game object is currently in the active state or the inactive state). For instance, the table 1000, may also contain information related to a number of times in the gameplay session that the game object state parameter 80 has been changed from the active state to the inactive state, for example as shown in FIG. 10, column 1007. The table 1000 may also contain information related to a length of time associated with current state of each game object, as shown in FIG. 10, column 1008.

Information related to the activation countdown may be provided to the user 1. In this embodiment, as part of the video game process 1900, a marker $103_x$ is displayed on the screen 100 of the internal display device 15 or the external display device 16 of the computing device 10 to provide the user 1 with information related to the activation countdown.

The marker $103_x$ provides the user 1 with information with respect to whether the event zone is currently activated and provides the user 1 an indication of a time remaining in a current event zone period/a time remaining before the next activation of the event zone 102.

In this embodiment, as part of the video game process 1900, the marker $103_x$ is positioned in the virtual space 6 of the gaming environment 8 and a visual representation of the marker $103_x$ is displayed on the screen 100 of the internal display device 15 or the external display device 16 of the computing device 10.

As part of the video game process 1900, a position of the marker $103_x$ relative to at least part of the event zone 102 of the lead game object $101_1$ is changed as the activation countdown elapses. For the purposes of the present description, the marker $103_x$ will be described in association with the event zone 102 of the lead game object $101_1$ however a skilled reader will appreciate that a marker similar to the marker $103_x$ may be associated with an event zone 102 of any game object included in the game data 20.

The position of the marker $103_x$ relative to at least part of the event zone 102 of the lead game object $101_1$ is related to a time remaining in a current event zone period/a time remaining before the next activation of the event zone 102. Thus, changing the position of the marker $103_x$ relative to at least part of the event zone 102 of the lead game object $101_1$ may provide the user 1 an indication of whether the event zone 102 is in the process of being activated and an indication of a time remaining in a current event zone period/an indication of a time remaining before the next activation of the event zone 102.

As part of the video game process 1900, the position of the marker $103_x$ relative to at least part of the event zone 102 may be changed from an initial position to a final position. Thus, changing the position of the marker $103_x$ relative to at least part of the event zone 102 may comprise progressively moving the marker $103_x$ from an initial position to a final position. For instance, an initial position of the marker $103_x$ may correspond to the beginning of the activation countdown and a final position of the marker $103_x$ may correspond with the activation countdown elapsing/the event zone 102 being activated. Thus, the video game process 1900 may comprise synchronizing activation of the event zone 102 of the lead game object $101_1$ with the marker $103_x$ reaching a final position.

A distance $D_x$ involving the marker $103_x$ and at least part of the event zone 102 may be related to whether the event zone is currently activated and a time remaining in a current event zone period and/or a time remaining before the next activation of the event zone 102.

In some embodiments, the distance $D_x$ involving the marker $103_x$ and at least part of the event zone 102 may increase as the time remaining in the current event zone period decreases/the time before the next activation of the event zone 102 decreases. In such embodiments, the distance $D_x$ involving the marker $103_x$ and at least part of the event zone 102 may increase as the position of the marker $103_x$ changes from an initial position to a final position.

In other embodiments, the distance $D_x$ involving the marker $103_x$ and at least part of the event zone 102 may decrease as the time remaining in the current event zone period decreases/the time before the next activation of the event zone 102 decreases. In such embodiments, the distance $D_x$ involving the marker $103_x$ and at least part of the event zone 102 may decrease as the position of the marker $103_x$ changes from an initial position to a final position. In this embodiment, the video game process 1900 may comprise synchronizing activation of the event zone 102 with the distance $D_x$ involving the marker $103_x$ and at least part of the event zone 102 reaching zero. Accordingly, the distance $D_x$ involving the marker $103_x$ and at least part of the event zone 102 reaching zero may be indicative of the event zone being activated.

Figure 13A:
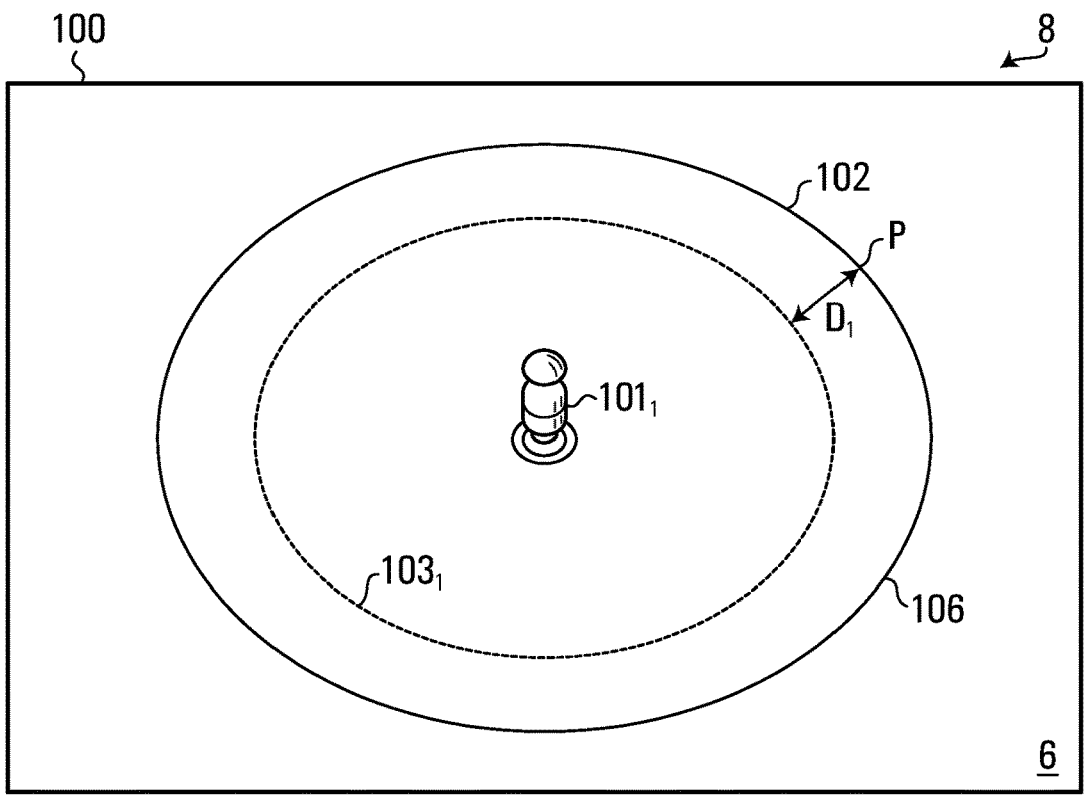
FIGS. 13A and 13B illustrates linear distances between a visual representation of an event zone and a visual representation of a marker, in accordance with a non-limiting embodiment.
Figure 13B:
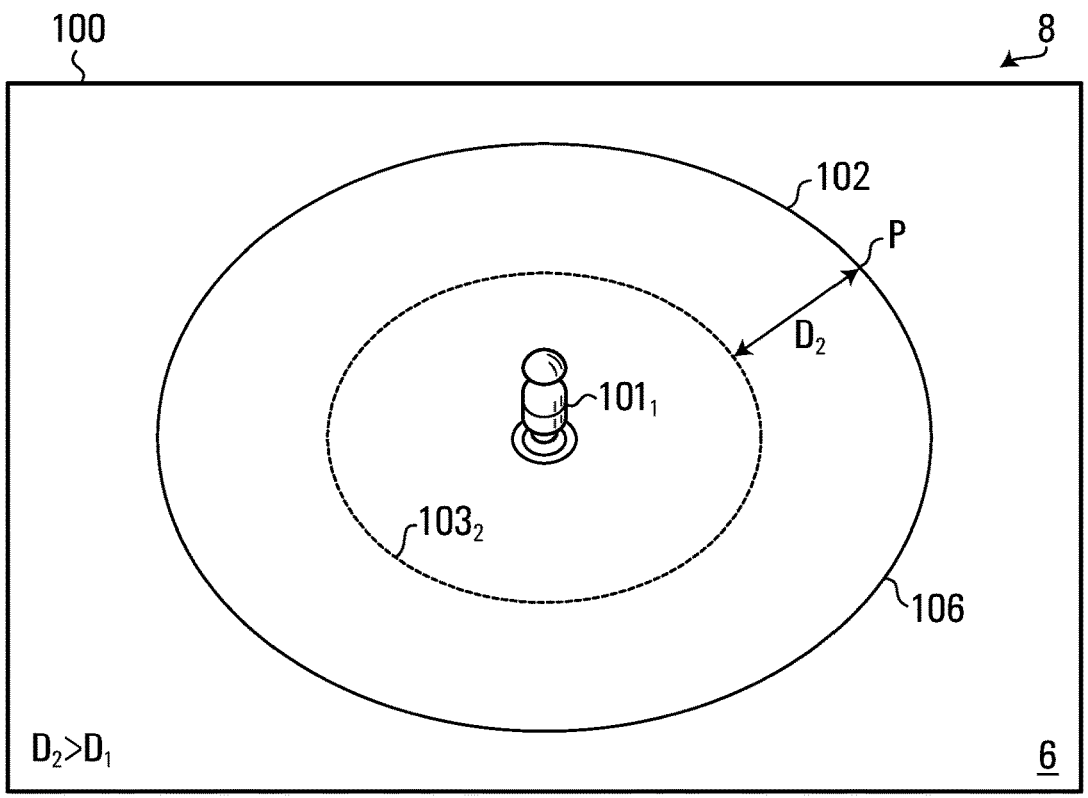
Figure 14A:
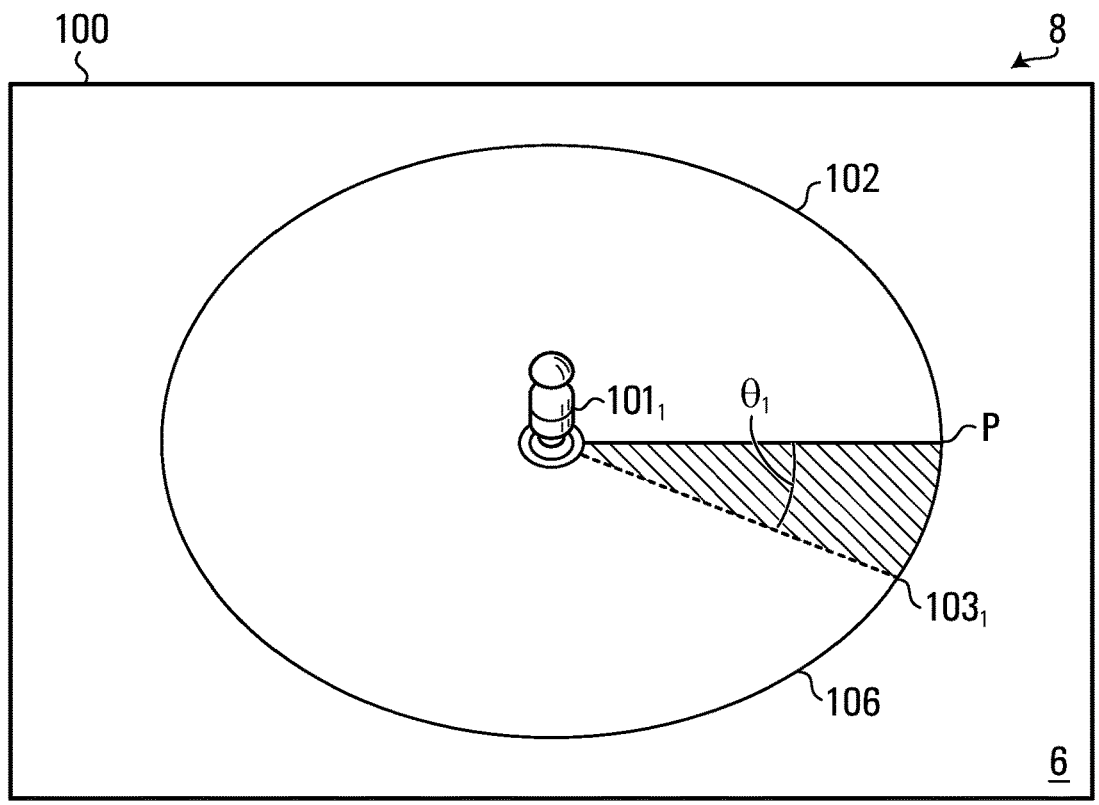
FIGS. 14A and 14B illustrates angular distances between the visual representation of the event zone and the visual representation of the marker, in accordance with a non-limiting embodiment.
Figure 14B:
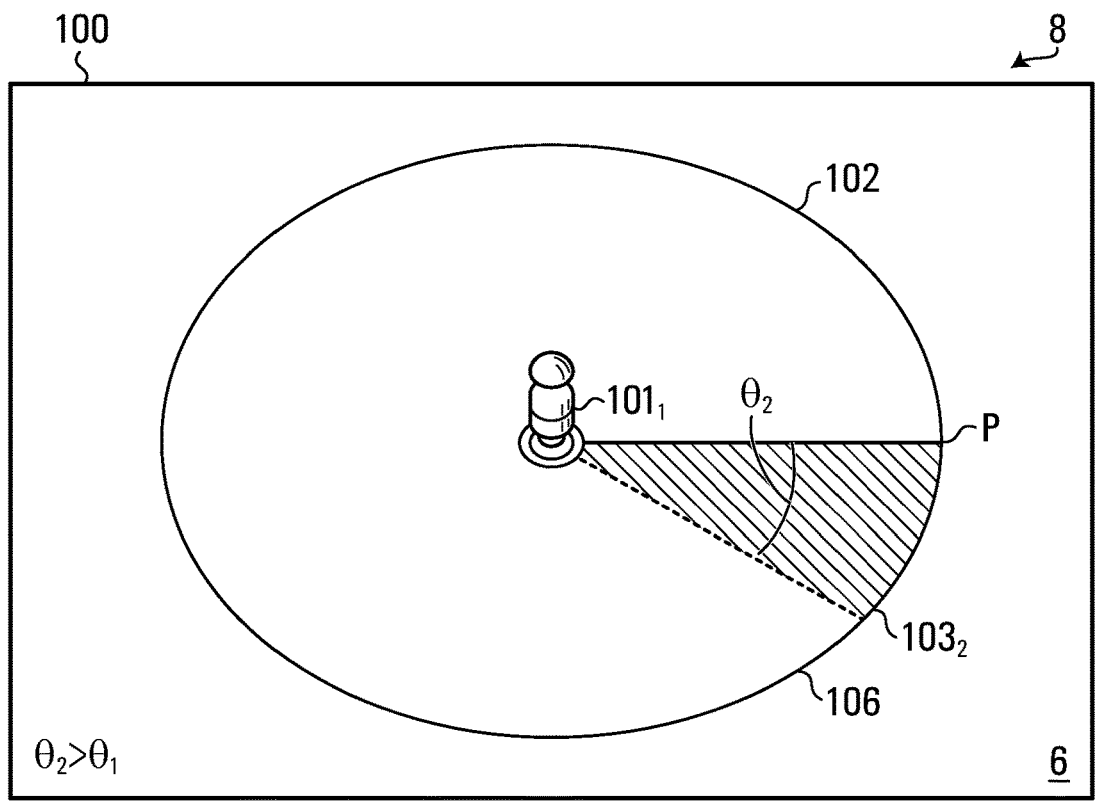
Figure 15A:
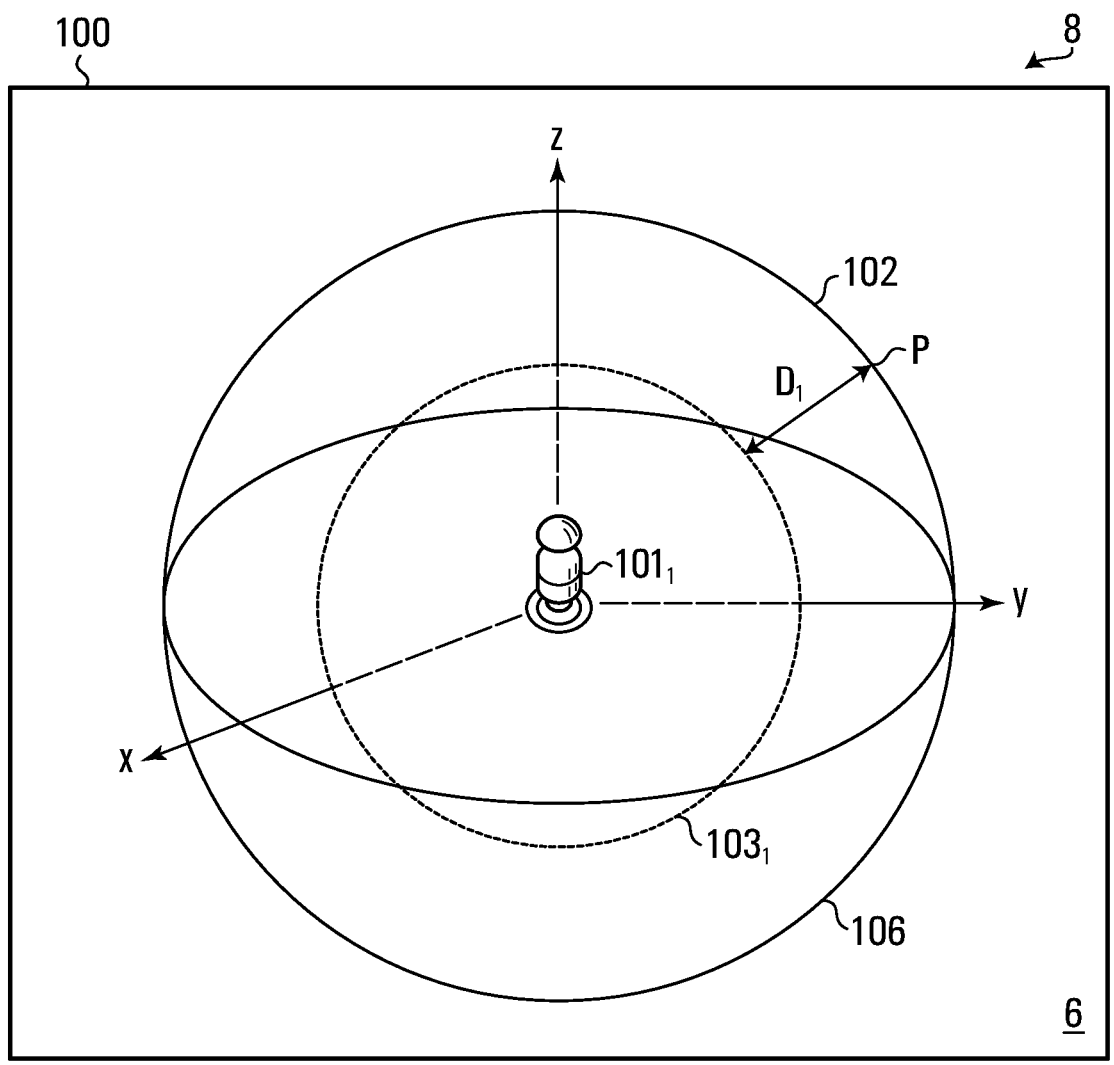
FIGS. 15A and 15B illustrates radial distances between the visual representation of the event zone and the visual representation of the marker, in accordance with a non-limiting embodiment.
Figure 15B:
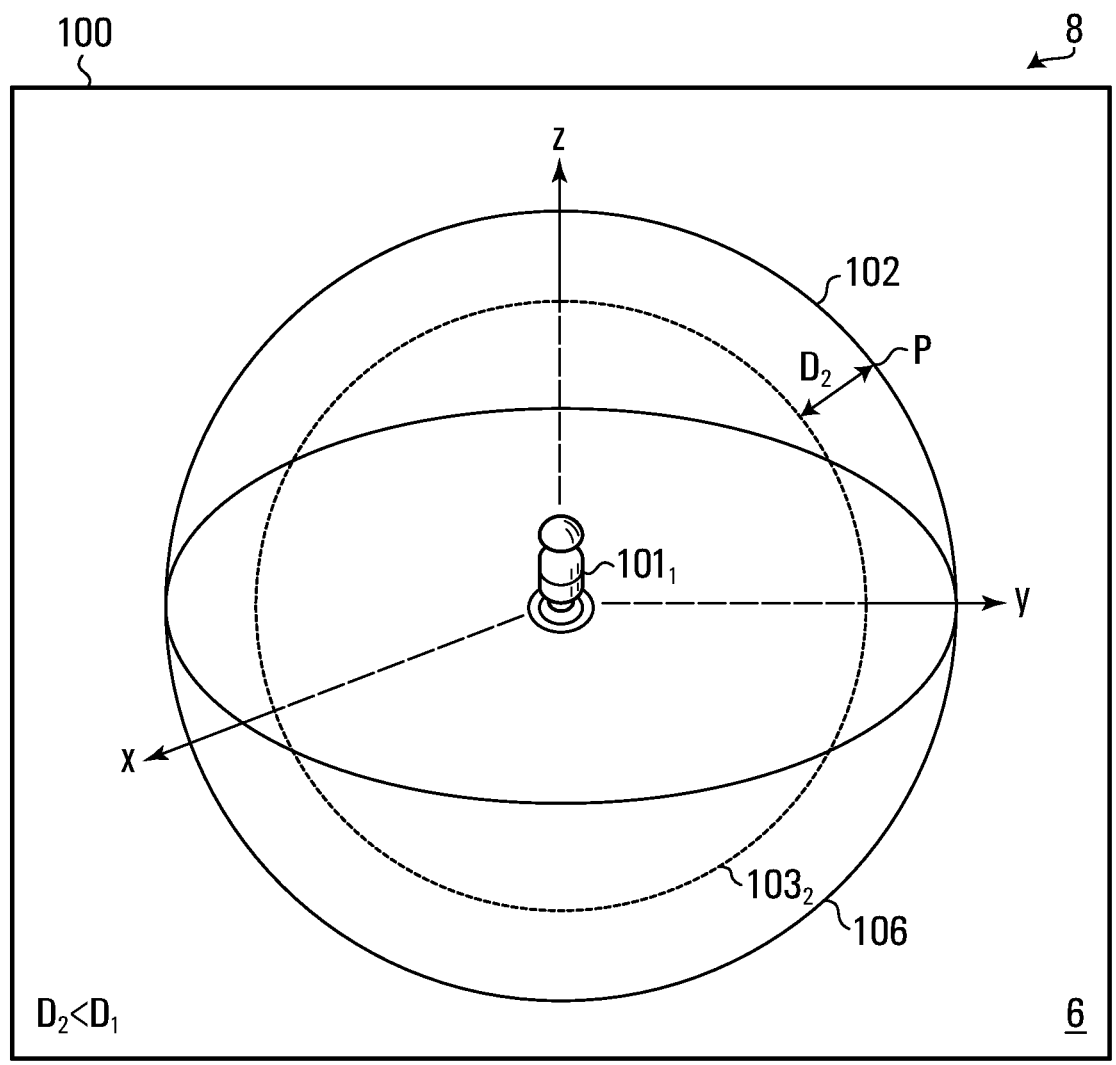

In some embodiments, the perimeter 106 of the event zone 102 of the lead game object $101_1$ may comprise a reference point P such that the distance $D_x$ involving the marker $103_x$ and at least part of the event zone 102 is between the marker $103_x$ and the reference point P. In some embodiments, the distance $D_x$ involving the marker $103_x$ and at least part of the event zone 102 may be a linear distance (including a difference between radii, as shown in FIGS. 13A and 13B). In other embodiments, the distance $D_x$ involving the marker $103_x$ and at least part of the event zone 102 may be an angular distance, as shown in FIGS. 14A and 14B). In yet further embodiments, the distance $D_x$ involving the marker $103_x$ and at least part of the event zone 102 may be a radial distance, as shown in FIGS. 15A and 15B.

Example visual representations of the marker $103_x$ are shown in FIGS. 16B to 16D and 17B to 17D.

Figure 16A:
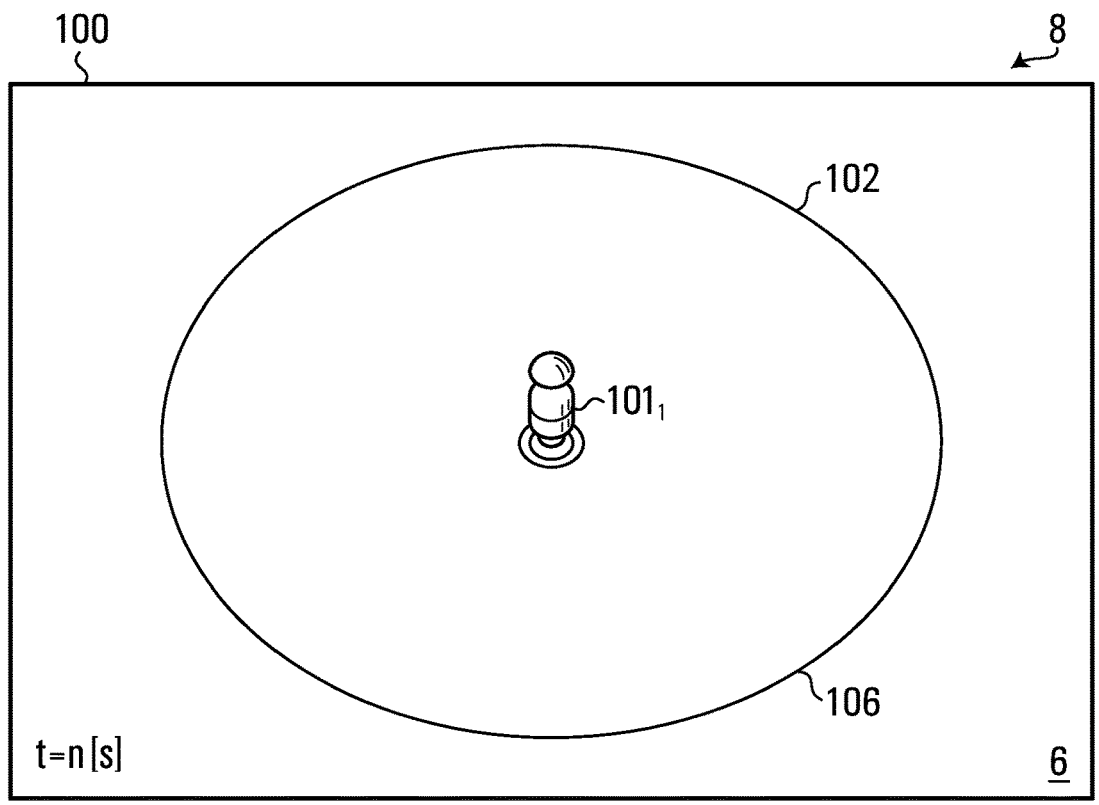
FIGS. 16A, 16B, 16C and 16D is an example the visual representation of the marker moving about a perimeter of the event zone, in accordance with a non-limiting embodiment.
Figure 16B:
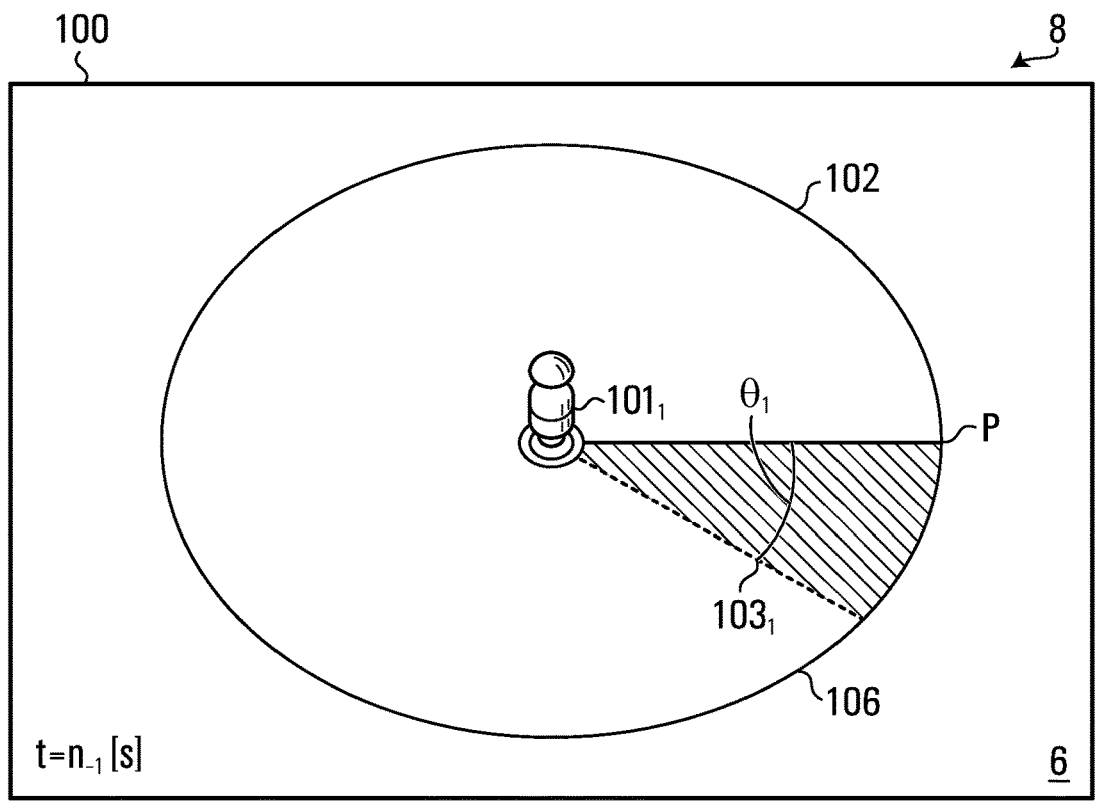
Figure 16C:
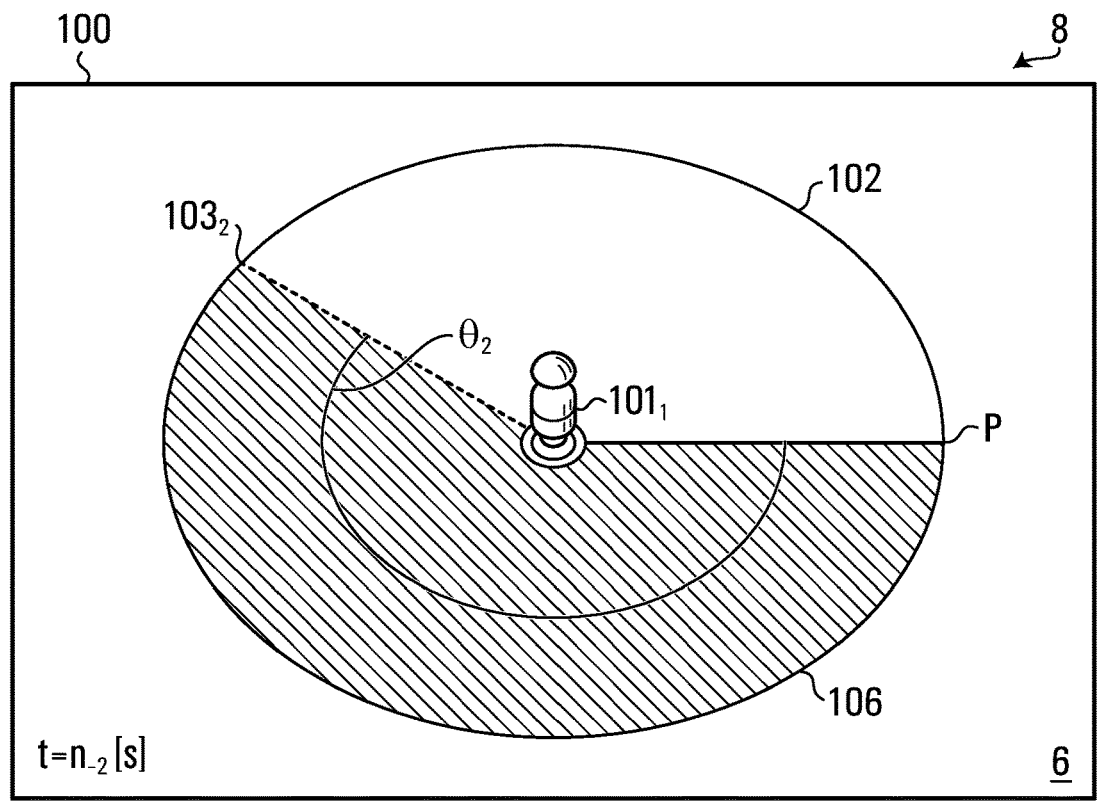
Figure 16D:
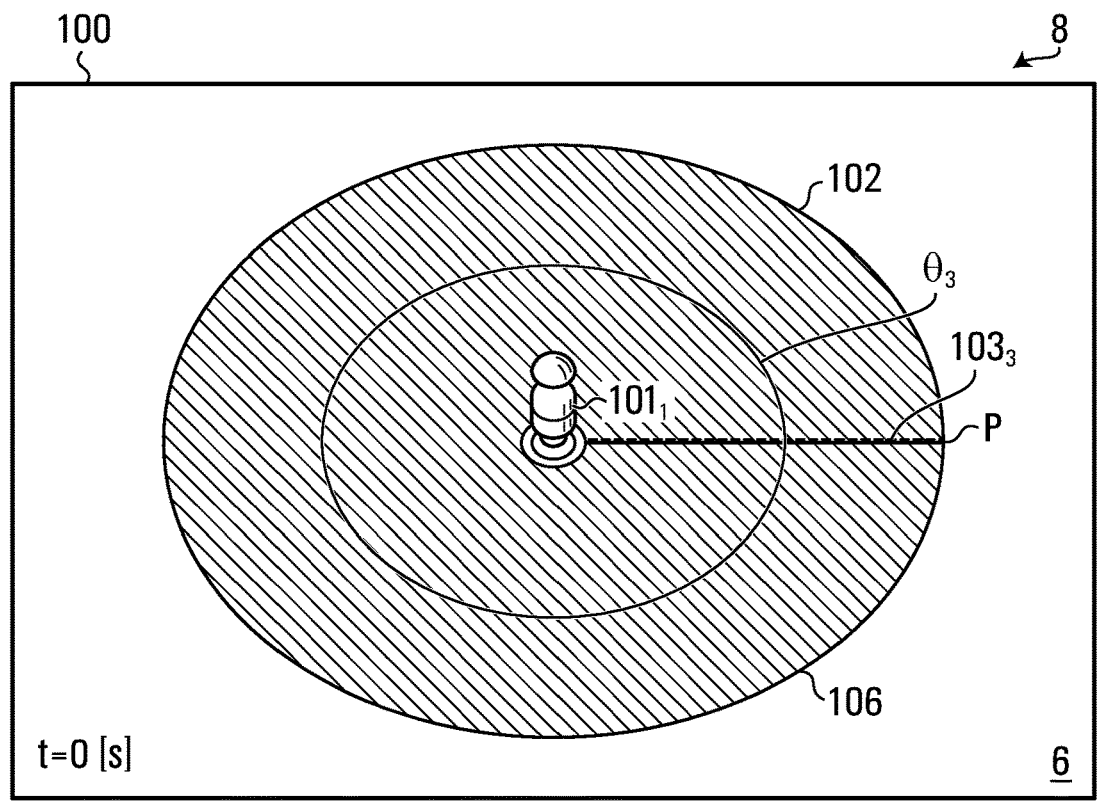

In the embodiment shown in FIGS. 16B to 16D, the marker $103_x$ is represented as a graphical element which progresses clockwise about the perimeter 106 of the event zone 102. In this example an angle θ formed by the marker $103_x$, the perimeter 106 of the event zone 102 and the lead game object $101_1$ increases as the marker $103_x$ progresses clockwise about the perimeter 106 from an initial position at the beginning of the activation countdown to a final position synchronized with the activation countdown elapsing. FIGS. 16B to 16D shows the marker displayed at different points in time. As will be appreciated by the skilled reader, in other embodiments, the marker $103_x$ may progress counterclockwise about the perimeter 106 from an initial position at the beginning of the activation countdown to a final position synchronized with the activation countdown elapsing.

Let the length of time in the current event zone period be n units of time (for example, n seconds). In FIG. 16A, the marker $103_x$ is not shown, which is an indication to the user 1 that the current event zone period has just begun (i.e., the activation countdown has just begun such that the timer associated with the activation countdown indicates t=n [s]). In FIG. 16B, at time t=$n_{-1}$ [s], the marker $103_1$ is shown at a first position and in FIG. 16C, at time t=$n_{-2}$ [s], the marker $103_2$ is shown at a second position. In FIG. 16D, the marker $103_3$ is shown at the end of the current event zone period, at which time an angle θ is 360 degrees. FIG. 16D represents a point in time at which the current event zone period has reached the end and the activation countdown has elapsed (such that the timer associated with the activation countdown indicates t=0 [s]), i.e., the point in time at which the one or more opponent game objects $104_x$ located inside the perimeter 106 of the event zone 102 would be attacked.

As will be appreciated by the skilled reader, the marker $103_x$ shown in FIGS. 16B to 16D is depicted at discrete points in time. In actuality, the marker $103_x$ may be implemented in the video game by way of a smooth animation effect progressing, for example, from a position at 0 degrees (or 0 hours position) to a position at 360 degrees (or 12 o-clock position).

Figure 17A:
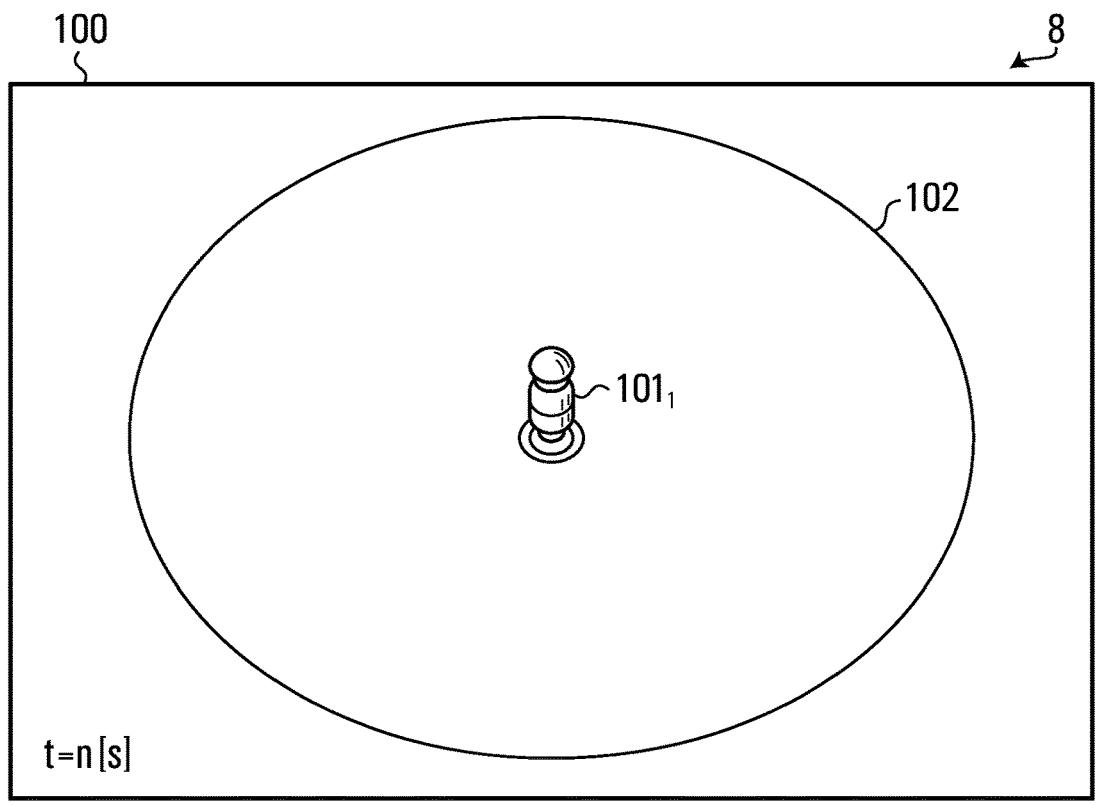
FIGS. 17A, 17B, 17C and 17D is an example of the visual representation of the marker moving radially outward towards the visual representation of the event zone, in accordance with a non-limiting embodiment.
Figure 17B:
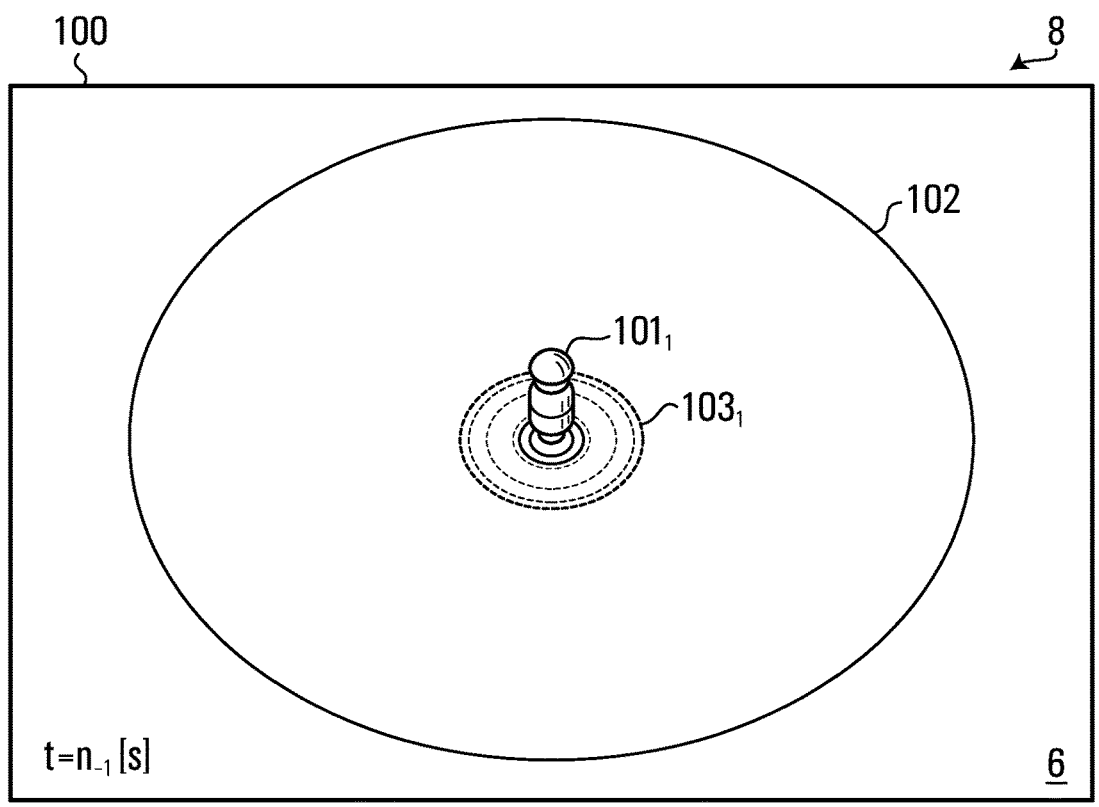
Figure 17C:
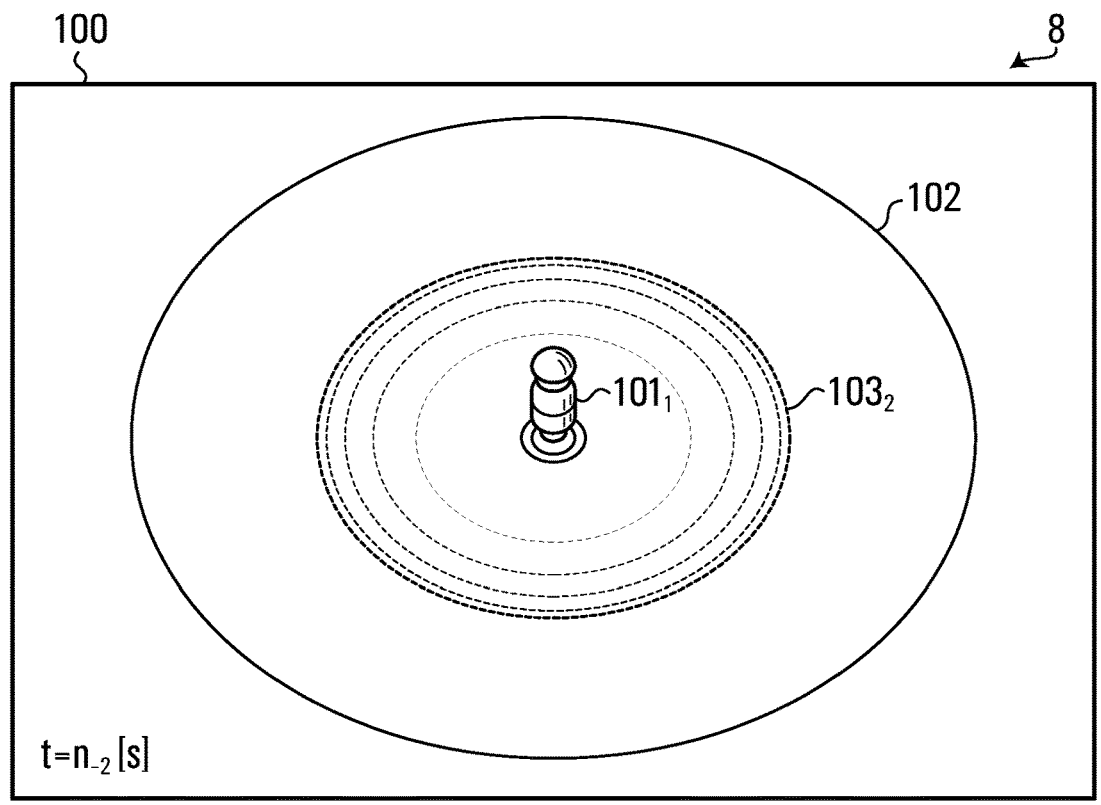
Figure 17D:
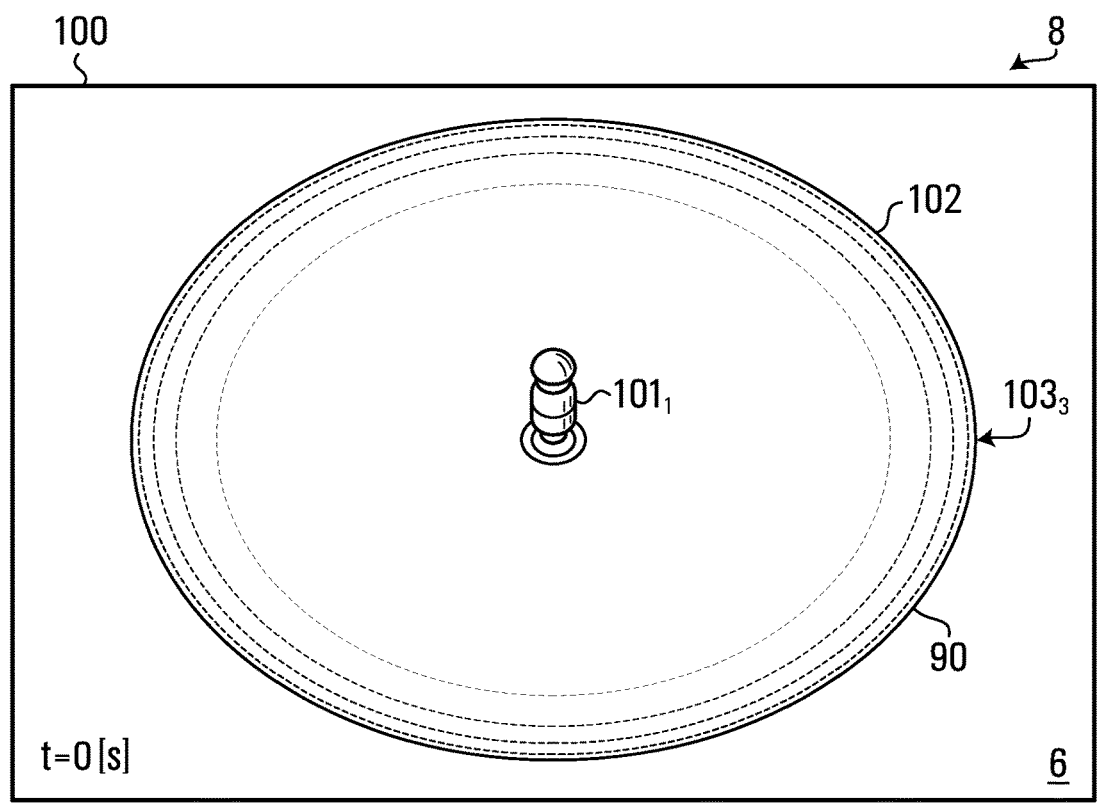

In the embodiment shown in FIGS. 17B to 17D, the marker $103_x$ is represented as a pulse (or wave) which progresses concentrically and outwardly from the lead game object $101_1$ to the perimeter 106 of the event zone 102 of the lead game object $101_1$.

Again, let the length of time in the current event zone period be n units of time (for example, n seconds). In FIG. 17A, the marker $103_x$ is not shown, which is an indication to the user 1 that the current event zone period has just begun (i.e., the activation countdown has just begun such that the timer associated with the activation countdown indicates t=n [s]). In FIG. 17B, at time t=$n_{-1}$ [s], the marker $103_1$ is shown at a first position and in FIG. 17C, at time t=$n_{-2}$ [s], the marker $103_2$ is shown at a second position. In FIG. 17D, the marker $103_3$ is shown at the end of the current event zone period, at which time a front edge 90 of the marker $103_3$ overlaps the perimeter 106 of the event zone 102. FIG. 17D represents a point in time at which the current event zone period has reached the end and the activation countdown has elapsed (such that the timer associated with the activation countdown indicates t=0 [s]), i.e., the point in time at which the one or more opponent game objects $104_x$ located inside the perimeter 106 of the event zone 102 would be attacked.

As will be appreciated by the skilled reader, the marker $103_x$ shown in FIGS. 17B to 17D is depicted at discrete points in time. In actuality, the marker $103_x$ may be implemented in the video game by way of a smooth animation effect progressing, for example, from a position proximate the lead character $101_1$ to the edge of the attack perimeter 102 or, from the edge of the attack perimeter 106 of the event zone 102 to a position proximate the lead character $101_1$.

In other embodiments, any other method of displaying the elapsing of the activation countdown may be used such that other visual representations of the marker may be implemented.

In addition to the visual representation of the marker $103_x$ discussed above, the marker $103_x$ may have other non-visual representations such as numeric, geometric or mathematical representations. As shown in FIG. 5, the object data 42 may include marker data 82 which stores data relating to the current representation of the marker $103_x$ such as the graphical representation in a game image frame or a numeric, geometric or mathematical representation.

Figure 18:
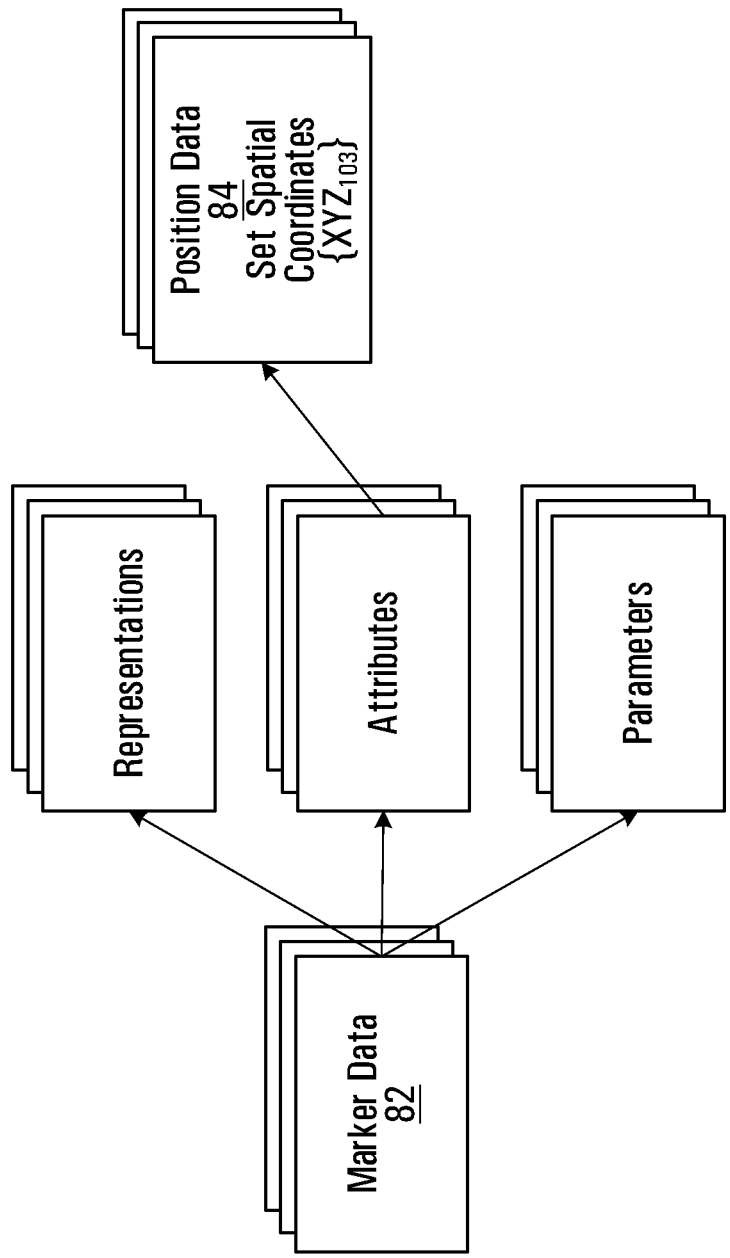
FIG. 18 is a block diagram conceptually illustrating examples of marker data, in accordance with a non-limiting embodiment.

As shown in FIG. 18, the marker $103_x$ may also comprise attributes. Certain attributes of the marker $103_x$ may be controlled by the user 1 (for example, via the internal game controller 13 or the external game controller 17 of the computing device 10) whereas certain attributes of marker $103_x$ may be controlled by the computer-readable instructions 18. In this embodiment, in response to user input, the position of the event zone 102 in the virtual space 6 may change and consequently an absolute position of the marker $103_x$ in the virtual space 6 may also change. Accordingly, the marker $103_x$ may be associated with a set spatial coordinates {$XYZ_{103}$} including spatial coordinates associated with the absolute position of the marker $103_x$. An indication of the set of spatial coordinates $\{XYZ_{103}\}$ may be stored in the memory 12. A composition of the set of spatial coordinates $\{XYZ_{103}\}$ associated with the marker $103_x$ is configured to change in response to the position of the event zone 102 in the virtual space 6 of the gaming environment 8 being changed.

The marker data 82 may also store attributes such as imaging data, position data 84 (including the indication of the set of spatial coordinates $\{XYZ_{103}\}$ associated with the marker 1034 material/texture data, physical state data, color data, visibility data, lighting data (e.g., direction, position, color and/or intensity), sound data, motion data, collision data, environment data, timer data and/or other data associated with the marker $103_x$.

Figure 19:
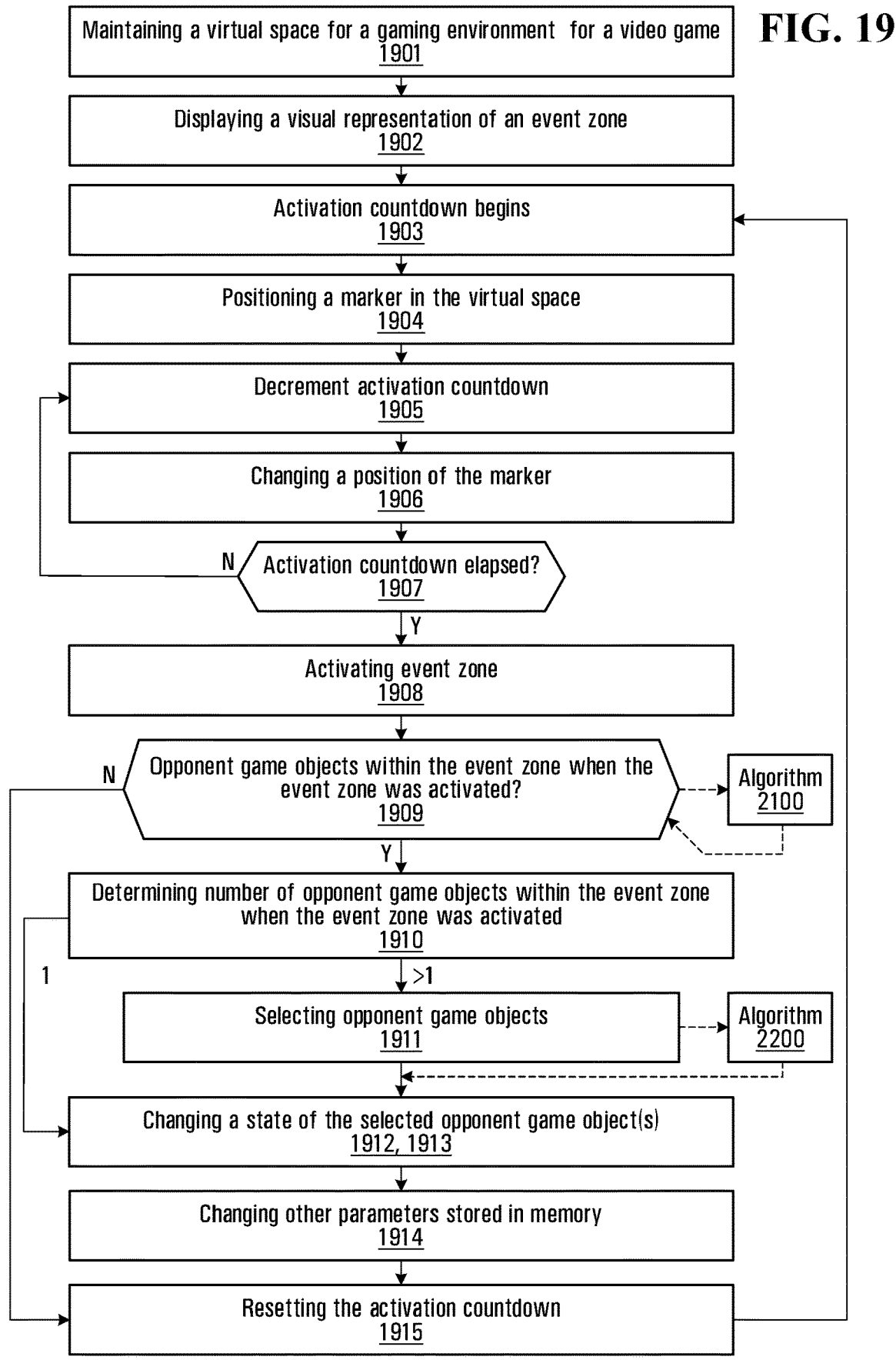
FIG. 19 is a flowchart illustrating steps of a video game process, in accordance with a non-limiting embodiment.

An overview of the video game process 1900 that may be executed by the processor 11 is now presented with reference to FIG. 19.

Step 1901

At step 1901, the processor 11 of the computing device 10 maintains the virtual space 6 for the gaming environment 8 for the video game. The virtual space 6 of the gaming environment 8 of comprises the lead game object $101_1$, the ally game objects $101_2$, $101_3$ associated with Team A and the opponent game objects $104_1$, $104_2$, $104_3$, $104_4$ associated with Team B.

For the purposes of this example and as shown in FIGS. 20A to 20D, the ally game object $101_2$ and the opponent game objects $104_1$, $104_3$ have a position in the virtual space 6 that is within the event zone 102 of the lead game object $101_1$ when the event zone 102 is activated whereas the ally game object $101_3$ and opponent game objects $104_2$, $104_4$ do not have a position in the virtual space 6 that is within the event zone 102 of the lead game object $101_1$ when the event zone 102 is activated.

Further, for the purposes of this example, it is assumed that the game object state parameter 80 stored in the memory 12 for each of the lead game object $101_1$, the ally game objects $101_x$ and the opponent game objects $104_x$ are indicative of an "active" state.

Steps 1902, 1903 and 1904

Step 1902

At step 1902, the visual representation of the event zone 102 associated with the lead game object $101_1$ is displayed on the screen 100 of the internal display device 15 or the external display device 16 of the computing device 10. In this non-limiting example shown in FIG. 20A, the visual representation of the event zone 102 comprises the perimeter 106 surrounding the lead game object $101_1$. The video game process 1900 described herein is carried out in such a way that the event zone 102 is continuously being displayed/updated based on input received by the user 1.

Step 1903

For the purposes of this example, it is assumed that the current event zone period associated with the event zone 102 of the lead game object $101_1$ comprises 3 seconds (i.e., the time remaining before the next activation of the event zone 102 associated with the lead game object $101_1$ is 3 seconds) such that the event zone data 70 stored in the memory 12 includes a parameter 74 indicative of the length of time of the current event zone period being 3 seconds.

At step 1903, the activation countdown associated with the event zone period begins. In this example, the activation countdown is implemented by a timer stored in the memory 12 and accordingly, the timer is set for t=3 [s].

Thus, the beginning of the activation countdown corresponds to the beginning of the current event zone period.

Step 1904

At step 1904, the marker $103_x$ is positioned in the virtual space 6 of the gaming environment 8 and the visual representation of the marker $103_x$ is displayed on the screen 100 of an internal display device 15 or an external display device 16 of the computing device 10.

For the purposes of this example, the marker $103_x$ is represented as a pulse (or wave) which progresses concentrically and inwardly from the event zone 102 to the lead game object $101_1$.

Figure 20A:
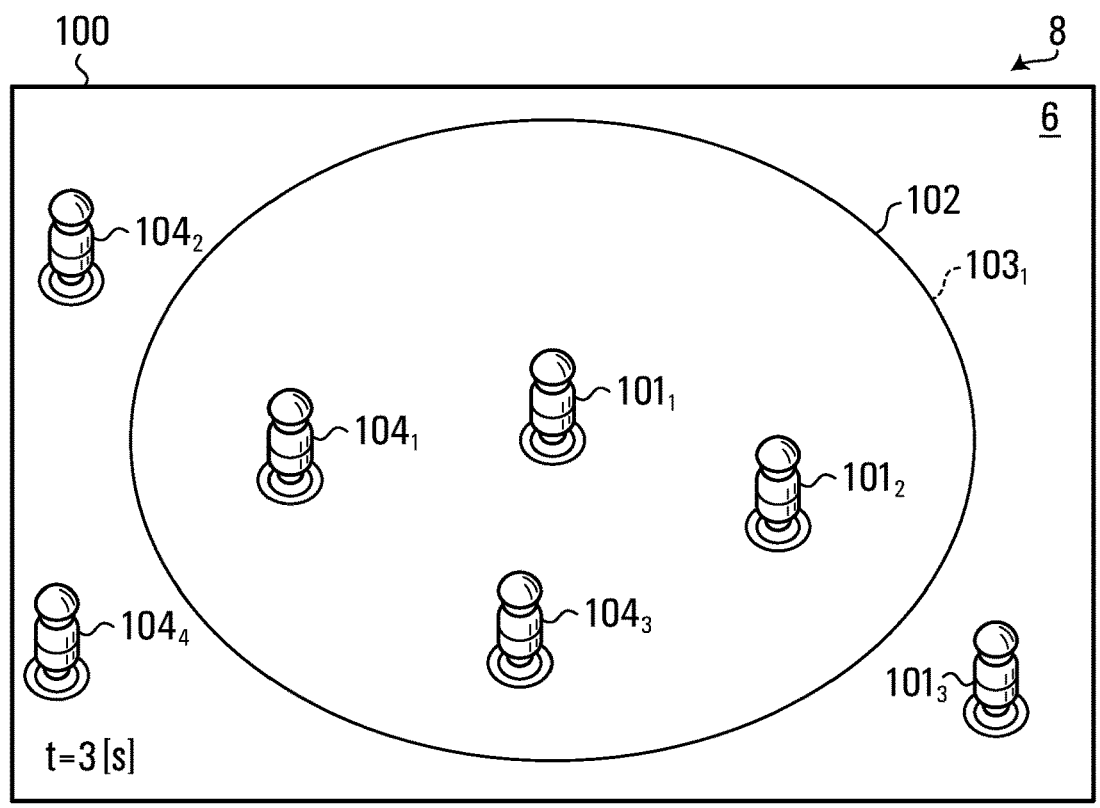
FIGS. 20A to 20D is an example of an automatically executed attack, in accordance with a non-limiting embodiment.
Figure 20B:
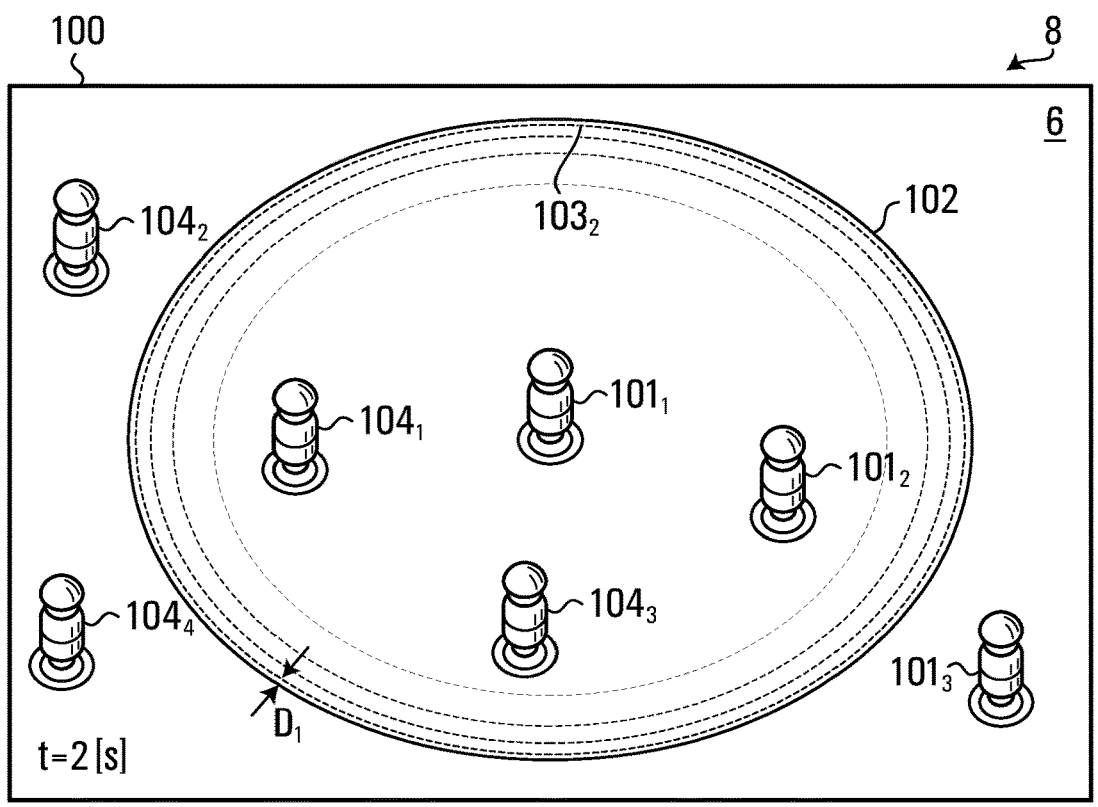
Figure 20C:
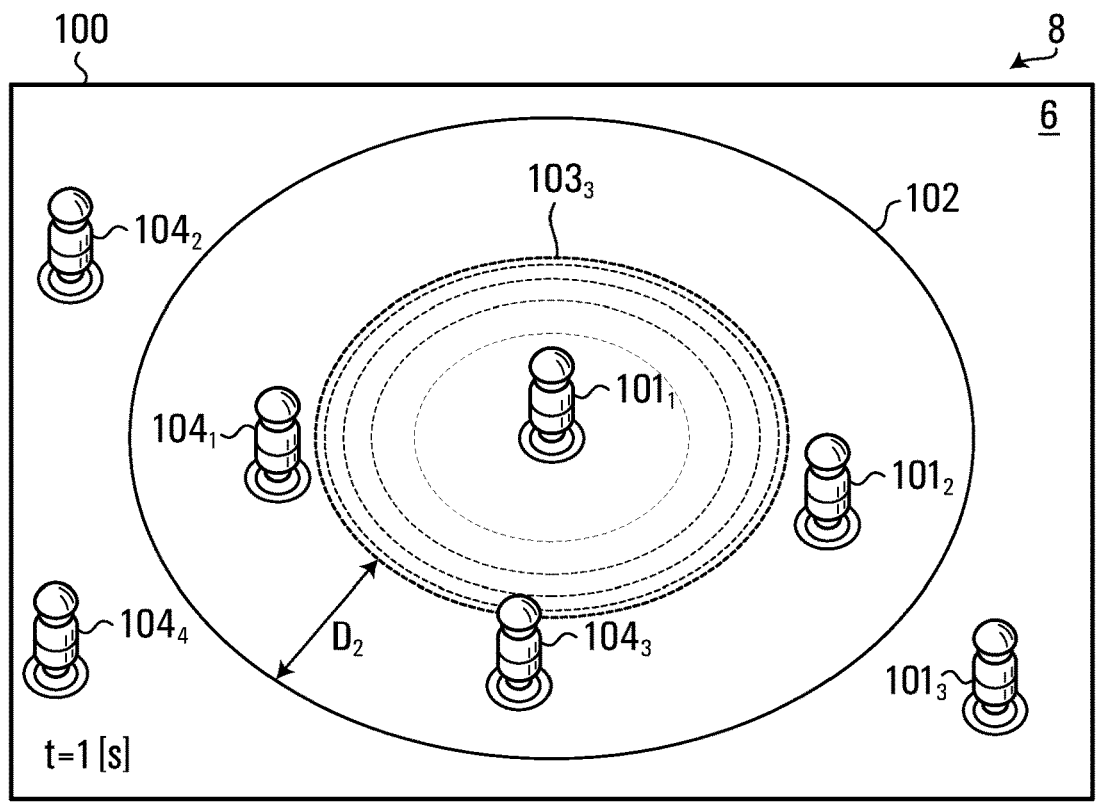

In FIG. 20A, the marker $103_1$ is shown at an initial position corresponding to the beginning of the current event zone period/the beginning of the activation countdown. In this example, at the beginning of the current event zone period, the front edge of the visual representation of the marker $103_x$ overlaps the perimeter 106 of the visual representation of the event zone 102, which is an indication to the user 1 that the current event zone period has just begun/the activation countdown has just begun.

Sequence of steps 1902, 1903 and 1904

As will be appreciated, steps 1902, 1903 and 1904 need not be carried out in order, nor need they be carried out in sequence. Indeed, in this embodiment, steps 1902, 1903 and 1904 are carried out simultaneously.

Steps 1905 and 1906

At step 1905, the activation countdown is decremented such that the activation countdown is one unit of time closer to elapsing. Accordingly, the activation countdown is decremented and the timer changes from t=3 [s] to t=2 [s].

At step 1906, the position of the marker relative to the event zone 102 is changed such that it has moved one or more units of distance relative to the perimeter 106 of the event zone 102. Thus, In FIG. 20B, at time t=2 [s], the marker $103_2$ is shown at a second position.

As will be appreciated, steps 1905 and 1906 need not be carried out in order, nor need they be carried out in sequence. Indeed, in this embodiment, steps 1905 and 1906 are carried out simultaneously.

The next step is 1907.

Step 1907

At step 1907, if the activation countdown has not elapsed, then the video game process 1900 returns to steps 1905 and 1906 until such time as the activation countdown elapses/the timer associated with the activation countdown reaches t=0 [s].

Figure 20D:
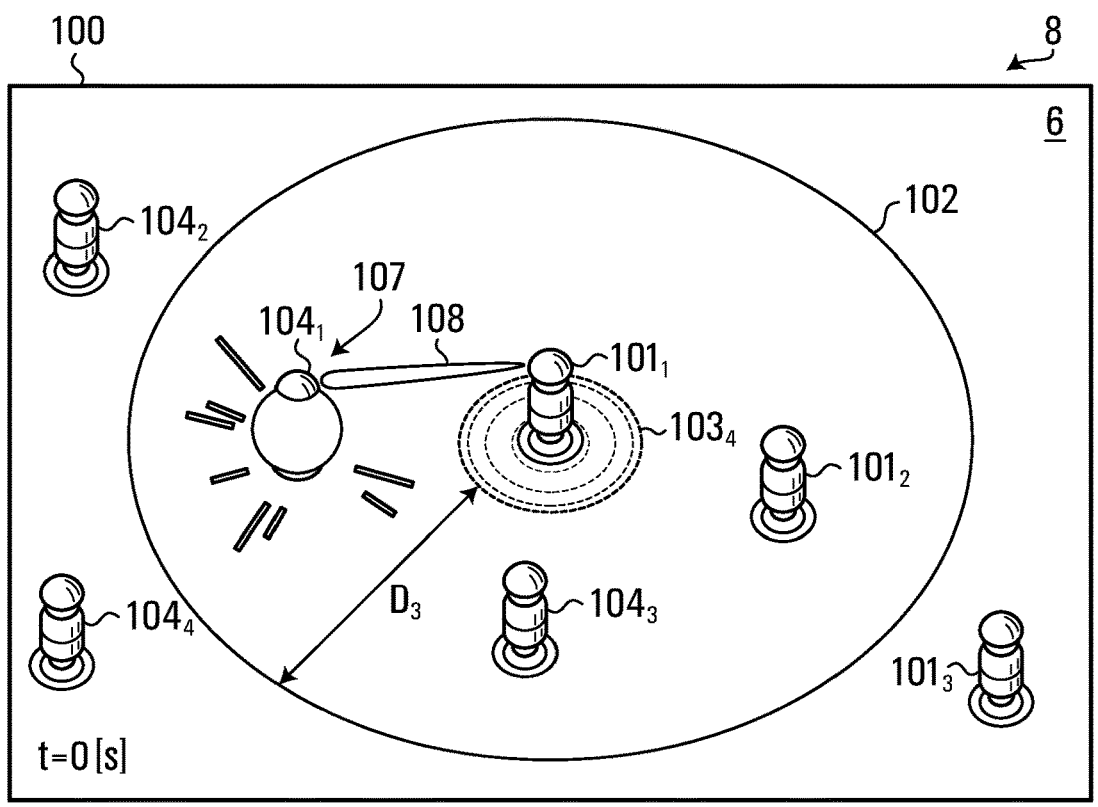

FIG. 20D represents a point in time at which the activation countdown has elapsed and the current event zone period has ended. In this example, changing the position of the marker $103_x$ comprises progressively moving the marker $103_x$ from an initial position to a final position such that the distance $D_x$ involving the marker $103_x$ and the event zone 102 increases. Specifically, the distance $D_x$ involving the marker $103_x$ and the reference point P of the perimeter 106 of the event zone 102, increases. Thus, a final position of the marker is synchronized with the end of the current event zone period as characterized by the activation countdown elapsing (in this case, the timer reaching t=0 s).

Once the activation countdown elapses/the timer associated with the activation countdown reaches t=0 [s], the video game process proceeds to step 1908.

Step 1908

At step 1908, the event zone 102 is activated. The event zone 102 being activated is synchronized with the activation countdown elapsing/the timer associated with the activation countdown reaches t=0 [s]. The next step is 1909.

Step 1909

At step 1909, as part of the video game process 1900, a determination is made as to whether the one or more opponent game objects $104_x$ have a position in the virtual space 6 that is within the event zone 102. An overview of an opponent detection algorithm 2100 that may be executed by the processor 11 is now presented.

Opponent Detection Algorithm

Figure 21:
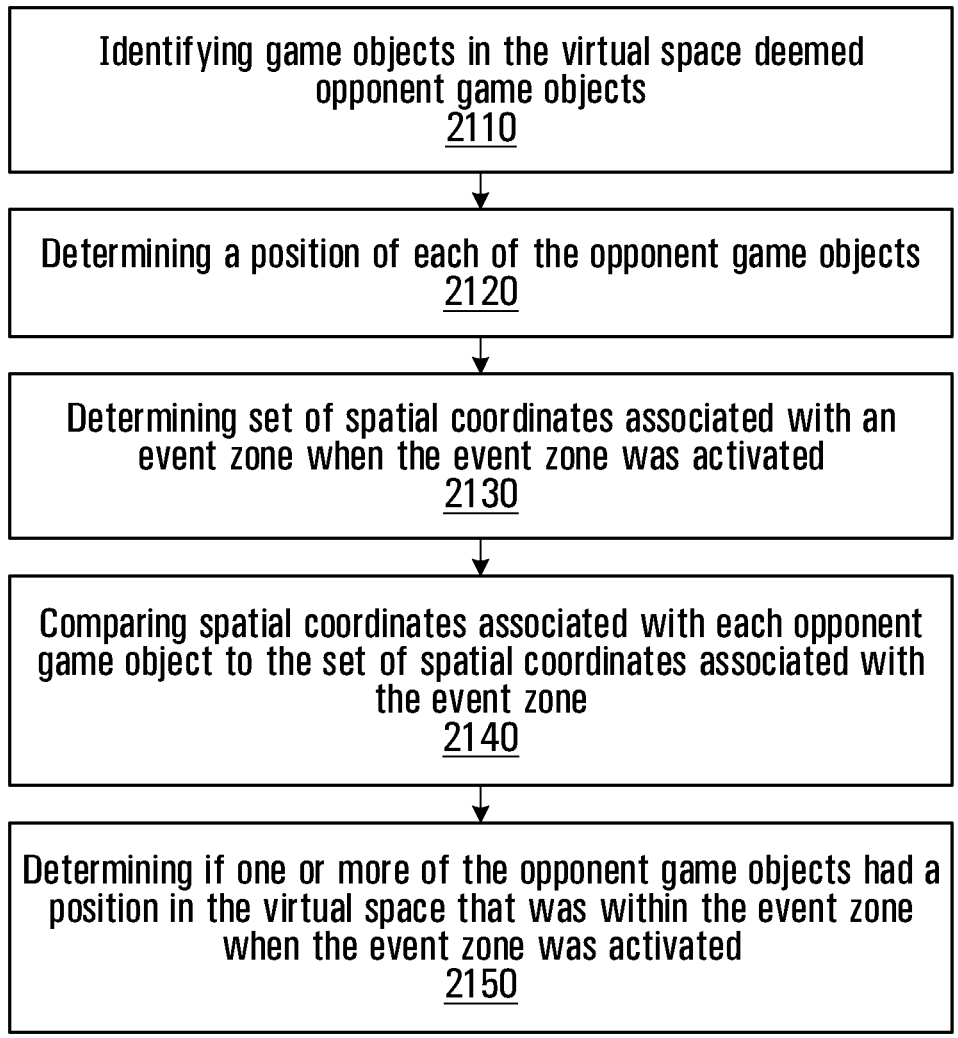
FIG. 21 is a flowchart illustrating steps of an opponent detection algorithm, in accordance with a non-limiting embodiment.
Figure 22:
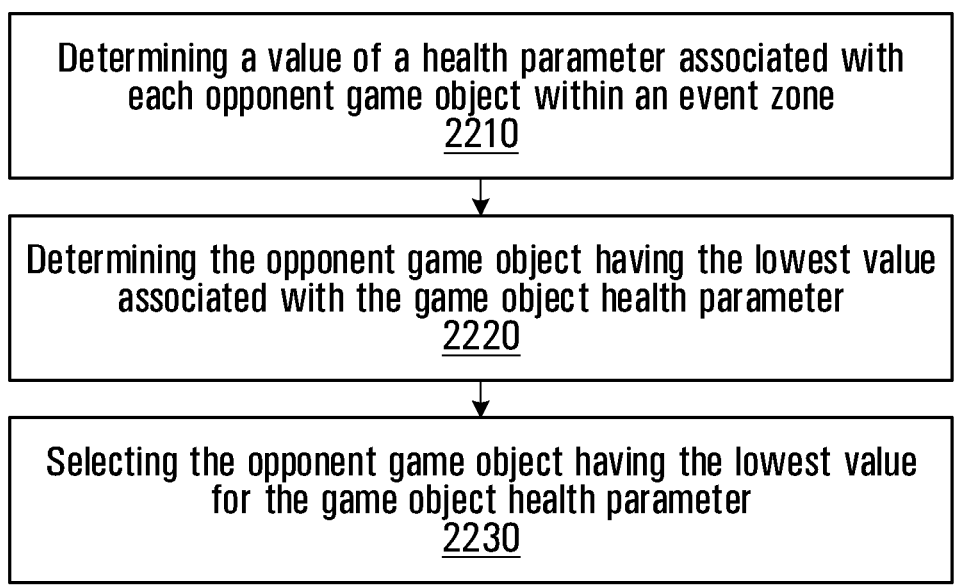
FIG. 22 is a flowchart illustrating steps of an opponent selection algorithm, in accordance with a non-limiting embodiment.

With reference to FIG. 21, the opponent detection algorithm 2100 includes steps 2110 to 2150.

Step 2110

In some embodiments, at step 2110, the opponent detection algorithm 2100 comprises accessing the memory 12 to identify which game objects in the virtual space 6 are deemed opponent game objects $104_x$ with respect to the lead game object $101_1$ for example, by accessing the table 1000 which includes an indication of the teams and associated game objects (as shown in FIG. 10, column 1002). Thus, in this example, a determination is made that the game objects $104_1$, $104_2$, $104_3$, $104_4$ are associated with Team B and as such the virtual space 6 comprises opponent game objects $104_1$, $104_2$, $104_3$, $104_4$.

Step 2120

At step 2120 of the opponent detection algorithm 2100, once the opponent game objects $104_1$, $104_2$, $104_3$, $104_4$ are identified, a position of each of the opponent game objects $104_1$, $104_2$, $104_3$, $104_4$ may also be determined by accessing the memory 12 to determine the spatial coordinates $XYZ_{GO}$ associated with each of the opponent game objects $104_1$, $104_2$, $104_3$, $104_4$.

Step 2130

Step 2130 of the opponent detection algorithm 2100 comprises accessing the memory 12 to determine the set of spatial coordinates $\{XYZ\}_{102}$ associated with the event zone 102 when the activation countdown elapsed (at t=0 [s])/when the event zone 102 was activated).

Step 2140

Step 2140 of the opponent detection algorithm 2100 comprises comparing the spatial coordinates $XYZ_{GO}$ associated with each opponent game object $104_1$, $104_2$, $104_3$, $104_4$ to the set of spatial coordinates $\{XYZ\}_{102}$ associated with the event zone 102 and determining if the spatial coordinates $XYZ_{GO}$ associated with one or more of the opponent game objects $104_1$, $104_2$, $104_3$, $104_4$ correspond with a given coordinate in the set of spatial coordinates $\{XYZ\}_{102}$ associated with the event zone 102 when the activation countdown elapsed (at t=0 [s])/when the event zone 102 was activated).

Step 2150

At step 2150 of the opponent detection algorithm, in the affirmative, a determination is thus made that one or more of the opponent game objects $104_1$, $104_2$, $104_3$, $104_4$ had a position in the virtual space 6 that was within the event zone 102 upon the activation of the event zone 102. In this example, it is determined that the spatial coordinates XYZ of the opponent game objects $104_1$, $104_3$ each correspond with a given coordinate in the set of spatial coordinates $\{XYZ\}_{102}$ associated with the event zone 102 when the activation countdown elapsed (at t=0 [s])/when the event zone 102 was activated). A determination is thus made that the opponent game objects $104_1$, $104_3$ had a position in the virtual space 6 that was within the event zone 102 when the event zone 102 was activated, as shown in FIG. 20D.

At step 1909, any other suitable method of determining if a game object has a position in the virtual space that is within the event zone 102. For example, at step 1909, the game object may be considered to have a position in the virtual space 6 that is within the event zone 102 if a distance between the game object and a position of the lead game object $101_1$ is below a threshold distance. In yet another example, at step 1909, in a 2D virtual space, x and y coordinates of each of the one or more opponent game object $104_x$ may be compared with (1) x-coordinates of each matching y-coordinate of the perimeter (boundary) 106 and with (2) y-coordinates of each matching x-coordinate of the perimeter (boundary) 106.

If at step 1909, it is determined that none of the opponent game objects $104_x$ are present in the event zone 102, no attack is executed, and the method proceeds to step 1915 (see further below).

If, on the other hand, it is determined at step 1909 that one or more opponent game objects $104_x$ are within the event zone 102, the next step is step 1910, where a determination is made as to the number of opponent game objects $104_x$ which are present within the event zone 102.

Step 1910

In this step, if a determination is made that a single opponent game object $104_x$ has a position in the virtual space 6 within the event zone 102, then the opponent game object $104_x$ is selected and an attack by the lead game object $101_1$ against the selected opponent game object $104_x$ is executed automatically on behalf of the user 1 at step 1912 (see further below).

On the other hand, if in this step, a determination is made that multiple opponent game objects $104_x$ are present in the event zone 102, one or more of the opponent game objects $104_x$ that was within the event zone 102 may be selected at step 1911 and attacks by the lead game object $101_1$ against the selected one or more of the opponent game object $104_x$ are executed automatically on behalf of the user 1 at step 1912.

In this example, at step 1910, it is determined that 2 opponent game objects (opponent game objects $104_1$, $104_3$) had a position in the virtual space 6 that was within the event zone 102 when the event zone 102 was activated. Thus, the next step is step 1911.

Step 1911

In some embodiments, the video game process 1900 comprises attacking only one of the one or more of the opponent game objects $104_x$ within the event zone 102. In other embodiments, the video game process comprises attacking a plurality of the only one of one or more of the opponent game objects $104_x$ that are within the event zone 102.

An indication of the number of opponent game objects $104_x$ which may be attacked by the lead game object $101_1$ may be encoded by a game designer at the time of game design. In other embodiments, the number of opponent game objects $104_x$ which may be attacked by the lead game object $101_1$ may change as a result of gameplay. For instance, the number of opponent game objects $104_x$ which may be attacked may increase as a function of a score associated with a user. In other embodiments, the number of opponent game objects $104_x$ the lead game object $101_1$ may be configured to attack may be a function of a level of the game.

Selection Algorithm

In some embodiments, the opponent game object $104_x$ may be randomly or pseudo-randomly selected by an autonomous bot implemented as part of the video game process 1900. In other embodiments, the opponent game object $104_x$ may be selected based on an opponent selection algorithm 2200. Thus, in such cases, the video game process 1900 comprises the step 1911 of selecting one or more opponent game objects $104_x$ in this case by way of the opponent selection algorithm 2200 described below.

Step 2210

For example, the video game process 1900 may be configured to select the opponent game object in the least amount of health. Accordingly, the opponent selection algorithm 2200 may comprise a step 2210 of accessing the memory 12 and determining a value of the health parameter 78 associated with each opponent game object $104_x$ within the event zone 102.

Step 2220

The opponent selection algorithm may also comprise a step 2220 of determining the opponent game object $104_x$ with has the lowest value associated with the game object health parameter 78.

Step 2230

The opponent selection algorithm 2200 may comprise a further step 2230 of selecting the opponent game object $104_x$ with the lowest value for the game object health parameter 78.

For the purposes of the present example, it is assumed that the lead game object $101_1$ is configured to attack only one opponent and that an output of step 1911 is the selection of opponent game object $104_1$.

Steps 1912 and 1913

Step 1912

At step 1912, the selected opponent game object $104_x$ is attacked. In the illustrated example, the opponent game object $104_1$ is attacked.

In some embodiments, the GUI 26 of the video game is configured to display information indicating that which opponent game object $104_x$ has been selected for attack. For example, the GUI 26 may be configured to graphically emphasize the selected opponent game object $104_x$. This can be achieved using a specific color, silhouette, flag, motion or other visual effect.

The video game process 1900 may be configured to initiate an animation routine associated with a visual representation of the attack. In the illustrated embodiment of FIG. 20D, the attack is represented visually by a bolt of energy 108 emanating from the lead game object $101_1$ and striking the selected opponent game object $104_1$, resulting in an explosion 107 being generated around the selected opponent game object $104_1$.

Step 1913

At step 1913, the one or more game object parameters 76 stored in the memory 12 related to the selected opponent game object $104_x$ may be changed. In this example, the one or more game object parameters 76 stored in the memory 12 related to opponent game object $104_1$ may be changed.

In this case, the game object health parameter 78 associated with the opponent game object $104_1$ is changed such that the value associated with the game object health parameter 78 of the opponent game object $104_1$ is changed. In this instance, the value associated with the game object health parameter 78 of the opponent game object $104_1$ is decremented by one unit.

Additionally, in this example, the value of the game object health parameter 78 subsequent to it being decremented by one unit is now below the threshold health value such that the opponent game object $104_1$ which was previously characterized as active is now characterized as inactive.

Accordingly, the game object state parameter 80 of the opponent game object $104_1$ is toggled between a first value indicative of a game object being in a first state (e.g., the "active" state) and a second value indicative of the game object being in a second state (e.g., the "inactive" state).

As will be appreciated, steps 1912 and 1913 need not be carried out in order, nor need they be carried out in sequence. Indeed, in some embodiments, steps 1912 and 1913 are carried out simultaneously.

Step 1914

In some embodiments, when the event zone 102 of the lead game object $101_1$ is activated and the opponent game objects $104_1$ is attacked, the video game process 1900 may comprise changing other parameters and attributes stored in the memory 12. Thus, the video game process 1900 may comprise a step 1915 which involves changing one or more parameters and attributes stored in the memory 12.

In some embodiments, the game object health parameter 78 associated with the lead game object $101_1$ and stored in the memory 12 may be changed when the event zone 102 of the lead game object $101_1$ is activated and the opponent game objects $104_1$ is attacked. For example, the value associated with the game object health parameter 78 of the lead game object $101_1$ may be incremented as a function of the opponent game objects $104_1$ being attacked. In yet another example, the value associated with the game object health parameter 78 of the lead game object $101_1$ may be incremented as function of the number of opponent game objects $104_x$ attacked. The value associated with the game object health parameter 78 of the lead game object $101_1$ being incremented may result in the lead game object $101_1$ being less vulnerable to damage or attacks from the one or more opponent game objects $104_x$.

In some embodiments, the composition of the set of spatial coordinates $\{XYZ\}_{102}$ associated with the event zone 102 of the lead game object $101_1$ and included in the event zone data 70 in the memory 12 may be changed. For example, the composition of the set of spatial coordinates $\{XYZ\}_{102}$ associated with the event zone 102 of the lead game object $101_1$ may be changed such that the event zone 102 occupies a greater area in the virtual space 6 of the gaming environment 8 (an "area" of the event zone 102 in the virtual space 6 may increase). For example, the area of the event zone 102 may increase as a function of the opponent game objects $104_1$ being attacked. In yet another example, the area of the event zone 102 in the virtual space as function of the number of opponent game objects $104_x$ attacked. An increase of the area of the event zone 102 of the lead game object $101_1$ may result in a greater number of opponent game objects $104_x$ being within the event zone 102.

In some embodiments, the score stored in the memory 12 in association with the user 1/lead game object $101_1$ may be changed. For instance, in some cases, the lead game object $101_1$ attacking the opponent game objects $104_1$ may result in points being added to a score associated with the user 1. For example, the score may increase as function of the opponent game objects $104_1$ being attacked. In yet another example, the number of points added to the score may be a function of the number of opponent game objects $104_x$ attacked.

The next step is step 1915.

Step 1915

At step 1915, the activation countdown is reset and the video game process begins again at step 1903.

Figure 23A:
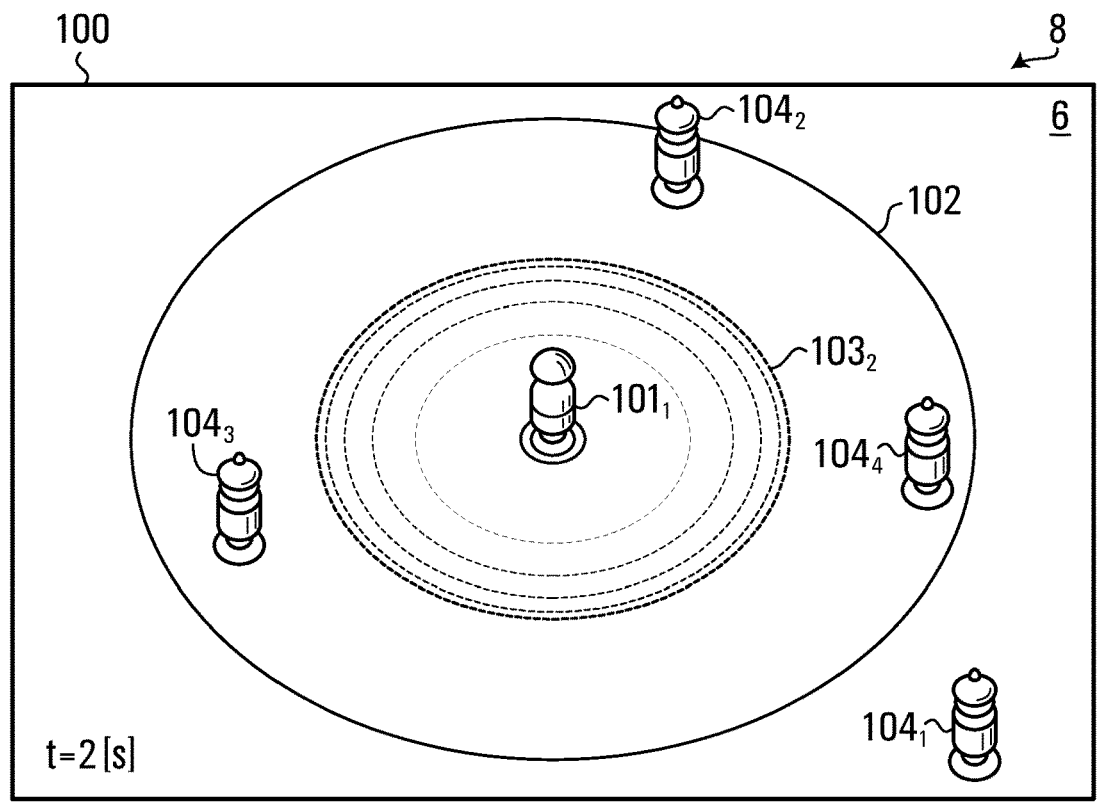
FIGS. 23A to 23B is another example of an automatically executed attack, in accordance with a non-limiting embodiment.
Figure 23B:
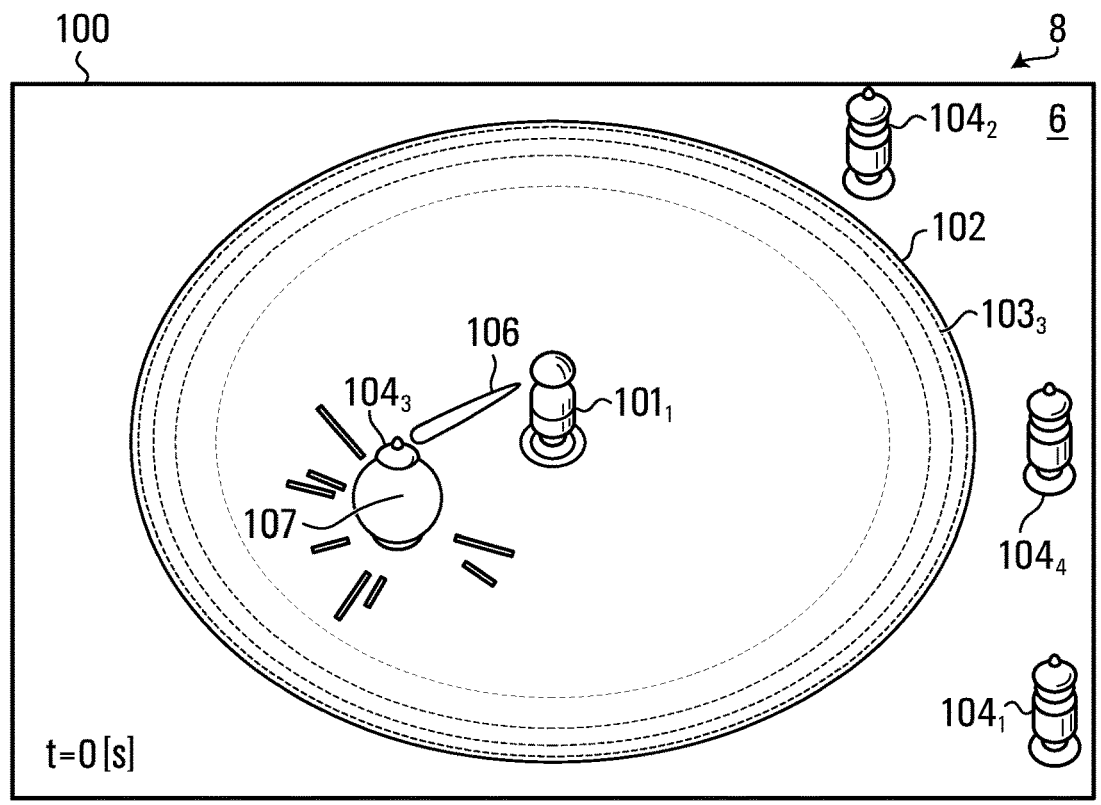

One potential technical advantage of the video game process 1900 disclosed herein is that it increases the strategic complexity of attack sequences between game objects in a MOBA game, so as to increase user engagement and interest. For example, in the situation shown in FIG. 23A, at time t=2 [s] of the activation countdown, three opponent game objects $104_2$, $104_3$, $104_4$ are located within the event zone 102. Accordingly, if no action is taken by the user 1, then one of the opponent game objects $104_2$, $104_3$, $104_4$ will be selected at step 1910/1911. If selection at step 1910/1911 is performed randomly or pseudo-randomly, this will result in a situation in which each of opponent game objects $104_2$, $104_3$, $104_4$ will have a one in three chance of being attacked. This situation may be suboptimal from the user's perspective. For example, if the user 1 wishes to attack opponent game object $104_3$, it may be possible to provide user input (at step 1908) to move the lead game object $101_1$ away from opponent game objects $104_2$ and $104_4$ in order to ensure that opponent game object $104_3$ is attacked upon the activation countdown being elapsed, as shown in FIG. 23B.

In some embodiments, responsive to navigation input from the user 1, the event zone 102 (and thus the absolute position of the marker $103_x$) may be moved in the virtual space 6 of the gaming environment 8 such that the event zone 102/the marker $103_x$ are in proximity of one or more environment objects $105_x$. The proximity of the event zone 102/the marker $103_x$ to the one or more environment objects $105_x$ may result in changing the visual representation of the event zone 102/the visual representation of the marker $103_x$ displayed on the internal display device 15 or the external display device 16 of the computing device 10.

Figure 24A:
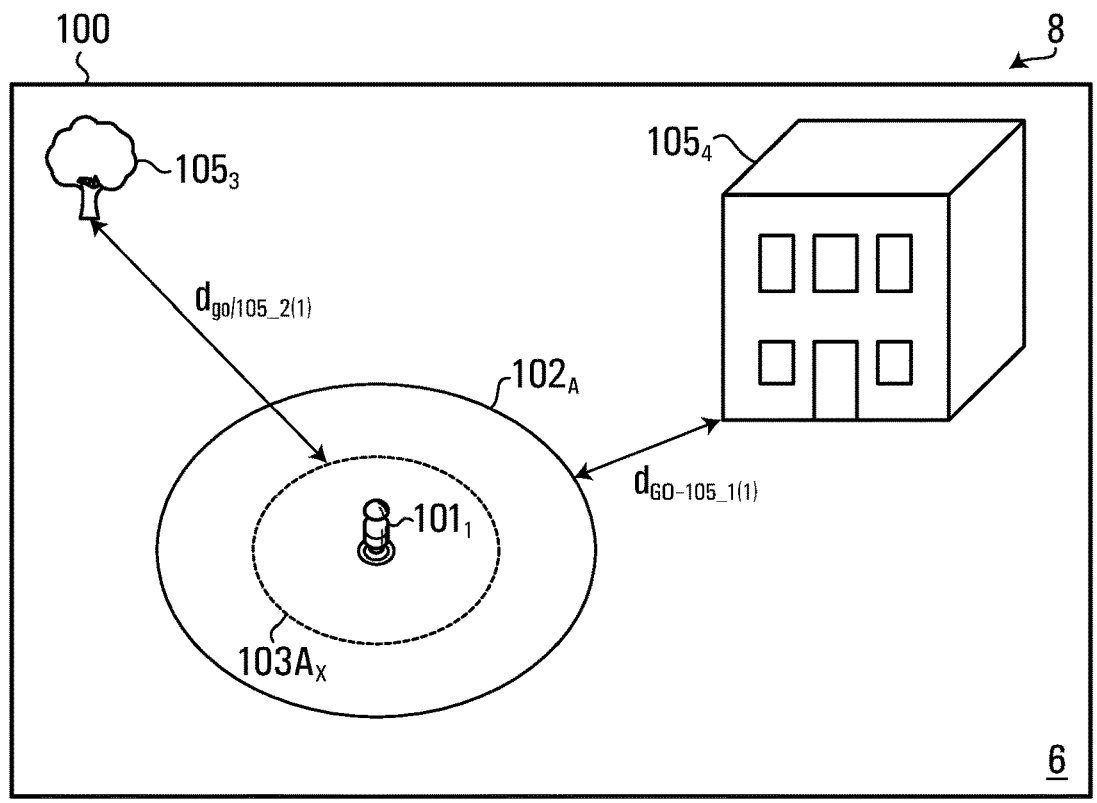
FIGS. 24A to 24D is an example of changing the visual representation of the marker and changing the visual representation of the event zone, in accordance with a non-limiting embodiment.
Figure 24B:
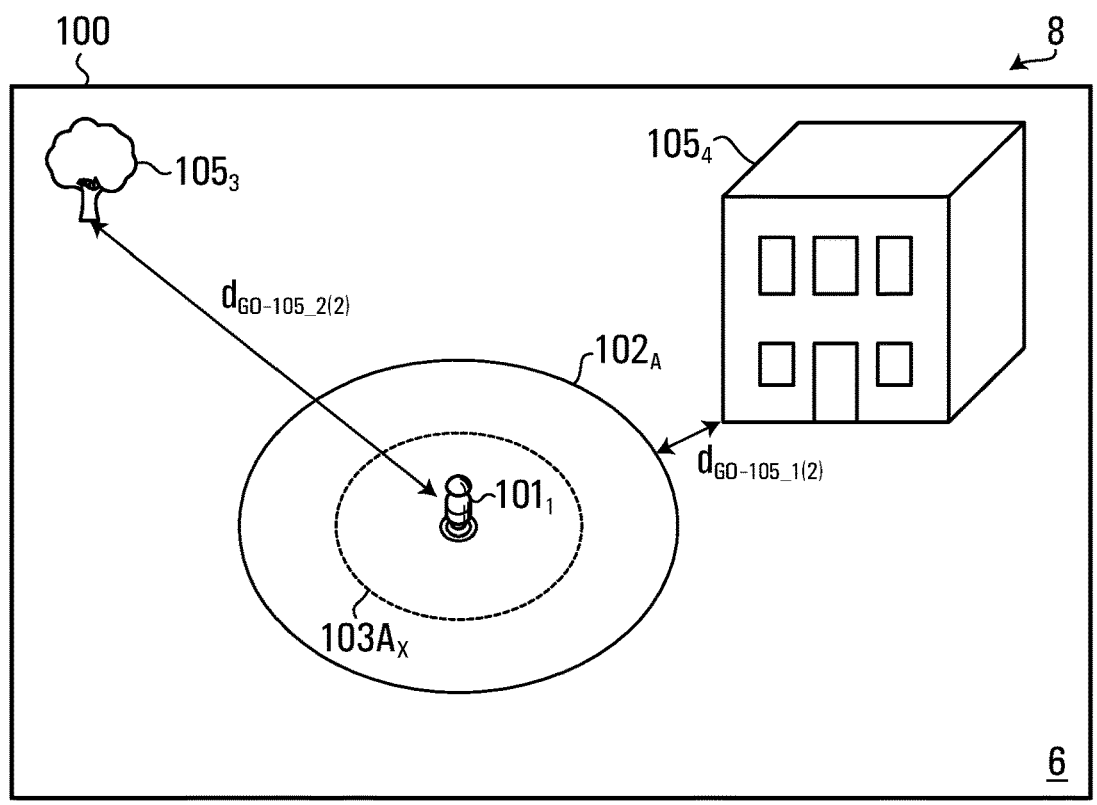
Figure 24C:
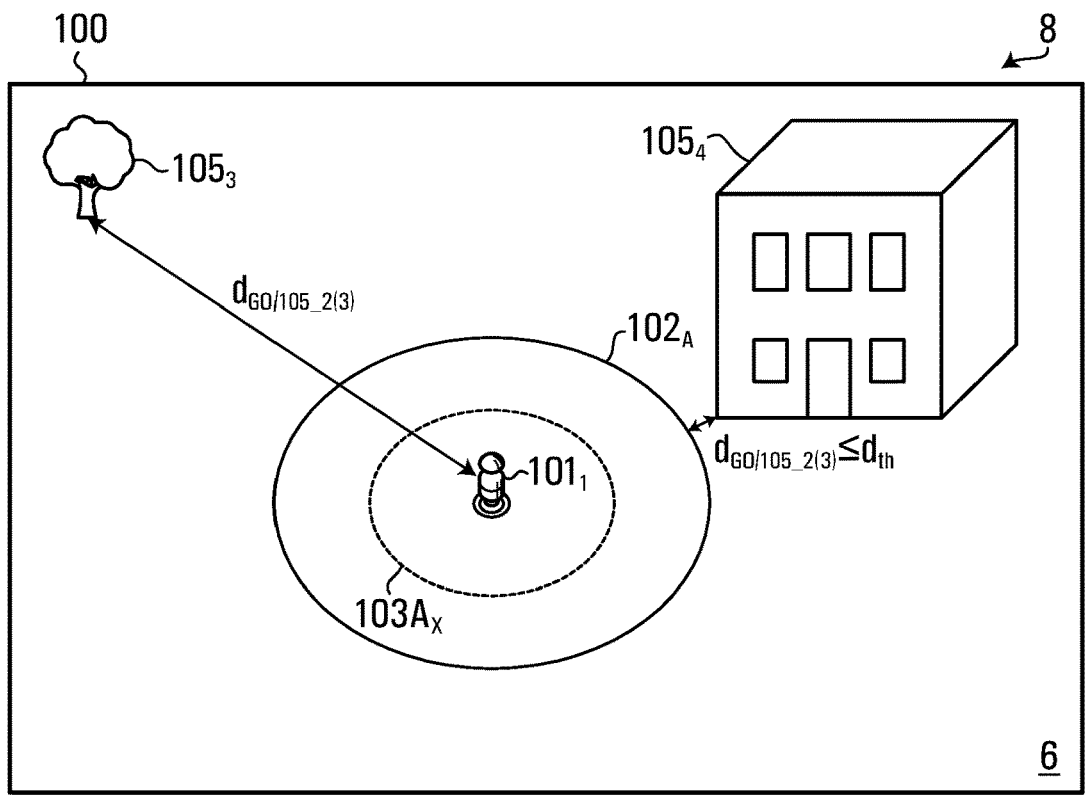
Figure 24D:
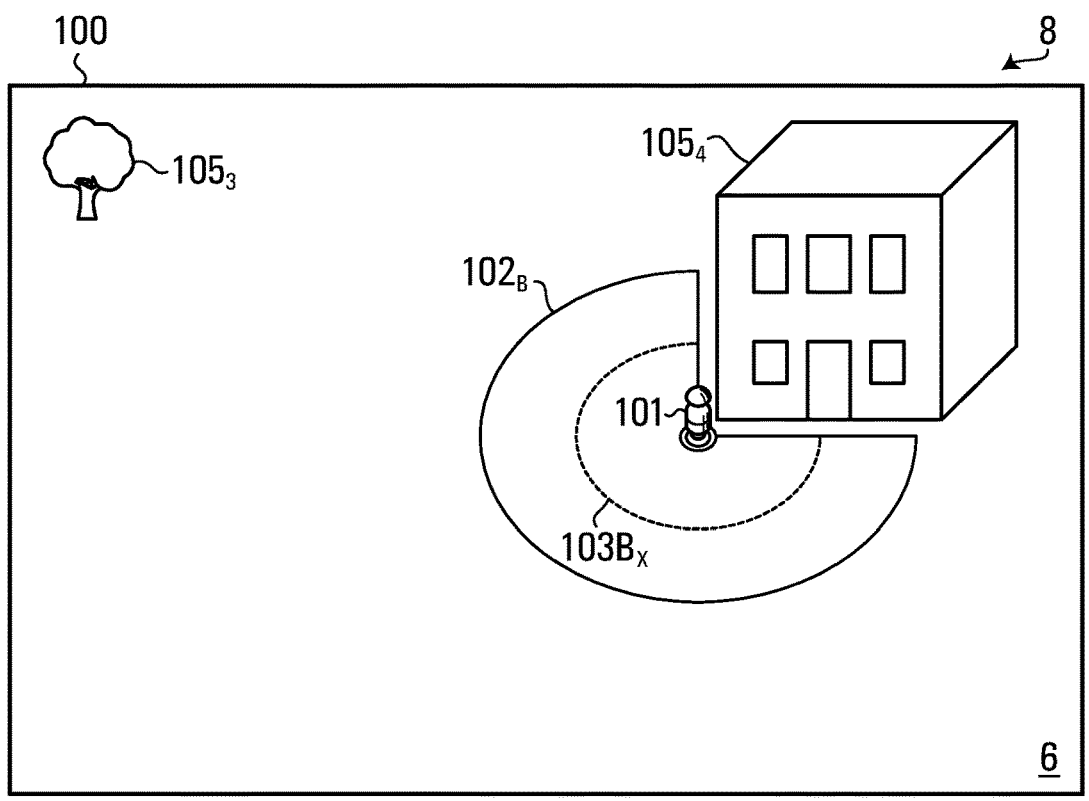

Accordingly, if a distance $d_{GO/105x}$ between the event zone 102 and at least part of at least one of the one or more environment objects $105_x$ is within a threshold distance $d_{th}$, the visual representation of the event zone 102 may change from a first visual representation of the event zone 102 to a second visual representation of the event zone 102. In the illustrated embodiment of FIGS. 24A to 24C, it is shown that a shape of the visual representation of the event zone 102 is changed such that the shape of the second visual representation of the event zone 102 is different from a shape of the first visual representation of the event zone 102.

As can also be appreciated from the illustrated embodiment of FIGS. 24A to 24D, the visual representation of the marker $103_x$ is also changed from a first visual representation of the marker $103_x$ to a second visual representation of the marker $103_x$. In the illustrated embodiment of FIGS. 24A to 24C, it is shown that a shape of the visual representation of the marker $103_x$ is changed such that the shape of the second visual representation of the marker $103_x$ is different from a shape of the first visual representation of the marker $103_x$. Thus, in some embodiments, changing the visual representation of the event zone 102 also results in changing the visual representation of the marker $103_x$.

In this embodiment, changing the visual representation of the event zone 102 and changing the visual representation of the marker $103_x$ are performed simultaneously.

As indicated above, the event zone 102 is associated with one or more event zone attributes part of the event zone data 70 stored in the memory 12. In some embodiments, repeatedly activating the event zone 102 comprises repeatedly changing at least one of the one or more event zone attributes stored in the memory 12.

For example, in some embodiments, the event zone 102 comprises a light intensity attribute. In this embodiment, repeatedly activating the event zone 102 comprises repeatedly changing the light intensity attribute stored in the memory 12. Accordingly, activation of the event zone 102 may result in a change in the light intensity of the visual representation of the event zone 102. For example, the user 1 may perceive this change as the visual representation of the event zone 102 appearing brighter when the event zone 102 is activated as compared to a brightness of the event zone 102 when the event zone is not activated.

For example, in yet another implementation of this embodiment, the event zone 102 comprises a color attribute. In this example, repeatedly activating the event zone 102 comprises repeatedly changing the color attribute stored in the memory 12. Accordingly, activation of the event zone 102 may result in a change in the color of the visual representation of the event zone 102. For example, the user 1 may perceive this change as the visual representation of the event zone 102 changing color when the event zone 102 is activated.

As indicated above, the marker $103_x$ is associated with one or more marker attributes included in the marker data 82 stored in the memory 12. In some embodiments, repeatedly activating the event zone 102 comprises repeatedly changing at least one of the one or more marker attributes stored in the memory 12.

For example, in one implementation of this embodiment, the marker $103_x$ comprises a light intensity attribute. In this example, repeatedly activating the event zone 102 comprises repeatedly changing the light intensity attribute stored in the memory 12. Accordingly, activation of the event zone 102 may result in a change in the light intensity of the visual representation of the marker $103_x$. For example, the user 1 may perceive this change as the visual representation of the marker $103_x$ appearing brighter when the event zone 102 is activated as compared to a brightness of the marker $103_x$ when the event zone 102 is not activated.

For example, in yet another implementation of this embodiment, the marker $103_x$ comprises a color attribute. In this example, repeatedly activating the event zone 102 comprises repeatedly changing the color attribute stored in the memory 12. Accordingly, activation of the event zone 102 may result in a change in the color of the visual representation of the marker $103_x$. For example, the user 1 may perceive this change as the visual representation of the marker $103_x$ changing color when the event zone 102 is activated.

In one implementation of this embodiment, the visual representation of the marker $103_x$ may comprise a variable amount of shading or fill such that the activation countdown elapsing may be associated with an increase or a decrease in the shading or the fill of the visual representation of the marker $103_x$.

In some embodiments, the lead game object $101_1$ may attack the one or more opponent game objects $104_x$ in response to the user 1 providing input via the GUI 26 to enable one or more enhanced attack modalities in accordance with a video game process 2500.

In some cases, the one or more enhanced attack modalities may cause more damage to the one or more opponent game objects $104_x$ than the attacks automatically initiated by the video game process 1900 on behalf of the user 1/lead game object $101_1$. In other cases, the one or more enhanced attack modalities may result in a greater number of the one or more opponent game objects $104_x$ being damaged or killed.

Consequently, the lead game object $101_1$ attacking the one or more opponent game objects in response to the user 1 providing input via the GUI 26 to enable the one or enhanced attack modalities may result in the one or more opponent game objects $104_x$ being damaged or killed more rapidly and/or a greater number of the one or more opponent game objects $104_x$ being damaged or killed than from attacks automatically initiated by the video game process 1900 on behalf of the user 1/lead game object $101_1$.

In some embodiments, the lead game object $101_1$ may attack the one or more opponent game objects $104_x$ in response to the user 1 providing input via the GUI 26 to enable the one or more enhanced attack modalities further to the user 1 providing input via the GUI 26. For example, the user 1 may provide activation input via the GUI 26, the activation input comprising a command to enable the one or more enhanced attack modalities. Responsive to receiving the activation input, the one or more enhanced attack modalities may be enabled with respect to the lead game object $101_1$. Additionally, responsive to receiving the activation input, the activation countdown associated with the event zone 102 may be suspended.

Further to the one or more enhanced attack modalities being enabled, the lead game object $101_1$ is configured to attack the one or more opponent game objects $104_x$ having a position in the virtual space 6 that is within the event zone 102. Thus, enabling the one or more enhanced attack modalities comprises changing the state of the one or more opponent game objects $104_x$ having a position in the event zone 102 while the one or more enhanced attack modalities are enabled. Therefore, in addition to attacks against the one or more opponent game objects $104_x$ by the lead game object $101_1$ being automatically initiated as part of the video game process 1900, the present disclosure also comprises attacks against the one or more opponent game objects $104_x$ by the lead game object $101_1$ being initiated in response to the activation input provided by the user 1 via the GUI 26.

In some embodiments, the enhanced attack modalities may only be enabled if certain conditions are satisfied.

For example, a condition for enabling the one or more enhanced attack modalities may be related to the score of the user 1. For instance, the one or more enhanced attack modalities being enabled may be conditional on the score associated with the user 1 meeting or exceeding a threshold score value. The threshold score value may be encoded in the game data 20 by a game designer at the time of game design.

In yet another example, a condition for enabling the one or more enhanced attack modalities may be related to a total number of automatically executed attacks on behalf of the lead game object $101_1$/user 1 against the one or more opponent game objects $104_x$ during the gameplay session (i.e., a total number of instances the state of the one or more opponent game objects $104_x$ has changed due to the lead game object $101_1$). For instance, the one or more enhanced attack modalities being enabled may be conditional on the total number of attacks by the lead game object $101_1$ against the one or more opponent game objects $104_x$ meeting or exceeding a threshold attack value. For example, a count of the number of instances wherein the lead game object $101_1$ has attacked the one or more game opponent game objects $104_x$ may be stored in the memory 12 (for example, included in column 1010 of the table 1000). The threshold attack value may be encoded in the game data 20 by a game designer at the time of game design.

The GUI 26 may be configured to display information regarding the threshold score value and/or the threshold attack value. In some cases, the GUI 26 may be configured to provide an indication to the user 1 regarding whether the conditions for enabling the one or more attack modalities have been satisfied. In one example, the GUI 26 may comprise an attack mode indicator 86 which may include a graphical element 88. In this example, the graphical element 88 may comprise a variable amount of shading or fill such that an increase in the shading or the fill of the graphical element 88 of the indicator 28 may be associated with an increase in the score of the user 1 or an increase in the number of attacks by the lead game object $101_1$. In accordance with one non-limiting example, the graphical element 88 being partially shaded or filled may correspond with the score of the user 1 not meeting exceeding the threshold score value or the number of attacks by the lead game object $101_1$ not meeting or exceeding the threshold attack value. In this example, the graphical element 88 being completely shaded or filled may correspond with the score of the user 1 meeting or exceeding the threshold score value or the number of attacks by the lead game object $101_1$ meeting or exceeding the threshold attack value.

Any other suitable method of representing the threshold score value and/or the threshold attack value may be implemented.

The one or more enhanced attack modalities may be configured to be enabled for a given length of time. The given length of time may be referred to as the "enhanced attack period". Once enabled, the one or more enhanced attack modalities may be configured to be disabled after the enhanced attack period expires. In some cases, the enhanced attack period may be encoded in the game data 20 by a game designer at the time of game design. In other cases, the enhanced attack period may be variable. For instance, the enhanced attack period may vary as a function of the score associated with the user 1 such that a higher score may correspond to a longer enhanced attack period.

In some embodiments, the position of the marker $103_x$ relative to at least part of the event zone 102 of the lead game object $101_1$ is related to a time remaining before the enhanced attack period expires. Thus, changing a position of the marker $103_x$ relative to at least part of the event zone 102 of the lead game object $101_1$ may provide the user 1 an indication of the time remaining before the enhanced attack period expires.

As part of the video game process 2500, the position of the marker $103_x$ relative to at least part of the event zone 102 may be changed from an initial position to a final position. Thus, changing the position of the marker $103_x$ relative to at least part of the event zone 102 may comprise progressively moving the marker $103_x$ from an initial position to a final position. For instance, an initial position may correspond to a beginning of the enhanced attack period and a final position may correspond with the enhanced attack period expiring. Thus, the video game process 2500 may comprise synchronizing the enhanced attack period expiring with the marker $103_x$ reaching the final position.

The distance $D_x$ involving the marker $103_x$ and at least part of the event zone 102 may be related to a time remaining before the enhanced attack period expires.

In some embodiments, the distance $D_x$ involving the marker $103_x$ and at least part of the event zone 102 may increase as the time remaining before the enhanced attack period expires decreases. In such embodiments, the distance $D_x$ involving the marker $103_x$ and at least part of the event zone 102 may increase as the position of the marker $103_x$ changes from an initial position to a final position.

In other embodiments, the distance $D_x$ involving the marker $103_x$ and at least part of the event zone 102 may decrease as the time remaining before the enhanced attack period expires decreases. In such embodiments, the distance $D_x$ involving the marker $103_x$ and at least part of the event zone 102 may decrease as the position of the marker $103_x$ changes from an initial position to a final position. In this embodiment, the video game process 1900 may comprise synchronizing the enhanced attack period expiring with the distance $D_x$ involving the marker $103_x$ and at least part of the event zone 102 reaching zero. Accordingly, the distance $D_x$ involving the marker $103_x$ and at least part of the event zone 102 reaching zero may be indicative of the event zone being activated.

In some embodiments, the perimeter 106 of the event zone 102 of the lead game object $101_1$ may comprise a reference point P such that the distance $D_x$ involving the marker $103_x$ and at least part of the event zone 102 is between the marker $103_x$ and the reference point P. In some embodiments, the distance $D_x$ involving the marker $103_x$ and at least part of the event zone 102 may be a linear distance. In other embodiments, the distance $D_x$ involving the marker $103_x$ and at least part of the event zone 102 may be an angular distance. In yet further embodiments, the distance $D_x$ involving the marker $103_x$ and at least part of the event zone 102 may be a radial distance.

Once the enhanced attack period expires, the one or more enhanced attack modalities are configured to be disabled. The enhanced attack period expiring may be synchronized with the activation countdown being reset (i.e., the video game process 1900 proceeding to step 1915).

In some embodiments, responsive to the activation input and the one or more enhanced attack modalities being enabled, the video game process 2500 may comprise no longer displaying the visual representation of the marker $103_x$ on the internal display device 15 or the external display device 16 of the computing device 10. In other embodiments, responsive to the activation input and the one or more enhanced attack modalities being enabled, the video game process 2500 may comprise changing the visual representation of the marker $103_x$ from a first visual representation of the marker $103_x$ to a second visual representation of the marker $103_x$. The second visual representation of the marker $103_x$ may be associated with the one or more enhanced attack modalities being enabled. In some embodiments, responsive to the enhanced attack period expiring, the video game process 2500 may comprise reverting the visual representation of the marker $103_x$ back to the first visual representation of the marker $103_x$.

In some embodiments, responsive to the activation input and the one or more enhanced attack modalities being enabled, the video game process 2500 may comprise changing at least one of the one or more marker attributes stored in the memory 12.

In this example, responsive to the activation input and the one or more enhanced attack modalities being enabled, the light intensity attribute stored in the memory 12 may change which may result in a change in the light intensity of the visual representation of the marker $103_x$. For example, the user 1 may perceive this change as the visual representation of the marker $103_x$ appearing brighter when the one or more enhanced attack modalities are enabled as compared to a brightness of the marker $103_x$ when the one or more enhanced attack modalities are not enabled.

In yet another example, responsive to the activation input and the one or more enhanced attack modalities being enabled, the color attribute stored in the memory 12 may change which may result in a change in the color of the visual representation of the marker $103_x$. For example, the user 1 may perceive this change as the visual representation of the marker $103_x$ changing color when the one or more enhanced attack modalities are enabled.

In other embodiments, responsive to the activation input and the one or more enhanced attack modalities being enabled, the video game process 2500 may comprise changing the visual representation of the event zone 102 from a first visual representation of the event zone 102 to a second visual representation of the event zone 102. The second visual representation of the event zone 102 may be associated with the one or more enhanced attack modalities being enabled. In some embodiments, responsive to the enhanced attack period expiring, the video game process 1900 may comprise reverting the visual representation of the event zone 102 back to the first visual representation of the event zone 102.

In some embodiments, responsive to the activation input and the one or more enhanced attack modalities being enabled, the video game process 2500 may comprise changing at least one of the one or more event zone attributes stored in the memory 12.

In this example, responsive to the activation input and the one or more enhanced attack modalities being enabled, the light intensity attribute stored in the memory 12 may change which may result in a change in the light intensity of the visual representation of the event zone 102. For example, the user 1 may perceive this change as the visual representation of the event zone 102 appearing brighter when the one or more enhanced attack modalities are enabled as compared to a brightness of the event zone 102 when the one or more enhanced attack modalities are not enabled.

In yet another example, responsive to the activation input and the one or more enhanced attack modalities being enabled, the color attribute stored in the memory 12 may change which may result in a change in the color of the visual representation of the event zone 102. For example, the user 1 may perceive this change as the visual representation of the event zone 102 changing color when the one or more enhanced attack modalities are enabled.

In some embodiments, enabling the one or more enhanced attack modalities may result in a change of the threshold score value. For example, enabling the one or more enhanced attack modalities may result in an increase in the threshold score value. Accordingly, the user 1 may be required to increase their score before in order to satisfy the conditions for enabling the one or more enhanced attack modalities. In other embodiments, enabling the one or more enhanced attack modalities may result in the count of the number of attacks by the lead game object $101_1$ to be reset. Accordingly, the lead game object $101_1$ may be required to execute a sufficient number of attacks to meet or exceed the threshold attack value.

In some embodiments, enabling the one or more enhanced attack modalities may result in a change in the attack mode indicator 86. For example, upon receipt of the activation input, the graphical element 88 may be completely shaded or filled which may correspond with the score of the user exceeding the threshold score value or the number of attacks by the lead game object $101_1$ exceeding the threshold attack value. Once the one or more enhanced attack modalities have been disabled, the shading or filling of the graphical element 88 may decrease or the graphical element 88 may no longer be shaded or filled or at all. This may correspond with the score of the user 1 being below the threshold score value subsequent to the threshold score value having been increased due to the one or more enhanced attack modalities having been enabled or the count of the attacks of the lead game object $101_1$ being below the threshold attack level in view of the count having been reset due to the one or more enhanced attack modalities having been enabled.

Figure 25:
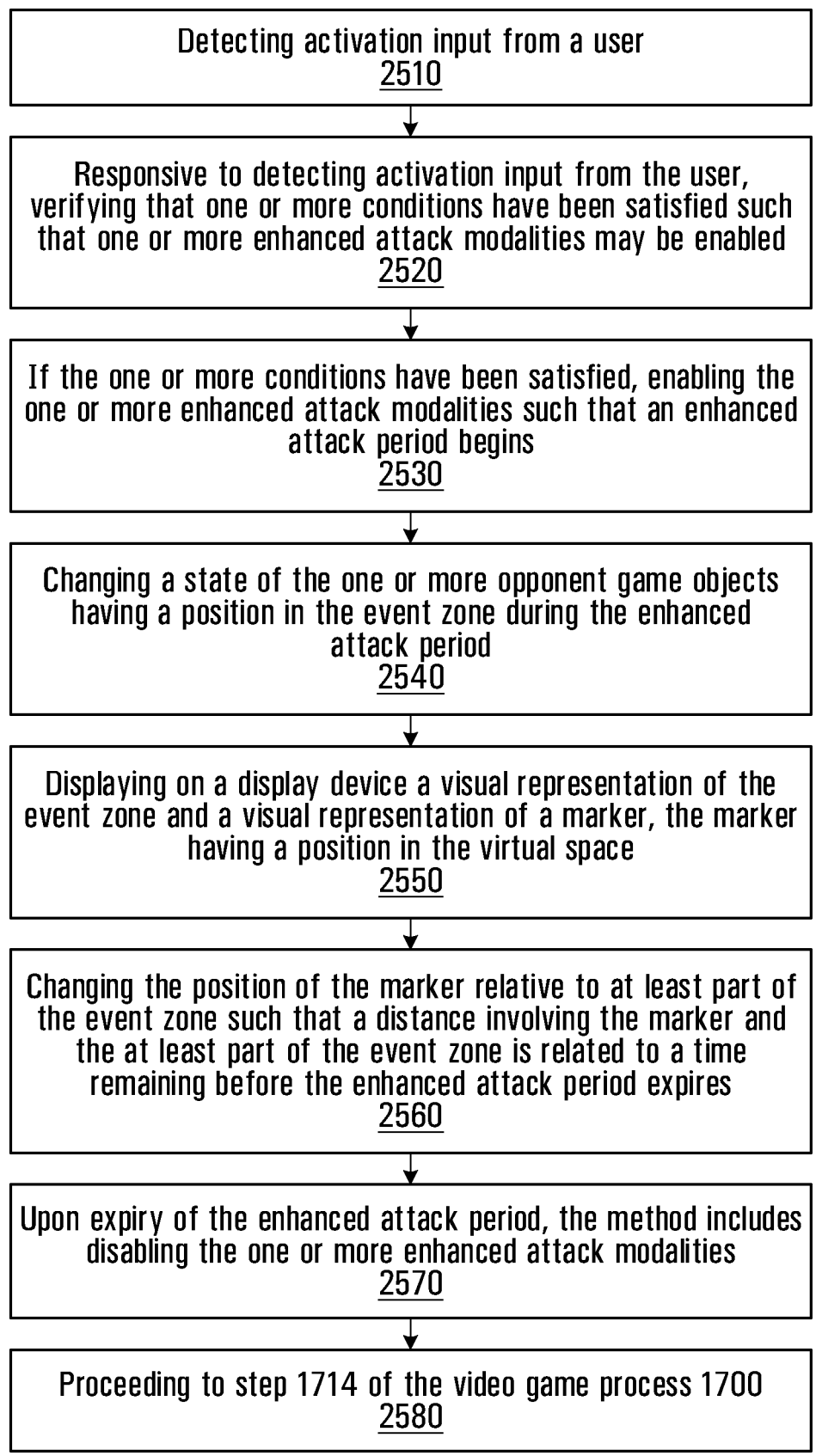
FIG. 25 is a flowchart illustrating steps of another video game process in accordance with another embodiment of the present invention.

With reference therefore to FIG. 25, it will be appreciated that the video game process 2500 includes at step 2510 of detecting activation input from a user. At step 2520, the video game process includes, responsive to detecting activation input from the user, verifying that one or more conditions have been satisfied such that one or more enhanced attack modalities may be enabled. At step 2530, if the one or more conditions have been satisfied, the video game process includes enabling the one or more enhanced attack modalities such that an enhanced attack period begins. At step 2540, the video game process comprises changing a state of the one or more opponent game objects having a position in the event zone during the enhanced attack period. At step 2550, the video game process includes displaying on a display device a visual representation of the event zone and a visual representation of a marker, the marker having a position in the virtual space. At step 2560, the video game process includes changing the position of the marker relative to at least part of the event zone such that a distance involving the marker and the at least part of the event zone is related to a time remaining before the enhanced attack period expires. At step 2570, upon expiry of the enhanced attack period, the video game process includes disabling the one or more enhanced attack modalities. At step 2580, the video game process proceeds to step 1915 of the video game process 1900.

Figure 26:
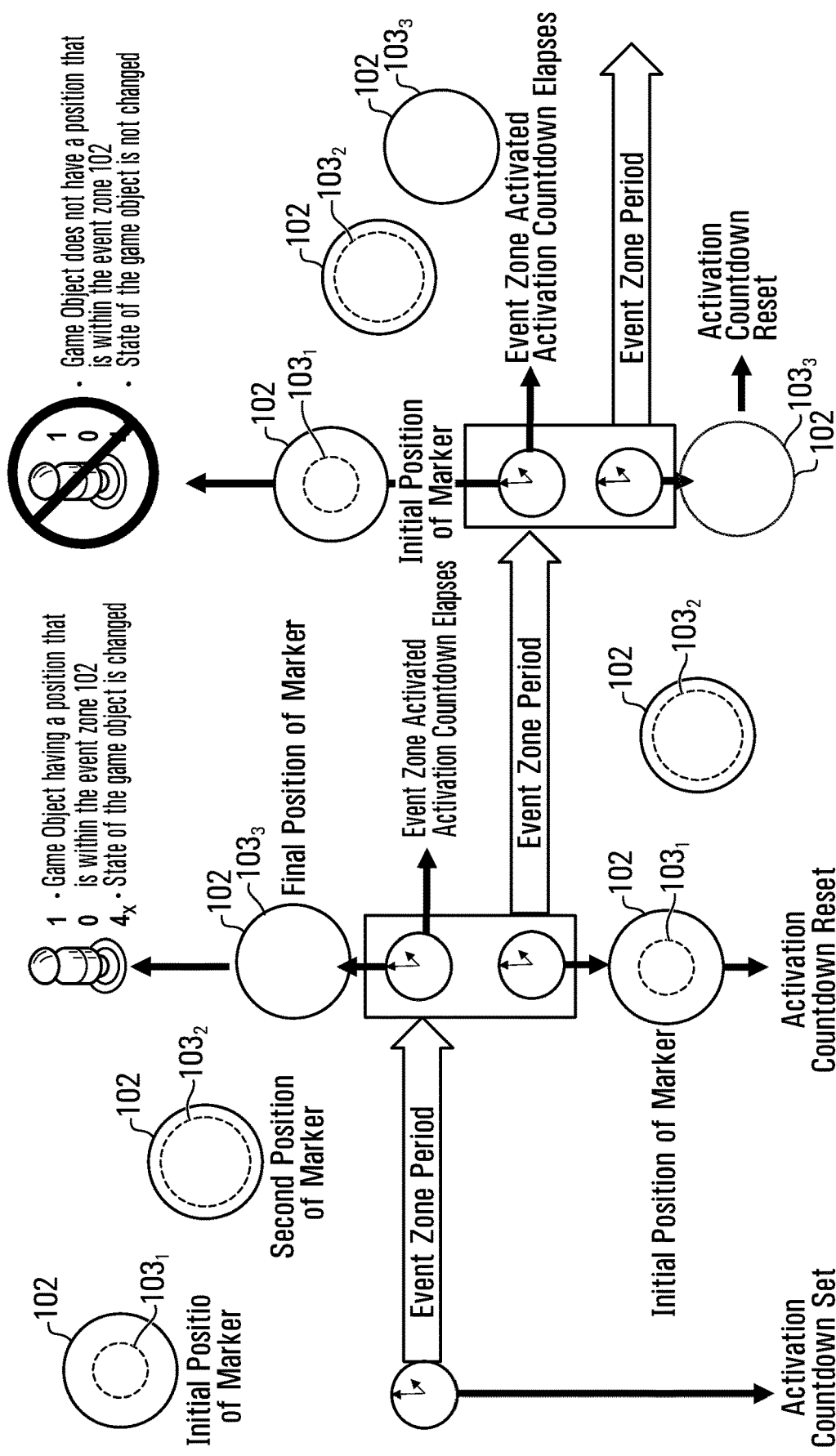
FIG. 26 is a schematic of the video game process of FIG. 19, in accordance with a non-limiting embodiment.

FIG. 26 is a schematic summarizing the disclosed video game process 1900. With reference therefore to FIG. 24, it will be appreciated that there has been provided a method 2400 for execution by at least one processor. At step 2410, the method includes maintaining in a non-transitory memory a virtual space for a gaming environment. At step 2420, the method includes repeatedly activating an event zone in the virtual space such that for one or more game objects having a position in the virtual space that is within the event zone when the event zone is activated, a state of the one or more game objects in the virtual space is changed. At step 2430, the method includes displaying on a display device a visual representation of the event zone and a visual representation of a marker, the marker having a position in the virtual space. At step 2440, the method includes changing the position of the marker relative to at least part of the event zone such that a distance involving the marker and the at least part of the event zone is related to a time remaining before the next repeated activation of the event zone.

As a result of the above-described methods, systems and applications increase the strategic complexity of attack sequences between characters, while at the same time simplifying the user input required for such attack sequences. This results in a different attack strategy to other MOBA games. In particular, the attack strategy adopted by a user playing the game described above relates less to triggering attacks at the right time, and more to using positioning and target isolation in order to carry out attacks on the right opponent character. Moreover, as will be appreciated by the skilled reader, as the number of ally game objects 101$_x$ and opponent game objects 104$_x$ increases in the MOBA gaming environment, and the cooperative/competitive relationships between players evolves, such strategic complexity is further increased.

The description and drawings merely illustrate the principles of the invention. It will thus be appreciated that those skilled in the art will be able to devise various arrangements that, although not explicitly described or shown herein, embody the principles of the invention and are included within its scope, as defined in the appended claims.

Furthermore, all examples recited herein are principally intended to aid the reader in understanding the principles of the invention and are to be construed as being without limitation to such specifically recited examples and conditions. For example, the present disclosure describes embodiments of the invention with reference to the analysis of various desktop objects. It will however be appreciated by the skilled reader that the present invention can also advantageously be used to search other types and forms of objects in other environments.

Furthermore, while the aforementioned description refers to mobile devices, a person of skill in the art would readily recognize that steps of various above-described methods can be performed by any number of computing devices, such as video cameras, digital cameras, infrared cameras, desktop computers, laptop computers, tablets, smartphones, smart watches or other wearables. Herein, some embodiments are also intended to cover program storage devices, e.g., digital data storage media, which are, machine or computer-readable and encode machine-executable or computer-executable programs of instructions, wherein said instructions perform some or all of the steps of the above-described methods. The embodiments are also intended to cover computers programmed to perform said steps of the above-described methods.

Those skilled in the art will appreciate that when a processor is described as being "configured" to carry out an action or process, this can mean that the processor carries out the action or process by virtue of executing computer-readable instructions that are read from device memory where these computer-readable instructions are stored.

Those skilled in the art should appreciate that any feature of any embodiment disclosed herein may combined with (e.g., used instead of or in addition to) any feature of any other embodiment disclosed herein in some examples of implementation. Certain additional elements that may be needed for operation of some embodiments have not been described or illustrated as they are assumed to be within a purview of those ordinarily skilled in the art. Moreover, certain embodiments may be free of, may lack and/or may function without any element that is not specifically disclosed herein.

Although various embodiments and examples have been presented, this was for purposes of description, but should not be limiting. Various modifications and enhancements will become apparent to those ordinarily skill in the art.

The invention claimed is:

1. A method for execution by a processor of a computing device, the method comprising: maintaining in a non-transitory memory a virtual space for a gaming environment, the virtual space comprising a lead game object and an event zone associated with a position of the lead game object;
repeatedly activating the event zone in the virtual space such that for one or more other game objects having a position in the virtual space that is within the event zone when the event zone is activated, a state of the one or more other game objects in the virtual space is changed, wherein the one or more other game objects are determined as having a position in the virtual space that is within the event zone when the event zone is activated based on a determination that a relative position of each of the one or more other game objects and the lead game object satisfies a first condition when the event zone is activated or based on a determination that a relative position of each of the one or more other game objects and the event zone satisfies a second condition when the event zone is activated;
displaying on a display device a visual representation of the event zone and a visual representation of a marker, the marker having a position in the virtual space; and
changing the position of the marker relative to at least part of the event zone such that a distance involving the marker and the at least part of the event zone is related to a time remaining before the next repeated activation of the event zone.

2. The method of claim 1, wherein the event zone is associated with one or more event zone parameters stored in the non-transitory memory and wherein repeatedly activating the event zone comprises repeatedly changing at least one of the one or more event zone parameters stored in the non-transitory memory.

3. The method of claim 1, wherein the event zone is associated with one or more event zone attributes stored in the non-transitory memory and wherein repeatedly activating the event zone comprises repeatedly changing at least one of the one or more event zone attributes stored in the non-transitory memory.

4. The method of claim 3, wherein the at least one of the one or more event zone attributes comprises an event zone color attribute and wherein repeatedly activating the event zone comprises repeatedly changing the event zone color attribute such that a color associated with the visual representation of the event zone repeatedly changes, the color associated with the visual representation of the event zone being displayed on the display device.

5. The method of claim 3, wherein the at least one of the one or more event zone attributes comprises an event zone light intensity attribute and wherein repeatedly activating the event zone comprises repeatedly changing the event zone light intensity attribute such that a light intensity associated with the visual representation of the event zone repeatedly changes, the light intensity associated with the visual representation of the event zone being displayed on the display device.

6. The method of claim 1, wherein repeatedly activating the event zone comprises activating the event zone at regular time intervals.

7. The method of claim 1, wherein repeatedly activating the event zone comprises activating the event zone at irregular time intervals.

8. The method of claim 1, wherein the one or more game objects are each associated with one or more game object parameters stored in the non-transitory memory and wherein to change the state of the one or more game objects, the method comprises changing at least one of the one or more game object parameters stored in the non-transitory memory.

9. The method of claim 8, wherein the at least one of the one or more game object parameters comprises a game object state parameter and wherein to change the state of the one or more game objects, the method comprises changing the game object state parameter from a first state to a second state.

10. The method of claim 1, wherein the event zone comprises a perimeter and wherein the distance involving the marker and the at least part of the event zone comprises a distance between the marker and a reference point on the perimeter of the event zone.

11. The method of claim 1, further comprising synchronizing activation of the event zone with the distance reaching zero.

12. The method of claim 1, wherein changing the position of the marker comprises progressively moving the marker from an initial position to a final position.

13. The method of claim 12, further comprising synchronizing activation of the event zone with the marker reaching the final position.

14. The method of claim 12, wherein progressively moving the marker from the initial position to the final position comprises increasing the distance involving the marker and the at least part of the event zone.

15. The method of claim 12, wherein progressively moving the marker from the initial position to the final position comprises decreasing the distance involving the marker and the at least part of the event zone.

16. The method of claim 1, wherein the marker is associated with one or more marker attributes stored in the non-transitory memory and wherein repeatedly activating the event zone comprises repeatedly changing at least one of the one or more marker attributes stored in the non-transitory memory.

17. The method of claim 16, wherein the at least one of the one or more marker attributes comprises a marker color attribute and wherein repeatedly activating the event zone comprises repeatedly changing the marker color attribute such that a color associated with the visual representation of the marker repeatedly changes, the color associated with the visual representation of the marker being displayed on the display device.

18. The method of claim 16, wherein the at least one of the one or more marker attributes comprises a marker light intensity attribute and wherein repeatedly activating the event zone comprises repeatedly changing the marker light intensity attribute such that a light intensity associated with the visual representation of the marker repeatedly changes, the light intensity associated with the visual representation of the marker being displayed on the display device.

19. The method of claim 1, wherein the method further comprises:
  receiving user input from a game controller, the user input comprising a command to control the position of the event zone in the virtual space; and
  responsive to receiving the user input, changing the position of the event zone in the virtual space.

20. The method of claim 19, wherein the marker comprises at least one point in the virtual space and wherein the user input comprising the command to control the position of the event zone in the virtual space also comprises a command to control a position of the at least one point in the virtual space.

21. The method of claim 19, wherein the event zone is associated with a set of spatial coordinates in the virtual space and wherein the method further comprises storing in the non-transitory memory an indication of the set of spatial coordinates associated with the event zone.

22. The method of claim 21, wherein a composition of the set of spatial coordinates associated with the event zone changes in response to changing the position of the event zone in the virtual space.

23. The method of claim 1, wherein the virtual space comprises one or more environment objects, wherein the visual representation of the event zone is a first visual representation of the event zone and wherein the method further comprises:
  determining if a distance between the event zone and at least part of at least one of the one or more environment objects is within a threshold distance;
  responsive to determining that the distance between the event zone and the at least part of at least one of the one or more environment objects is within the threshold distance, changing the visual representation of the event zone displayed on the display device from the first visual representation of the event zone to a second visual representation of the event zone.

24. The method of claim 23, wherein the visual representation of the marker is a first visual representation of the marker and wherein the method further comprises:

changing the visual representation of the marker displayed on the display device from the first visual representation of the marker to a second visual representation of the marker.

25. The method of claim 24, wherein said changing the visual representation of the event zone and said changing the visual representation of the marker are performed simultaneously.

26. The method of claim 25, wherein said changing the visual representation of the event zone and said changing the visual representation of the marker comprises changing a shape of the visual representation of the event zone and changing a shape of the visual representation of the marker.

27. The method of claim 1, wherein the first condition is satisfied upon determination that a distance between the lead game object and each of the one or more other game objects is less than a threshold distance; and wherein the second condition is satisfied upon determination that the position of each of the one or more other game objects corresponds with a position of the event zone when the event zone is activated, the position of the one or more other game objects and the position of the event zone being defined by spatial coordinates.

28. A gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program including at least one process that comprises:

maintaining in a non-transitory memory a virtual space for a gaming environment, the virtual space comprising a lead game object and an event zone associated with a position of the lead game object;

repeatedly activating the event zone in the virtual space such that for one or more other game objects having a position in the virtual space that is within the event zone when the event zone is activated, a state of the one or more other game objects in the virtual space is changed, wherein the one or more other game objects are determined as having a position in the virtual space that is within the event zone when the event zone is activated based on a determination that a relative position of each of the one or more other game objects and the lead game object satisfies a first condition when the event zone is activated or based on a determination that a relative position of each of the one or more other game objects and the event zone satisfies a second condition when the event zone is activated;

displaying on a display device a visual representation of the event zone and a visual representation of a marker, the marker having a position in the virtual space; and changing the position of the marker relative to at least part of the event zone such that a distance involving the marker and the at least part of the event zone is related to a time remaining before the next repeated activation of the event zone.

29. The gaming device of claim 28, wherein the first condition is satisfied upon determination that a distance between the lead game object and each of the one or more other game objects is less than a threshold distance; and wherein the second condition is satisfied upon determination that the position of each of the one or more other game objects corresponds with a position of the event zone when the event zone is activated, the position of the one or more other game objects and the position of the event zone being defined by spatial coordinates.

30. A computer-readable storage medium comprising computer-readable instructions which, when read and executed by at least one processor of a gaming device, cause a gaming device to carry out a method in an interactive computer program that comprises:

maintaining in a non-transitory memory a virtual space for a gaming environment, the virtual space comprising a lead game object and an event zone associated with a position of the lead game object;

repeatedly activating the event zone in the virtual space such that for one or more other game objects having a position in the virtual space that is within the event zone when the event zone is activated, a state of the one or more other game objects in the virtual space is changed, wherein the one or more other game objects are determined as having a position in the virtual space that is within the event zone when the event zone is activated based on a determination that a relative position of each of the one or more other game objects and the lead game object satisfies a first condition when the event zone is activated or based on a determination that a relative position of each of the one or more other game objects and the event zone satisfies a second condition when the event zone is activated;

displaying on a display device a visual representation of the event zone and a visual representation of a marker, the marker having a position in the virtual space; and changing the position of the marker relative to at least part of the event zone such that a distance involving the marker and the at least part of the event zone is related to a time remaining before the next repeated activation of the event zone.

31. The computer-readable storage medium of claim 30, wherein the first condition is satisfied upon determination that a distance between the lead game object and each of the one or more other game objects is less than a threshold distance; and wherein the second condition is satisfied upon determination that the position of each of the one or more other game objects corresponds with a position of the event zone when the event zone is activated, the position of the one or more other game objects and the position of the event zone being defined by spatial coordinates.

* * * * *